(12) United States Patent
Reyserhove et al.

(10) Patent No.: US 11,962,928 B2
(45) Date of Patent: Apr. 16, 2024

(54) PROGRAMMABLE PIXEL ARRAY

(71) Applicant: Meta Platforms Technologies, LLC, Menlo Park, CA (US)

(72) Inventors: Hans Reyserhove, Seattle, WA (US); Andrew Samuel Berkovich, Bellevue, WA (US); Xinqiao Liu, Medina, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/715,792

(22) Filed: Dec. 16, 2019

(65) Prior Publication Data

US 2020/0195828 A1 Jun. 18, 2020

Related U.S. Application Data

(60) Provisional application No. 62/780,904, filed on Dec. 17, 2018.

(51) Int. Cl.
*H04N 23/73* (2023.01)
(52) U.S. Cl.
CPC .................... *H04N 23/73* (2023.01)
(58) Field of Classification Search
CPC . H04N 5/2353; H04N 5/37452; H04N 5/3535
See application file for complete search history.

(56) References Cited

U.S. PATENT DOCUMENTS

| 4,121,896 A | 10/1978 | Shepherd |
| 6,384,905 B1 | 5/2002 | Barrows |

(Continued)

FOREIGN PATENT DOCUMENTS

| CN | 103207716 A | 7/2013 |
| CN | 103907133 A | 7/2014 |

(Continued)

OTHER PUBLICATIONS

International Application No. PCT/US2019/066805, International Search Report and Written Opinion dated Mar. 3, 2020, 13 pages.

(Continued)

*Primary Examiner* — Jason A Flohre
(74) *Attorney, Agent, or Firm* — Kilpatrick Townsend & Stockton LLP

(57) ABSTRACT

In one example, an apparatus includes an array of pixel cells and a peripheral circuit. Each pixel cell of the array of pixel cells includes: a memory to store pixel-level programming data and measurement data, and light measurement circuits configured to, based on the pixel-level programming data from the control memory, perform a light measurement operation to generate the measurement data, and to store the measurement data at the data memory. The peripheral circuit is configured to: receive a pixel array programming map including pixel-level programming data targeted at each pixel cell; extract the pixel-level programming data from the pixel array programming map; and transmit the pixel-level programming data to each pixel cell of the array of pixel cells for storage at the memory of the each pixel cell and to individually control the light measurement operation and a generation of the measurement data at the each pixel cell.

26 Claims, 24 Drawing Sheets

(56) References Cited

U.S. PATENT DOCUMENTS

| | | |
|---|---|---|
| 6,853,579 B1 | 2/2005 | Chou |
| 7,359,275 B1 | 4/2008 | Wu |
| 7,362,355 B1 | 4/2008 | Yang et al. |
| 7,659,925 B2 | 2/2010 | Krymski |
| 7,920,409 B1 | 4/2011 | Clark et al. |
| 7,956,914 B2 | 6/2011 | Xu |
| 7,969,759 B1 | 6/2011 | Thummalapally et al. |
| 3,134,623 A1 | 3/2012 | Purcell et al. |
| 8,441,535 B2 | 5/2013 | Morin |
| 8,675,110 B2 | 3/2014 | Hirai et al. |
| 8,779,346 B2 | 7/2014 | Fowler et al. |
| 9,094,629 B2 | 7/2015 | Ishibashi |
| 9,210,330 B2 | 12/2015 | Seo |
| 9,282,264 B2 | 3/2016 | Park et al. |
| 9,363,454 B2 | 6/2016 | Ito et al. |
| 9,560,296 B2 | 1/2017 | Hseih et al. |
| 9,646,681 B1 | 5/2017 | Jung et al. |
| 9,723,233 B2 | 8/2017 | Grauer et al. |
| 9,743,024 B2 | 8/2017 | Tyrrell et al. |
| 9,826,175 B2 | 11/2017 | Isobe |
| 9,832,370 B2 | 11/2017 | Cho et al. |
| 9,912,885 B2 | 3/2018 | Isobe |
| 9,955,091 B1* | 4/2018 | Dai .............. H04N 5/3765 |
| 10,007,350 B1 | 6/2018 | Holz et al. |
| 10,090,342 B1 | 10/2018 | Gambino et al. |
| 10,096,631 B2 | 10/2018 | Ishizu |
| 10,154,221 B2 | 12/2018 | Ogino et al. |
| 10,157,951 B2 | 12/2018 | Kim et al. |
| 10,274,730 B2 | 4/2019 | Jepsen et al. |
| 10,321,081 B2 | 6/2019 | Watanabe et al. |
| 10,345,447 B1 | 7/2019 | Hicks |
| 10,484,628 B2 | 11/2019 | Zhang et al. |
| 10,515,284 B2 | 12/2019 | Gousev et al. |
| 10,594,974 B2 | 3/2020 | Ivarsson et al. |
| 10,607,413 B1 | 3/2020 | Marcolina et al. |
| 10,715,824 B2 | 7/2020 | Tall et al. |
| 10,726,627 B2 | 7/2020 | Liu |
| 10,867,655 B1 | 12/2020 | Harms et al. |
| 10,897,586 B2 | 1/2021 | Liu et al. |
| 10,915,995 B2 | 2/2021 | Moloney |
| 10,939,062 B2 | 3/2021 | Ogawa et al. |
| 10,970,619 B1 | 4/2021 | Xiao et al. |
| 10,984,235 B2 | 4/2021 | Gousev et al. |
| 10,999,539 B2 | 5/2021 | Wendel et al. |
| 11,057,581 B2 | 7/2021 | Liu |
| 11,126,497 B2 | 9/2021 | Oh et al. |
| 11,204,835 B2 | 12/2021 | Lu et al. |
| 11,568,609 B1 | 1/2023 | Liu et al. |
| 11,630,724 B2 | 4/2023 | Shin et al. |
| 2002/0113886 A1* | 8/2002 | Hynecek .......... H04N 3/155 348/302 |
| 2003/0005231 A1 | 1/2003 | Ooi et al. |
| 2003/0020100 A1 | 1/2003 | Guidash |
| 2005/0057389 A1 | 3/2005 | Krymski |
| 2005/0058773 A1 | 3/2005 | Hasei et al. |
| 2005/0073874 A1 | 4/2005 | Chan et al. |
| 2005/0237380 A1 | 10/2005 | Kakii et al. |
| 2006/0224792 A1 | 10/2006 | Ooi |
| 2007/0076109 A1 | 4/2007 | Krymski |
| 2007/0222881 A1 | 9/2007 | Mentzer |
| 2008/0007731 A1 | 1/2008 | Botchway et al. |
| 2008/0055736 A1 | 3/2008 | Tsuji et al. |
| 2008/0226170 A1 | 9/2008 | Sonoda |
| 2009/0245637 A1 | 10/2009 | Barman et al. |
| 2010/0194956 A1 | 8/2010 | Yuan et al. |
| 2010/0197821 A1 | 8/2010 | Jeong et al. |
| 2010/0197876 A1 | 8/2010 | Lyu et al. |
| 2010/0245600 A1 | 9/2010 | Chang et al. |
| 2010/0276572 A1 | 11/2010 | Iwabuchi et al. |
| 2011/0055461 A1 | 3/2011 | Steiner et al. |
| 2011/0075470 A1 | 3/2011 | Liaw |
| 2011/0155892 A1 | 6/2011 | Neter et al. |
| 2011/0254986 A1 | 10/2011 | Nishimura et al. |
| 2011/0267362 A1 | 11/2011 | Handschy et al. |
| 2012/0002459 A1 | 1/2012 | Rimondi et al. |
| 2012/0002460 A1 | 1/2012 | Rimondi et al. |
| 2012/0044399 A1 | 2/2012 | Hirai et al. |
| 2012/0086082 A1 | 4/2012 | Malinge et al. |
| 2012/0105475 A1 | 5/2012 | Tseng |
| 2012/0105668 A1 | 5/2012 | Velarde et al. |
| 2012/0113119 A1 | 5/2012 | Massie |
| 2012/0133807 A1 | 5/2012 | Wu et al. |
| 2012/0161088 A1 | 6/2012 | Choi et al. |
| 2012/0198312 A1 | 8/2012 | Kankani et al. |
| 2012/0200499 A1 | 8/2012 | Osterhout et al. |
| 2012/0212465 A1 | 8/2012 | White et al. |
| 2012/0240007 A1 | 9/2012 | Barndt et al. |
| 2012/0262616 A1 | 10/2012 | Sa et al. |
| 2013/0056809 A1 | 3/2013 | Mao et al. |
| 2013/0057742 A1 | 3/2013 | Nakamura et al. |
| 2013/0068929 A1 | 3/2013 | Solhusvik et al. |
| 2013/0069787 A1 | 3/2013 | Petrou |
| 2013/0141619 A1 | 6/2013 | Lim et al. |
| 2013/0185609 A1 | 7/2013 | Park et al. |
| 2013/0187027 A1 | 7/2013 | Qiao et al. |
| 2013/0198577 A1 | 8/2013 | Oh et al. |
| 2013/0207219 A1 | 8/2013 | Ahn |
| 2013/0215290 A1 | 8/2013 | Solhusvik et al. |
| 2013/0293753 A1 | 11/2013 | Keelan et al. |
| 2013/0299674 A1 | 11/2013 | Fowler et al. |
| 2013/0300009 A1 | 11/2013 | Oganesian et al. |
| 2013/0314591 A1 | 11/2013 | Eromaki |
| 2013/0326116 A1 | 12/2013 | Goss et al. |
| 2014/0042299 A1 | 2/2014 | Wan et al. |
| 2014/0055635 A1 | 2/2014 | Seo |
| 2014/0063250 A1 | 3/2014 | Park |
| 2014/0170345 A1 | 6/2014 | Aoshima et al. |
| 2014/0247382 A1 | 9/2014 | Moldovan et al. |
| 2014/0368687 A1 | 12/2014 | Yu et al. |
| 2015/0050479 A1 | 2/2015 | Nakamura et al. |
| 2015/0050480 A1 | 2/2015 | Suzuki et al. |
| 2015/0085134 A1* | 3/2015 | Novotny .......... G01J 5/24 348/164 |
| 2015/0158259 A1 | 6/2015 | Yamamoto et al. |
| 2015/0189209 A1 | 7/2015 | Yang et al. |
| 2015/0201142 A1 | 7/2015 | Smith et al. |
| 2015/0222827 A1 | 8/2015 | Isobe |
| 2015/0229859 A1 | 8/2015 | Guidash et al. |
| 2015/0279884 A1 | 10/2015 | Kusumoto |
| 2015/0309311 A1 | 10/2015 | Cho |
| 2015/0309316 A1 | 10/2015 | Osterhout et al. |
| 2015/0312502 A1 | 10/2015 | Borremans |
| 2015/0358571 A1 | 12/2015 | Dominguez Castro et al. |
| 2015/0381911 A1 | 12/2015 | Shen et al. |
| 2016/0011422 A1 | 1/2016 | Thurber et al. |
| 2016/0018645 A1 | 1/2016 | Haddick et al. |
| 2016/0021302 A1 | 1/2016 | Cho et al. |
| 2016/0028974 A1 | 1/2016 | Guidash et al. |
| 2016/0032074 A1 | 2/2016 | Aizenberg et al. |
| 2016/0078614 A1 | 3/2016 | Ryu et al. |
| 2016/0088253 A1 | 3/2016 | Tezuka |
| 2016/0100115 A1 | 4/2016 | Kusano |
| 2016/0165160 A1 | 6/2016 | Hseih et al. |
| 2016/0210785 A1 | 7/2016 | Balachandreswaran et al. |
| 2016/0344965 A1 | 11/2016 | Grauer et al. |
| 2016/0360127 A1 | 12/2016 | Dierickx et al. |
| 2017/0039906 A1 | 2/2017 | Jepsen |
| 2017/0041571 A1* | 2/2017 | Tyrrell .............. H04N 5/37455 |
| 2017/0117310 A1 | 4/2017 | Tatani et al. |
| 2017/0154909 A1 | 6/2017 | Ishizu |
| 2017/0161579 A1 | 6/2017 | Gousev et al. |
| 2017/0228345 A1 | 8/2017 | Gupta et al. |
| 2017/0248789 A1 | 8/2017 | Yokoyama |
| 2017/0270664 A1 | 9/2017 | Hoogi et al. |
| 2017/0272768 A1 | 9/2017 | Tall et al. |
| 2017/0280031 A1 | 9/2017 | Price et al. |
| 2017/0293799 A1 | 10/2017 | Skogo et al. |
| 2017/0307887 A1 | 10/2017 | Stenberg et al. |
| 2017/0310910 A1 | 10/2017 | Smith et al. |
| 2017/0338262 A1 | 11/2017 | Hirata |
| 2017/0339327 A1 | 11/2017 | Koshkin et al. |
| 2018/0027174 A1 | 1/2018 | Sengoku |
| 2018/0115725 A1 | 4/2018 | Zhang et al. |
| 2018/0136471 A1 | 5/2018 | Miller et al. |

(56) References Cited

U.S. PATENT DOCUMENTS

| | | | |
|---|---|---|---|
| 2018/0143701 A1 | 5/2018 | Suh et al. |
| 2018/0167575 A1 | 6/2018 | Watanabe et al. |
| 2018/0176545 A1 | 6/2018 | Aflaki Beni |
| 2018/0204867 A1 | 7/2018 | Kim et al. |
| 2018/0211582 A1 | 7/2018 | Sakariya et al. |
| 2018/0224658 A1 | 8/2018 | Teller |
| 2018/0239108 A1 | 8/2018 | Ishii et al. |
| 2018/0241953 A1 | 8/2018 | Johnson |
| 2018/0252857 A1 | 9/2018 | Glik et al. |
| 2018/0270436 A1 | 9/2018 | Ivarsson et al. |
| 2018/0276841 A1 | 9/2018 | Krishnaswamy et al. |
| 2018/0284594 A1 | 10/2018 | Gao |
| 2019/0019023 A1 | 1/2019 | Konttori et al. |
| 2019/0027454 A1 | 1/2019 | Chen et al. |
| 2019/0035154 A1 | 1/2019 | Liu |
| 2019/0046044 A1 | 2/2019 | Tzvieli et al. |
| 2019/0098232 A1 | 3/2019 | Mori et al. |
| 2019/0110039 A1 | 4/2019 | Linde et al. |
| 2019/0123088 A1 | 4/2019 | Kwon |
| 2019/0149751 A1 | 5/2019 | Wise |
| 2019/0172227 A1 | 6/2019 | Kasahara |
| 2019/0191116 A1 | 6/2019 | Madurawe |
| 2019/0199946 A1 | 6/2019 | Wendel et al. |
| 2019/0204527 A1 | 7/2019 | Nakajima |
| 2019/0246036 A1 | 8/2019 | Wu et al. |
| 2019/0253650 A1* | 8/2019 | Kim ...................... H04N 5/357 |
| 2019/0307313 A1 | 10/2019 | Wade |
| 2019/0331914 A1 | 10/2019 | Lee et al. |
| 2019/0361250 A1 | 11/2019 | Lanman et al. |
| 2019/0363118 A1 | 11/2019 | Berkovich et al. |
| 2020/0035661 A1 | 1/2020 | Yu et al. |
| 2020/0053299 A1 | 2/2020 | Zhang et al. |
| 2020/0098096 A1 | 3/2020 | Moloney |
| 2020/0193206 A1 | 6/2020 | Turkelson et al. |
| 2020/0195875 A1 | 6/2020 | Berkovich et al. |
| 2020/0273784 A1 | 8/2020 | Mallik et al. |
| 2020/0280689 A1 | 9/2020 | Takahashi et al. |
| 2021/0026796 A1 | 1/2021 | Graif et al. |
| 2021/0110187 A1 | 4/2021 | Pillai et al. |
| 2021/0118847 A1 | 4/2021 | Chuang et al. |
| 2021/0142086 A1 | 5/2021 | Berkovich et al. |
| 2021/0185264 A1 | 6/2021 | Wong et al. |
| 2021/0227159 A1 | 7/2021 | Sambonsugi |
| 2021/0264679 A1 | 8/2021 | Liu et al. |
| 2021/0283871 A1 | 9/2021 | Lee et al. |
| 2021/0306586 A1 | 9/2021 | Yamamoto et al. |
| 2021/0368124 A1 | 11/2021 | Berkovich et al. |
| 2021/0409625 A1 | 12/2021 | Zhu et al. |
| 2022/0021833 A1 | 1/2022 | Berkovich |
| 2022/0076726 A1 | 3/2022 | Hulton et al. |

FOREIGN PATENT DOCUMENTS

| | | |
|---|---|---|
| CN | 104204904 A | 12/2014 |
| CN | 106255978 A | 12/2016 |
| CN | 106791504 A | 5/2017 |
| CN | 107005641 A | 8/2017 |
| CN | 109298528 A | 2/2019 |
| DE | 102015122055 A1 | 6/2017 |
| EP | 0775591 A2 | 5/1997 |
| EP | 1603170 A1 | 12/2005 |
| EP | 1746820 A1 | 1/2007 |
| EP | 1788802 A1 | 5/2007 |
| EP | 2037505 | 3/2009 |
| EP | 2228846 A1 | 9/2010 |
| EP | 2330173 A2 | 6/2011 |
| EP | 2357679 A2 | 8/2011 |
| EP | 2804074 A2 | 11/2014 |
| EP | 3229457 A1 | 10/2017 |
| EP | 3833005 A1 | 6/2021 |
| JP | 2003319262 A | 11/2003 |
| JP | 2005129139 A | 5/2005 |
| JP | 2006348085 A | 12/2006 |
| JP | 2008270500 A | 11/2008 |
| JP | 2013043383 A | 3/2013 |
| KR | 20110100974 A | 9/2011 |
| WO | 2014055391 A2 | 4/2014 |
| WO | 2016095057 A1 | 6/2016 |
| WO | 2017003477 A1 | 1/2017 |
| WO | 2017013806 A1 | 1/2017 |
| WO | 2017047010 A1 | 3/2017 |
| WO | 2018231962 A1 | 12/2018 |
| WO | 2019018084 A1 | 1/2019 |
| WO | 2019111528 A1 | 6/2019 |
| WO | 2019145578 A1 | 8/2019 |
| WO | 2019178060 A1 | 9/2019 |
| WO | 2019244142 A2 | 12/2019 |
| WO | 2020077283 A1 | 4/2020 |

OTHER PUBLICATIONS

U.S. Appl. No. 16/421,441, "Non-Final Office Action", May 7, 2021, 17 pages.
U.S. Appl. No. 16/716,050, "Non-Final Office Action", May 14, 2021, 16 pages.
U.S. Appl. No. 17/083,920, "Non-Final Office Action", Apr. 21, 2021, 17 pages.
PCT/US2019/034007, "International Search Report and Written Opinion", Oct. 28, 2019, 19 pages.
PCT/US2019/066831, "International Search Report and Written Opinion", Feb. 27, 2020, 15 pages.
PCT/US2020/044807, "International Search Report and Written Opinion", Sep. 30, 2020, 12 pages.
PCT/US2020/059636, "International Search Report and Written Opinion", Feb. 11, 2021, 18 pages.
Amir M.F., et al., "3-D Stacked Image Sensor With Deep Neural Network Computation," IEEE Sensors Journal, IEEE Service Center, New York, NY, US, May 15, 2018, vol. 18 (10), pp. 4187-4199, XP011681876.
Cho K., et al., "A Low Power Dual CDS for a col. Parallel CMOS Image Sensor," Journal of Semiconductor Technology and Science, Dec. 30, 2012, vol. 12 (4), pp. 388-396.
Chuxi L., et al., "A Memristor-Based Processing-in-Memory Architecture for Deep Convolutional Neural Networks Approximate Computation," Journal of Computer Research and Development, Jun. 30, 2017, vol. 54 (6), pp. 1367-1380.
Corrected Notice of Allowability mailed Apr. 9, 2021 for U.S. Appl. No. 16/255,528, filed Jan. 23, 2019, 5 Pages.
Extended European Search Report for European Application No. 18179846.3, mailed Dec. 7, 2018, 10 Pages.
Extended European Search Report for European Application No. 18179851.3, mailed Dec. 7, 2018, 8 Pages.
Extended European Search Report for European Application No. 19743908.6, mailed Sep. 30, 2020, 9 Pages.
Final Office Action mailed Jan. 27, 2021 for U.S. Appl. No. 16/255,528, filed Jan. 23, 2019, 31 Pages.
Final Office Action mailed Jul. 28, 2021 for U.S. Appl. No. 17/083,920, filed Oct. 29, 2020, 19 Pages.
International Preliminary Report on Patentability for International Application No. PCT/US2019/034007, mailed Dec. 10, 2020, 15 Pages.
International Preliminary Report on Patentability for International Application No. PCT/US2019/066805, mailed Jul. 1, 2021, 8 Pages.
International Preliminary Report on Patentability for International Application No. PCT/US2019/066831, mailed Jul. 1, 2021, 9 Pages.
International Search Report and Written Opinion for International Application No. PCT/US2018/039350, mailed Nov. 15, 2018, 11 Pages.
International Search Report and Written Opinion for International Application No. PCT/US2018/039352, mailed Oct. 26, 2018, 8 Pages.
International Search Report and Written Opinion for International Application No. PCT/US2018/039431, mailed Nov. 7, 2018, 12 Pages.
International Search Report and Written Opinion for International Application No. PCT/US2020/058097, mailed Feb. 12, 2021, 09 Pages.

(56) References Cited

OTHER PUBLICATIONS

International Search Report and Written Opinion for International Application No. PCT/US2021/031201, mailed Aug. 2, 2021, 13 Pages.
International Search Report and Written Opinion for International Application No. PCT/US2021/033321, mailed Sep. 6, 2021, 11 pages.
Millet L., et al., "A 5500-Frames/s 85-GOPS/W 3-D Stacked BSI Vision Chip Based on Parallel In-Focal-Plane Acquisition and Processing," IEEE Journal of Solid-State Circuits, USA, Apr. 1, 2019, vol. 54 (4), pp. 1096-1105, XP011716786.
Non-Final Office Action mailed Jul. 10, 2020 for U.S. Appl. No. 16/255,528, filed Jan. 23, 2019, 27 Pages.
Non-Final Office Action mailed Nov. 23, 2018 for U.S. Appl. No. 15/847,517, filed Dec. 19, 2017, 21 Pages.
Non-Final Office Action mailed Jul. 25, 2019 for U.S. Application No. 15/909,162, filed Mar. 1, 2018, 20 Pages.
Notice of Allowance mailed Apr. 1, 2021 for U.S. Appl. No. 16/255,528, filed Jan. 23, 2019, 7 Pages.
Notice of Allowance mailed Mar. 18, 2020 for U.S. Appl. No. 15/909,162, filed Mar. 1, 2018, 9 Pages.
Office Action mailed Jul. 3, 2020 for Chinese Application No. 201810821296, filed Jul. 24, 2018, 17 Pages.
Office Action mailed Mar. 9, 2021 for Chinese Application No. 201810821296, filed Jul. 24, 2018, 10 Pages.
Office Action mailed Jun. 28, 2020 for Chinese Application No. 201810821296, filed Jul. 24, 2018, 2 Pages.
Partial European Search Report for European Application No. 18179838.0, mailed Dec. 5, 2018, 13 Pages.
Sebastian A., et al., "Memory Devices and Applications for In-memory Computing," Nature Nanotechnology, Nature Publication Group, Inc, London, Mar. 30, 2020, vol. 15 (7), pp. 529-544, XP037194929.
Shi C., et al., "A 1000fps Vision Chip Based on a Dynamically Reconfigurable Hybrid Architecture Comprising a PE Array and Self-Organizing Map Neural Network," International Solid-State Circuits Conference, Session 7, Image Sensors, Feb. 10, 2014, pp. 128-130, XP055826878.
Corrected Notice of Allowance mailed Mar. 22, 2022 for U.S. Appl. No. 16/716,050, filed Dec. 16, 2019, 2 Pages.
Non-Final Office Action mailed Mar. 2, 2022 for U.S. Appl. No. 17/127,670, filed Dec. 18, 2020, 18 pages.
Notice of Allowance mailed Feb. 7, 2022 for U.S. Appl. No. 17/324,803, filed May 19, 2021, 8 pages.
Notice of Allowance mailed Mar. 7, 2022 for U.S. Appl. No. 16/421,441, filed May 23, 2019, 18 pages.
Notice of Allowance mailed Mar. 11, 2022 for U.S. Appl. No. 16/716,050, filed Dec. 16, 2019, 13 pages.
Notice of Allowance mailed Apr. 20, 2022 for U.S. Appl. No. 17/083,920, filed Oct. 29, 2020, 06 pages.
Office Action mailed Apr. 5, 2022 for European Patent Application No. 19731047.7, filed May 24, 2019, 7 pages.
Invitation to Pay Additional Fees and Where Applicable, Protest Fee for International Application No. PCT/US2021/041775, Oct. 8, 2021, 12 pages.
Notice of Allowance mailed Jun. 2, 2022 for U.S. Appl. No. 16/716,050, filed Dec. 16, 2019, 13 pages.
Notice of Allowance mailed May 23, 2022 for U.S. Appl. No. 17/324,803, filed May 19, 2021, 9 pages.
Notice of Allowance mailed Jun. 24, 2022 for U.S. Appl. No. 16/421,441, filed May 23, 2019, 17 pages.
Notice of Allowance mailed Jun. 3, 2022 for U.S. Appl. No. 17/324,803, filed May 19, 2021, 6 pages.
Office Action mailed Aug. 11, 2022 for European Patent Application No. 19731047.7, filed May 24, 2019, 10 pages.
Final Office Action mailed Oct. 6, 2022 for U.S. Appl. No. 17/127,670, filed Dec. 18, 2020, 20 pages.
International Search Report and Written Opinion for International Application No. PCT/US2022/034259, mailed Oct. 21, 2022, 10 pages.
Non-Final Office Action mailed Nov. 2, 2022 for U.S. Appl. No. 16/983,863, filed Aug. 3, 2020, 20 pages.
Notice of Allowance mailed Sep. 6, 2022 for U.S. Appl. No. 16/421,441, filed May 23, 2019, 17 pages.
Notice of Allowance mailed Sep. 8, 2022 for U.S. Appl. No. 17/324,803, filed May 19, 2021, 8 pages.
Notice of Allowance mailed Sep. 9, 2022 for U.S. Appl. No. 17/083,920, filed Oct. 29, 2020, 10 pages.
Notice of Allowance mailed Sep. 9, 2022 for U.S. Appl. No. 17/091,331, filed Nov. 6, 2020, 2 pages.
Notice of Allowance dated Sep. 19, 2022 for U.S. Appl. No. 16/716,050, filed Dec. 16, 2019, 13 pages.
Notice of Allowance mailed Aug. 24, 2022 for U.S. Appl. No. 17/091,331, filed Nov. 6, 2020, 9 pages.
Notice of Allowance mailed Sep. 28, 2022 for U.S. Appl. No. 16/716,050, filed Dec. 16, 2019, 6 pages.
Office Action dated Aug. 17, 2022 for Chinese Application No. 201980083991.5, filed Jun. 17, 2021, 24 pages.
Office Action mailed Jul. 29, 2022 for Taiwan Application No. 108118209, filed May 27, 2019, 15 pages.
Non-Final Office Action mailed Feb. 2, 2023 for U.S. Appl. No. 17/469,258, filed Sep. 8, 2021, 17 pages.
Non-Final Office Action mailed Mar. 6, 2023 for U.S. Appl. No. 17/992,648, filed Nov. 22, 2022, 24 pages.
Notice of Allowance mailed Feb. 7, 2023 for U.S. Appl. No. 17/083,920, filed Oct. 29, 2020,10 pages.
Notice of Allowance mailed Feb. 8, 2023 for U.S. Appl. No. 17/324,803, filed May 19, 2021, 8 pages.
Notice of Allowance mailed Jan. 26, 2023 for U.S. Appl. No. 16/716,050, filed Dec. 16, 2019, 14 pages.
Office Action mailed Feb. 11, 2023 for Chinese Application No. 201980048866.0, filed May 24, 2019, 20 Pages.
Office Action mailed Feb. 13, 2023 for Taiwan Application No. 108146255, filed Dec. 17, 2019, 30 pages.
Amir M.F., et al., "NeuroSensor: A 3D Image Sensor with Integrated Neural Accelerator," IEEE SOI-3D-Subthreshold Microelectronics Technology Unified Conference (S3S), Oct. 2016, pp. 1-2.
Corrected Notice of Allowance mailed Apr. 18, 2023 for U.S. Appl. No. 17/127,670, filed Mar. 5, 2021,2 pages.
Final Office Action mailed Apr. 12, 2023 for U.S. Appl. No. 16/983,863, filed Aug. 3, 2020, 21 pages.
International Search Report and Written Opinion for International Application No. PCT/US2023/011630, mailed Apr. 6, 2023, 10 pages.
Non-Final Office Action mailed Jun. 30, 2023 for U.S. Appl. No. 17/556,436, filed Dec. 20, 2021, 25 pages.
Notice of Allowance mailed Jun. 7, 2023 for U.S. Appl. No. 16/716,050, filed Dec. 16, 2019, 18 pages.
Notice of Allowance mailed May 15, 2023 for U.S. Appl. No. 16/421,441, filed May 23, 2019, 10 pages.
Notice of Allowance mailed May 22, 2023 for U.S. Appl. No. 17/324,803, filed May 19, 2021, 5 pages.
Notice of Allowance mailed Mar. 27, 2023 for U.S. Appl. No. 17/127,670, filed Dec. 18, 2020,9 pages.
Notice of Allowance mailed Mar. 28, 2023 for U.S. Appl. No. 17/091,331, filed Nov. 6, 2020, 5 pages.
Office Action mailed Mar. 14, 2023 for Taiwan Application No. 108146257, filed Dec. 17, 2019, 25 pages.
Office Action mailed Mar. 23, 2023 for Chinese Application No. 201980083991.5, filed Jun. 17, 2021,21 pages.
Corrected Notice of Allowance mailed Oct. 13, 2023 for U.S. Appl. No. 17/324,803, filed May 19, 2021, 2 pages.
Devlin N.R., et al., "Patterning Decomposable Polynorbornene with Electron Beam Lithography to Create Nanochannels," Journal of Vacuum Science and Technology, vol. 27, No. 6,Dec. 1, 2009, pp. 2508-2511.
Dong J., et al., "Self-Assembly of Highly Stable Zirconium(IV) Coordination Cages with Aggregation Induced Emission Molecular Rotors for Live-Cell Imaging," Angewandte Chemie International Edition, vol. 59, No. 25,Jun. 15, 2020,10 pages.
Final Office Action mailed Sep. 25, 2023 for U.S. Appl. No. 17/469,258, filed Sep. 8, 2021, 17 pages.

(56) References Cited

OTHER PUBLICATIONS

International Preliminary Report on Patentability for International Application No. PCT/US2020/058439, mailed Jun. 23, 2022, 11 pages.
International Preliminary Report on Patentability for International Application No. PCT/US2020/059560, mailed Jun. 16, 2022, 8 pages.
International Preliminary Report on Patentability for International Application No. PCT/US2020/061218, mailed Jun. 9, 2022, 9 pages.
International Preliminary Report on Patentability for International Application No. PCT/US2020/062991, mailed Jul. 7, 2022, 8 pages.
International Preliminary Report on Patentability for International Application No. PCT/US2020/066992, mailed Jul. 7, 2022, 27 pages.
International Preliminary Report on Patentability for International Application No. PCT/US2021/014970, mailed Sep. 9, 2022, 7 pages.
International Preliminary Report on Patentability for International Application No. PCT/US2021/016158, mailed Aug. 18, 2022, 7 pages.
International Search Report and Written Opinion for International Application No. PCT/US2020/056758, mailed Feb. 17, 2021, 11 Pages.
International Search Report and Written Opinion for International Application No. PCT/US2020/058439, mailed Apr. 6, 2021, 16 Pages.
International Search Report and Written Opinion for International Application No. PCT/US2020/059560, mailed Feb. 9, 2021, 9 Pages.
International Search Report and Written Opinion for International Application No. PCT/US2020/061218, mailed Feb. 16, 2021, 11 pages.
International Search Report and Written Opinion for International Application No. PCT/US2020/062991, mailed Feb. 24, 2021, 9 Pages.
International Search Report and Written Opinion for International Application No. PCT/US2020/066992, mailed May 17, 2021, 31 Pages.
International Search Report and Written Opinion for International Application No. PCT/US2021/014970, mailed Apr. 26, 2021, 8 Pages.
Khaled S.R., "A Review of Piezoelectric Polymers as Functional Materials for Electromechanical Transducers," Smart Materials and Structures, IOP Publishing Ltd, Bristol, GB, Jan. 20, 2014 [retrieved on Jan. 20, 2014], vol. 23 (3), Article 33001,29 pages, XP020258249, ISSN: 0964-1726, DOI: 10.1088/0964-1726/23/3/033001.
Levola T., "Diffractive Optics for Virtual Reality Displays," Journal of the Society for Information Display—SID, May 2006, vol. 14 (5), pp. 467-475, XP008093627.
Non-Final Office Action mailed Jul. 22, 2021 for U.S. Appl. No. 16/834,605, filed Mar. 30, 2020, 12 pages.
Notice of Allowance mailed Nov. 1, 2023 for U.S. Appl. No. 17/091,331, filed Nov. 6, 2020, 7 pages.
Notice of Allowance mailed Sep. 12, 2023 for U.S. Appl. No. 17/324,803, filed May 19, 2021,2 pages.
Notice of Allowance mailed Oct. 13, 2023 for U.S. Appl. No. 16/421,441, filed May 23, 2019, 11 pages.
Notice of Allowance mailed Sep. 15, 2023 for U.S. Appl. No. 16/716,050, filed Dec. 16, 2019, 18 pages.
Notice of Allowance mailed Jul. 18, 2023 for U.S. Appl. No. 17/091,331, filed Nov. 6, 2020, 7 pages.
Notice of Allowance mailed Aug. 22, 2023 for U.S. Appl. No. 17/992,648, filed Nov. 22, 2022, 10 pages.
Notice of Allowance mailed Mar. 22, 2022 for U.S. Appl. No. 16/834,605, filed Mar. 30, 2020, 8 pages.
Notice of Allowance mailed Aug. 30, 2023 for U.S. Appl. No. 17/324,803, filed May 19, 2021, 5 pages.
Notice of Allowance mailed May 31, 2022 for U.S. Appl. No. 16/706,859, filed Dec. 9, 2019, 13 pages.
Office Action mailed Sep. 5, 2023 for Japanese Patent Application No. 2020-561752, filed on Nov. 2, 2020, 5 pages.
Office Action mailed Sep. 20, 2023 for Taiwan Application No. 109139740, filed Nov. 13, 2020, 17 pages.

* cited by examiner

PROGRAMMABLE PIXEL ARRAY

RELATED APPLICATION

This patent application claims priority to U.S. Provisional Patent Application Ser. No. 62/780,904, filed Dec. 17, 2018, entitled "DIGITAL PIXEL SENSOR ENABLING MULTIPLE INSTRUCTION MULTIPLE DATA OPERATION," which is assigned to the assignee hereof and is incorporated herein by reference in its entirety for all purposes.

BACKGROUND

The disclosure relates generally to image sensors, and more specifically to image sensors comprising a programmable pixel array.

A typical image sensor includes an array of pixel cells. Each pixel cell may include a photodiode to sense light by converting photons into charge (e.g., electrons or holes). The charge converted at each pixel cell can be quantized to become a digital pixel value, and an image can be generated from an array of digital pixel values. The operations of the array of pixel cells can be configured based on one or more chip-level programming signals that apply to all pixel cells within the array.

SUMMARY

The present disclosure relates to image sensors. More specifically, and without limitation, this disclosure relates to an image sensor having a programmable pixel cell array.

In one example, an apparatus is provided. The apparatus includes an array of pixel cells and a peripheral circuit. Each pixel cell of the array of pixel cells includes: a memory to store pixel-level programming data and measurement data, and light measurement circuits configured to, based on the pixel-level programming data from the control memory, perform a light measurement operation to generate the measurement data, and to store the measurement data at the data memory. The peripheral circuit is configured to: receive a pixel array programming map including pixel-level programming data targeted at each pixel cell; extract the pixel-level programming data from the pixel array programming map; and transmit the pixel-level programming data to each pixel cell of the array of pixel cells for storage at the memory of the each pixel cell and to individually control the light measurement operation and a generation of the measurement data at the each pixel cell.

In some aspects, each pixel cell of the array of pixel cells is individually addressable. The peripheral circuit is configured to: extract first pixel-level programming data for a first pixel cell of the array of pixel cells from the pixel array programming map; extract second pixel-level programming data for a second pixel cell of the array of pixel cells from the pixel array programming map; generate a first address based on the first programming data; generate a second address based on the second pixel-level programming data; select, based on the first address, the memory of the first pixel cell to receive the first programming data; and select, based on the second address, the memory of the second pixel cell to receive the second pixel-level programming data.

In some aspects, the pixel array programming map comprises an array of pixel-level programming data. The first address is generated based on a location of the first pixel-level programming data within the array of pixel-level programming data. The second address is generated based on a location of the second pixel-level programming data within the array of pixel-level programming data.

In some aspects, the peripheral circuit is configured to transmit a chip-level programming signal to at least a subset of the array of pixel cells including a first pixel cell. The light measurement circuits of the first pixel cell are configured to, based on the pixel-level programming data, either perform the light measurement operation based on the chip-level programming signal or based on the pixel-level programming data.

In some aspects, the light measurement circuits of the first pixel cell include a multiplexor controllable by at least a first subset of the pixel-level programming data to select the chip-level programming signal or at least a second subset of the pixel-level programming data as output. The light measurement circuits of the first pixel cell is configured to perform the light measurement operation based on the output of the multiplexor.

In some aspects, the chip-level programming signal is a first chip-level programming signal. The peripheral circuit is configured to transmit a second chip-level programming signal to the subset of the array of pixel cells including the first pixel cell. The multiplexor is a first multiplexor. The output is a first output and controls a first operation of a first component of the measurement circuits as part of the light measurement operation. The light measurement circuits further comprise a second multiplexor controllable by at least the first subset of the pixel-level programming data to select the second chip-level programming signal or at least a third subset of the pixel-level programming data as second output. The second output controls a second operation of a second component of the measurement circuits as part of the light measurement operation.

In some aspects, the first multiplexor and the second multiplexor are controllable by different bits of the first subset of the pixel-level programming data.

In some aspects, the chip-level programming signal sets a first quantity of current to be consumed by each of the subset of array of pixel cells during the light measurement operation. The pixel-level programming data sets a second quantity of current to be consumed by the first pixel cell during the light measurement operation, and whether to override the first quantity set by the chip-level programming signal.

In some aspects, the light measurement circuits comprise a comparator. The chip-level programming signal sets a first bias of the comparator. The pixel-level programming data sets a second bias of the comparator.

In some aspects, the light measurement circuits include a photodiode. The chip-level programming signal sets a first exposure period in which the photodiode of each of the subset of array of pixel cells generates charge in response to light for the light measurement operation. The pixel-level programming data sets a second exposure period in which the photodiode of the first pixel cell generates charge in response to light for the light measurement operation, and whether to override the first exposure period set by the chip-level programming signal.

In some aspects, the light measurement circuits include a photodiode. The chip-level programming signal indicates a first quantization operation and a second quantization operation to be performed by the light measurement circuits of each of the subset of array of pixel cells to quantize the charge generated by the photodiode to generate the measurement data, the first quantization operation and the second quantization operation being associated with different intensity ranges. The pixel-level programming data indicates that the light measurement circuits of the first pixel cell are to perform the second quantization operation to generate the measurement data, and whether to override the chip-level programming signal.

In some aspects, the chip-level programming signal indicates that each of the subsets of the array of pixel cells to store the measurement data at the memory for a first frame. The pixel-level programming data indicate that the light measurement circuits of the first pixel cell are not to store the measurement data at the memory for the first frame, and whether to override the chip-level programming signal.

In some aspects, the chip-level programming signal sets a first number of bits of the measurement data to be stored at the memory. The pixel-level programming data set a second number of bits of the measurement data to be stored at the memory, and whether to override the chip-level programming signal.

In some aspects, the light measurement operation is a first light measurement operation. The memory of a first pixel cell of the array of pixel cells includes a shift register configured to store at least a first subset and a second subset of the pixel-level programming data. The peripheral circuit is configured to transmit a shift signal to the shift register of the first pixel cell to cause the shift register to output the first subset of the pixel-level programming data at a first time and the second subset of the pixel-level programming data at a second time. The light measurement circuits of the first pixel cell are configured to perform a first light measurement operation based on the first subset of the pixel-level programming data at the first time and perform a second light measurement operation based on the second subset of the pixel-level programming data at the second time.

In some aspects, the memory of the each pixel cell of the array of pixel cells includes the shift register to store the pixel-level programming data. The peripheral circuit is configured to transmit the shift signal to the shift register of the each pixel cell to: at the first time, cause the each pixel cell to perform the first light measurement operation; and at the second time, cause a first subset of the array of pixel cells to perform the second light measurement operation and a second subset of the array of pixel cells not to perform the second light measurement operation.

In some aspects, the pixel-level programming data is first pixel-level programming data. The memory of a second pixel cell of the array of pixel cells includes a shift register configured to store subsets of second pixel-level programming data. The peripheral circuit is configured to transmit the shift signal to the shift register of the first pixel cell, and a propagation signal to the shift register of the second pixel cell, to propagate the first subset and the second subset of the first pixel-level programming data to the shift register of the second pixel cell for storage as the subsets of the second pixel-level programming data.

In some aspects, the memory of the each pixel cell of the array of pixel cells includes the shift register to store the pixel-level programming data. The peripheral circuit is configured to transmit the shift signal to the shift register of the each pixel cell to: at the first time, cause a first subset of the array of pixel cells to perform the first light measurement operation to generate a first frame, the first subset of the array of pixel cells corresponding to a region-of-interest (ROI) in the first frame; and at the second time, cause a second subset of the array of pixel cells to perform the second light measurement operation to generate a second frame, the second subset of the array of pixel cells corresponding to the ROI in the second frame.

In some aspects, the pixel array programming map is a first pixel array programming map including first pixel-level programming data targeted at the each pixel cell. The light measurement operation is a first light measurement operation. The peripheral circuit is configured to: receive the first pixel array programming map including the first programming data targeted at each pixel cell, transmit the first pixel-level programming data to the each pixel cell to control the first light measurement operation at the each pixel cell to generate a first frame; receive a second pixel array programming map including second pixel-level programming data targeted at each pixel cell, and transmit second pixel-level programming data to the each pixel cell to control a second light measurement operation at the each pixel cell to generate a second frame.

In some aspects, each entry of the second pixel array programming map includes an indication of whether the second pixel-level programming data stored at the each entry represents a difference from a corresponding entry of the first pixel array programming map, and the second pixel-level programming data.

In some examples, a method is provided. The method comprises: receiving a pixel array programming map including pixel-level programming data targeted at each pixel cell of an array of pixel cells; extracting the pixel-level programming data from the pixel array programming map; and transmitting the pixel-level programming data to the each pixel cell for storage at a memory accessible by the each pixel cell and to individually control a light measurement operation and a generation of the measurement data at the each pixel cell.

BRIEF DESCRIPTION OF THE DRAWINGS

Illustrative embodiments are described with reference to the following figures.

Figure 1A:
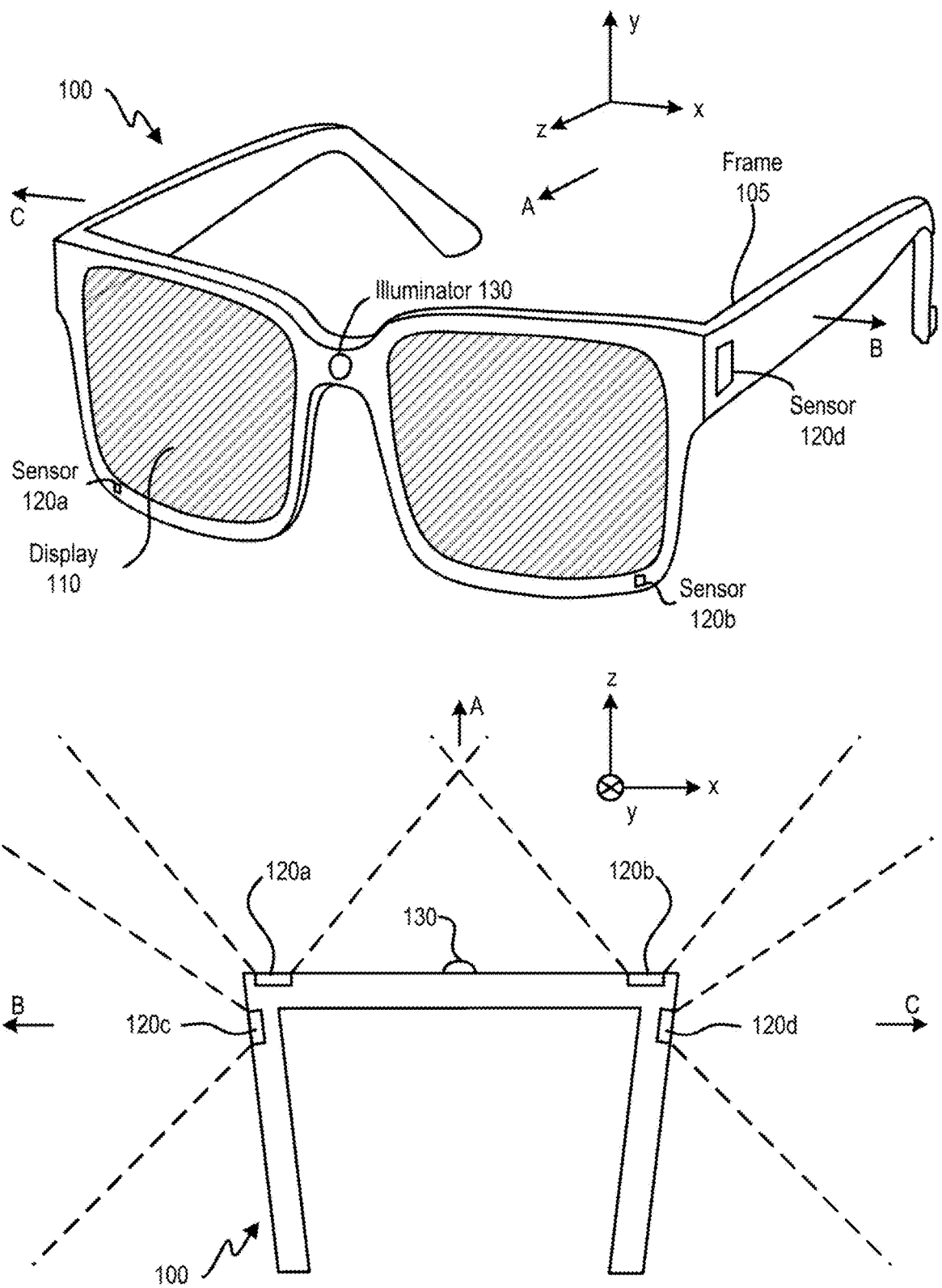
FIG. 1A and FIG. 1B are diagrams of an embodiment of a near-eye display.

The figures depict embodiments of the present disclosure for purposes of illustration only. One skilled in the art will readily recognize from the following description that alternative embodiments of the structures and methods illustrated may be employed without departing from the principles of, or benefits touted in, this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive.

An image sensor includes an array of pixel cells. Each pixel cell includes circuit components to perform a light sensing operation. For example, each pixel cell may include a photodiode to sense incident light by converting photons into charge (e.g., electrons or holes) and a charge sensing unit (e.g., a floating drain and a buffer) to convert the charge into a voltage. The image sensor may also include one or more analog-to-digital converters (ADCs) to quantize the voltages output by the charge sensing units of the pixel cells into digital values. The ADC can quantize the charge by, for example, using a comparator to compare a voltage representing the charge with one or more quantization levels, and a digital value can be generated based on the comparison result. The digital values can then be stored in a memory to generate the image. An image sensor typically includes a controller to send out one or more chip-level programming signals to configure the operations of the pixel cells of the image sensor. For example, the controller can turn on or off all the pixel cells of the image sensor, set a global exposure time in which the pixel cells perform light sensing operations, etc.

The pixel data from an image sensor can support various applications, such as fusion of 2D and 3D sensing, object recognition and tracking, location tracking, etc. These applications can extract feature information from a subset of pixels of the image to perform computations. For example, to perform 3D sensing, an application can identify pixels of reflected structured light (e.g., dots), compare a pattern extracted from the pixels with the transmitted structured light, and perform depth computation based on the comparison. The application can also identify 2D pixel data from the same pixel cells that provide the extracted pattern of structured light to perform fusion of 2D and 3D sensing. To perform object recognition and tracking, an application can also identify pixels of image features of the object, extract the image features from the pixels, and perform the recognition and tracking based on the extraction results. The object recognition and tracking results can support higher level applications, such as a simultaneous localization and mapping (SLAM) application, a hand tracking application, etc. These applications are typically executed on a host processor, which can be electrically connected with the image sensor and receive the pixel data via interconnects. The host processor, the image sensor, and the interconnects can be part of a mobile device.

While these host applications can benefit from the image data generated by the array of pixel cells, these applications typically do not configure the generation of the image data as well as the light sensing operations of these pixel cells. Moreover, the array of pixel cells of an image sensor are typically configured by chip-level programming signals. Such an image sensor typically only provides array-scale configuration of the pixel cells, but does not allow fine-grain configuration (e.g., at the pixel level, or subset of pixels) of the pixel cells.

The lack of input from the host applications on the configuration of the pixel cells, as well as the lack of fine-grain configuration of the pixel cells, can impose limits on the achievable performance of the image sensor and these applications. For example, the host applications can benefit from high-resolution images and/or high frame rates. Higher-resolution images allow the application to extract more detailed features/patterns (e.g., more refined patterns of reflected structured light, more detailed image features, etc.), whereas providing images generated at a higher frame rate enables an application to track the location of an object, the location of the mobile device, etc., at a higher sampling rate, both processes of which can improve the performances of the applications. However, high-resolution images and high frame rates can lead to generation, transmission, and processing of a large volume of pixel data, which can present numerous challenges. For example, transmitting and processing a large volume of pixel data at a high data rate can lead to high power consumption at the image sensor, the interconnect, and the host processor. Moreover, the image sensor and the host processor may impose bandwidth limitations on and add latency to the generation and processing of large volumes of pixel data. The high power and high bandwidth requirement can be especially problematic for a mobile device which tends to operate with relatively low power and at a relatively low speed due to form factor and safety considerations.

In addition to transmitting a large volume of pixel data, the lack of fine-grain configuration of the pixel cells array may also lead to waste of power, which is also problematic for a mobile device. For example, to support high resolution image generation, all the pixel cells of an image sensor may be turned on and configured with the same setting (e.g., same exposure time, same ADC resolution, etc.) to generate the high resolution image, but in fact only a subset of the pixel cells generates pixel data of interest to the host application. For example, the host application may be tracking an object, and only a small subset of the pixel cells generates pixel data of the object, while the pixel data output by the rest of the pixel cells may be discarded or at least are not important to the host application. As a result, the power spent on generating those pixel data at a high resolution and/or at a high frame rate is wasted. As the amount of power available at a mobile device is very limited, the lack of fine-grain configuration of the pixel cells can force the pixel cells to generate pixel data at a lower resolution and/or at a lower frame rate, which can limit the achievable performance of the image sensor and the host application.

This disclosure relates to an image sensor that can address at least some of the issues above. The image sensor comprises an array of pixel cells and a peripheral circuit. The image sensor can be electrically connected to a host processor via an interconnect. The image sensor, the host processor, and the interconnect can be included in a mobile device.

Each pixel cell of the array of pixel cells includes a memory to store pixel-level programming data and measurement data, as well as measurement circuits configured to, based on the pixel-level programming data from the control memory, perform a light measurement operation to generate the measurement data, and to store the measurement data at the memory. The measurement circuits may include a photodiode to generate charge in response to light, a charge sensing unit to convert the charge to a voltage, and a quantizer to quantize the voltage to the measurement data. The peripheral circuit can also receive a pixel array programming map including pixel-level programming data targeted at each pixel cell of the array of pixel cells, and configure the light measurement operation at the each pixel cell based on the programming data targeted at the each pixel cell.

In some examples, each pixel cell of the array of pixel cells is individually addressable. Each pixel cell may be connected to a row bus and a column bus, and is assigned a row address and a column address based on the location of the pixel cell in the column bus and in the row bus. Each pixel cell is also connected with one or more signal buses. Each pixel-level programming data of the pixel array programming map is also associated with a row address and a column address of the target pixel cell. To transmit pixel-level programming data to a specific pixel cell, the peripheral circuit can extract the pixel-level programming data from the pixel array programming map, and transmit the extracted pixel-level programming data on the one or more signal buses as well as the row and column addresses of the target pixel cell on the row and column buses. The target pixel cell can receive the pixel-level programming data from the one or more signal buses based on having the matching row and column addresses, store the pixel-level programming data at the memory, and perform a light measurement operation and measurement data generation based on the pixel-level programming data from the memory. In a programming operation, the peripheral circuit can extract the pixel-level programming data for each pixel cell from the pixel array programming map and transmit the pixel-level programming data as well as the row and column addresses of the each pixel cell to, respectively, the signal buses, the row buses, and the column buses, to individually program the light measurement operation and measurement data generation at the each pixel cell.

In some examples, a static pixel array programming map can be provided to configure the light measurement operation and measurement data generation at the pixel cells across multiple image frames. In such a case, the individual pixel-level programming data of a pixel array programming map for each pixel cell can be stored in the memory of the each pixel cell to configure the generation of the multiple image frames. In some examples, the pixel array programming map can also be dynamically updated between frames so that the light measurement operation and measurement data generation at the pixel cells are configured differently for different frames.

The pixel-level programming data stored at the memory of the pixel cell can control various aspects of the light measurement operation and measurement data generation. In some examples, the pixel cell may include power gates controllable by the pixel-level programming data to individually disable/enable the light measurement operation and measurement data generation of the pixel cell. In some examples, the pixel-level programming data can also configure various components of the measurement circuits, such as setting the exposure time in which the photodiode generates charge, selecting one or more quantization operations to be performed by the quantizer, setting the bandwidth and/or quantization resolution of the quantizer, controlling whether the memory stores the measurement data, controlling a precision (e.g., a number of bits) of the measurement data stored at the memory, etc. In some examples, the pixel-level programming data can include a single bit to select one configuration out of two alternative configurations for each of these components. For example, the pixel-level programming data can select between two exposure period settings, two quantization bandwidth/resolution settings, two measurement data precision settings, etc. In some examples, the pixel-level programming data can include multiple bits to specify a configuration value for each of these components. In some examples, the pixel-level programming data can also include only a single bit to select between two operation modes, with each operation mode having a different set of configurations for these components. In these examples, the collection of bits, or the single bit, can form an instruction, and various permutations of the bit values can form an instruction set supported by the pixel cell. In a case where the pixel-level programming data includes m bits, the instruction set may include up to $2^m$ instructions.

The pixel-level programming data in the pixel array programming map can individually configure the light measurement operation and/or measurement data generation at each pixel cell to facilitate the operation of a host application. In some examples, to support an object tracking application at the host, the pixel array programming map can cause a subset of pixel cells within a region of interest (ROI) that captures an image of the object to be powered on, while the rest of the pixels that are outside the ROI are powered off, to reduce the power and the amount of pixel data transmitted to the host. In some examples, the pixel array programming map can also stagger the storage of the measurement data at different subsets of pixel cells across different exposure periods. Such arrangements allow the array of pixel cells to generate an image frame where different regions are captured at different exposure periods, to reduce the amount of pixel data transmitted to the host.

In another example, instead of completely powering off the pixel cells, the programming map can reduce the quantization resolution of the pixel cells outside the ROI, while maximizing the quantization resolution of the pixel cells within the ROI. Such arrangements allow the host to extract information from the pixel cells that are supposedly outside the ROI to confirm that the ROI is valid, which can improve the tracking operation. In some examples, the programming map can be generated by the host application as part of a feedback process, in which the host application determines an ROI from a full resolution image generated by the image sensor, generates the programming map based on the ROI, and transmits the programming map to the peripheral circuit to individually configure each pixel cell based on whether the pixel cell is within the ROI. The host application can continuously update the ROI and the programming map based on subsequent image data provided by the image sensor.

Besides object tracking, the programming map can also be used to adapt the light measurement operation and/or measurement data generation at the pixel cells to, for example, a scene, or a particular application. The adaption can be based on, for example, adjusting the exposure time, quantizer bandwidth, quantization resolution, etc. For example, from the image data provided by the image sensor, the host application may determine that a subset of the pixel cells is exposed to strong light. The host application can generate the programming map to reduce the exposure time for the subset of pixel cells as part of an adaptive exposure scheme to reduce the likelihood of blooming by those pixel cells. Moreover, the host application may require the frames to be generated at a higher frame rate, and can reduce the exposure time and/or increase the quantizer bandwidth of the pixel cells to achieve the higher frame rate.

In some examples, the quantizer may support multiple quantization operations for different light intensity ranges, such as the time-to-saturation (TTS) mode to measure a time for a quantity of charge generated by the photodiode to exceed a saturation limit for high light intensity, and a FD ADC mode to measure a quantity of overflow charge by the photodiode for a medium light intensity, and a PD ADC mode to measure a quantity of residual charge accumulated at the photodiode for a low light intensity. Based on pixel values of an image captured by the image sensor, the host application may determine a distribution of intensity ranges of light received by the pixel cells, and select the quantization mode for each pixel cell based on the distribution of intensity ranges. The selection can be encoded in the programming map as part of an adaptive quantization scheme to select one or more quantization operations for each pixel cell based on an expected intensity of light received by the each pixel cell.

In some examples, from a sequence of image frames, the host application may determine that the scene is static. The host application can then generate the programming map to reduce the frame rate based on, for example, reducing the bandwidth of the quantizer, the rate at which the memory updates the measurement data, etc., to reduce power and to reduce the amount of pixel data sent to the host.

In some examples, the image sensor further includes a chip-level programming signal generator which can generate chip-level programming signals. The chip-level programming signal generator can transmit the chip-level programming signals to all pixel cells to configure their light measurement operation and measurement data operations. The pixel-level programming data stored at each pixel cell can gate and override the chip-level programming signals. For example, the chip-level programming signals can set a global exposure time for all pixel cells, a global set of quantization operations to be performed by all pixel cells, a global quantization resolution and/or bandwidth, a global precision of measurement data to be stored at the memory of each pixel cell, etc. Each pixel cell can include a plurality of multiplexors controllable by the pixel-level programming data which accept these global signals as inputs. A first subset of the pixel-level programming data locally stored at the pixel cell can control the multiplexors to either pass these chip-level programming signals to different components of the light measurement circuits of the pixel cell, or pass a second subset of the pixel-level programming data to override these chip-level programming signals.

In some examples, part of the memory of each pixel cell can be configured as a shift register to store the pixel-level programming data. In response to a global shift signal from the peripheral circuit, the shift register at the each pixel cell can shift the pixel-level programming data and output different subset of bits of the pixel-level programming data at different times. Each subset of bits of the pixel-level programming data can define a different set of configurations for the light measurement operation and measurement data generation at the pixel cell. Such arrangements allow configuring the pixel cells sequentially while reducing the number of programming maps received by the peripheral circuit and the number of programming operations performed by the peripheral circuit. For example, in one programming operation, the peripheral circuit can transmit pixel-level programming data that define a sequence of instructions that define a sequence of configurations to each pixel cell. Each pixel cell can then shift out part of the pixel-level programming data sequentially to obtain the sequence of instructions/configurations.

The sequential configuration of the pixel cells can facilitate the operations of multiple host applications that not only access the outputs of the pixel cells but also have different configuration requirements for the pixel cells. For example, the host may operate a SLAM application and a hand-tracking application simultaneously. Both applications may use the image frames output by the pixel cells, but each has a different configuration requirement for the pixel cells. For example, the SLAM application may require a lower frame rate but full resolution image frames, whereas the hand-tracking application may require a higher frame rate but only operate on an ROI of the image frame. To support both applications, the programming map can include pixel-level programming data having a first subset of bits to configure the pixel cells for the SLAM application (e.g., all pixel cells enabled but each operating the quantizer at a lower speed) and a second subset of bits to configure the pixel cells for the hand-tracking application (e.g., only a subset of pixel cells corresponding to the ROI is enabled, and each enabled pixel cell operates the quantizer at a higher speed). The peripheral circuit can transmit the pixel-level programming data of the programming map to the pixel cells in a single programming operation for storage in the shift register of each pixel cell. The peripheral circuit can also transmit a shift signal to the shift register of the each pixel cell to shift the pixel-level programming data to alternate between outputting the first subset of bits and the second subset of bits of the pixel-level programming data, which can in turn configure the pixel cell for the SLAM application and for the hand-tracking application at different times. The host can update the programming map based on, for example, a change in the location and/or the size of the ROI, and the peripheral circuit can transmit updated pixel-level programming data to the pixel cells in a subsequent programming operation.

In some examples, the shift registers of multiple pixel cells can be connected to form a shift register that spans across the multiple pixel cells, which allows pixel-level programming data to be propagated from one pixel cell to another pixel cell. Such arrangements can provide a spatial shift in the pixel cell programming with respect to time without requiring the peripheral circuit to perform another programming operation. In some examples, such arrangements allow shifting of an ROI, as well as the subset of pixels designated as part of the ROI, to account for a movement of an object being tracked by the ROI.

In some examples, each pixel cell may further include digital logic which can combine with the memory to form a local state machine to manipulate at least one of the pixel-level programming data or the measurement data. Various operations can be supported by the local state machine, such as an adaptive exposure period. For example, the pixel-level programming data may reduce or increase the exposure period of a pixel cell with respect to a default exposure period, and the local state machine can scale up or down the measurement data to account for the adjusted exposure period. As another example, based on the measurement data obtained in an exposure period set by the pixel-level programming data, the digital logic may determine that the exposure period set by the pixel-level programming data is too long or too short, and can adjust the pixel-level programming data to set the next exposure period for generation of the next frame.

With the disclosed techniques, each pixel cell of the image sensor can be individually configured according to the requirement of a specific host application. Moreover, as the host can generate a programming map to individually configure the pixel cells based on outputs of the host applications, the operation of the image sensor can be more tightly coupled with the host application. Moreover, by storing the pixel-level programming data locally at the each pixel cell, the programming operations performed by the peripheral circuit can be reduced. Moreover, storing the pixel-level programming data in a shift register and allowing the pixel-level programming data to propagate from one pixel cell to another pixel cell also allow creation of sequences of instructions for different pixel cells from a single programming operation, which can further reduce the programming operations needed to adjust the operations at the pixel cells for the host applications. All these can improve the performance of the host applications while reducing the power and bandwidth of the overall system.

The disclosed techniques may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

FIG. 1A is a diagram of an embodiment of a near-eye display 100. Near-eye display 100 presents media to a user. Examples of media presented by near-eye display 100 include one or more images, video, and/or audio. In some embodiments, audio is presented via an external device (e.g., speakers and/or headphones) that receives audio information from the near-eye display 100, a console, or both, and presents audio data based on the audio information. Near-eye display 100 is generally configured to operate as a virtual reality (VR) display. In some embodiments, near-eye display 100 is modified to operate as an augmented reality (AR) display and/or a mixed reality (MR) display.

Near-eye display 100 includes a frame 105 and a display 110. Frame 105 is coupled to one or more optical elements. Display 110 is configured for the user to see content presented by near-eye display 100. In some embodiments, display 110 comprises a waveguide display assembly for directing light from one or more images to an eye of the user.

Near-eye display 100 further includes image sensors 120*a*, 120*b*, 120*c*, and 120*d*. Each of image sensors 120*a*, 120*b*, 120*c*, and 120*d* may include a pixel array configured to generate image data representing different fields of views along different directions. For example, sensors 120*a* and 120*b* may be configured to provide image data representing two fields of view towards a direction A along the Z axis, whereas sensor 120*c* may be configured to provide image data representing a field of view towards a direction B along the X axis, and sensor 120*d* may be configured to provide image data representing a field of view towards a direction C along the X axis.

In some embodiments, sensors 120*a*-120*d* can be configured as input devices to control or influence the display content of the near-eye display 100, to provide an interactive VR/AR/MR experience to a user who wears near-eye display 100. For example, sensors 120*a*-120*d* can generate physical image data of a physical environment in which the user is located. The physical image data can be provided to a location tracking system to track a location and/or a path of movement of the user in the physical environment. A system can then update the image data provided to display 110 based on, for example, the location and orientation of the user, to provide the interactive experience. In some embodiments, the location tracking system may operate a SLAM algorithm to track a set of objects in the physical environment and within a view of field of the user as the user moves within the physical environment. The location tracking system can construct and update a map of the physical environment based on the set of objects, and track the location of the user within the map. By providing image data corresponding to multiple fields of views, sensors 120*a*-120*d* can provide the location tracking system a more holistic view of the physical environment, which can lead to more objects to be included in the construction and updating of the map. With such an arrangement, the accuracy and robustness of tracking a location of the user within the physical environment can be improved.

In some embodiments, near-eye display 100 may further include one or more active illuminators 130 to project light into the physical environment. The light projected can be associated with different frequency spectrums (e.g., visible light, infra-red light, ultra-violet light, etc.), and can serve various purposes. For example, illuminator 130 may project light in a dark environment (or in an environment with low intensity of infra-red light, ultra-violet light, etc.) to assist sensors 120*a*-120*d* in capturing images of different objects within the dark environment to, for example, enable location tracking of the user. Illuminator 130 may project certain markers onto the objects within the environment, to assist the location tracking system in identifying the objects for map construction/updating.

In some embodiments, illuminator 130 may also enable stereoscopic imaging. For example, one or more of sensors 120*a* or 120*b* can include both a first pixel array for visible light sensing and a second pixel array for infra-red (IR) light sensing. The first pixel array can be overlaid with a color filter (e.g., a Bayer filter), with each pixel of the first pixel array being configured to measure the intensity of light associated with a particular color (e.g., one of red, green or blue colors). The second pixel array (for IR light sensing) can also be overlaid with a filter that allows only IR light through, with each pixel of the second pixel array being configured to measure intensity of IR lights. The pixel arrays can generate an RGB image and an IR image of an object, with each pixel of the IR image being mapped to each pixel of the RGB image. Illuminator 130 may project a set of IR markers on the object, the images of which can be captured by the IR pixel array. Based on a distribution of the IR markers of the object as shown in the image, the system can estimate a distance of different parts of the object from the IR pixel array, and generate a stereoscopic image of the object based on the distances. Based on the stereoscopic image of the object, the system can determine, for example, a relative position of the object with respect to the user, and can update the image data provided to display 100 based on the relative position information to provide the interactive experience.

As discussed above, near-eye display 100 may be operated in environments associated with a very wide range of light intensities. For example, near-eye display 100 may be operated in an indoor environment or in an outdoor environment, and/or at different times of the day. Near-eye display 100 may also operate with or without active illuminator 130 being turned on. As a result, image sensors 120a-120d may need to have a wide dynamic range to be able to operate properly (e.g., to generate an output that correlates with the intensity of incident light) across a very wide range of light intensities associated with different operating environments for near-eye display 100.

Figure 1B:
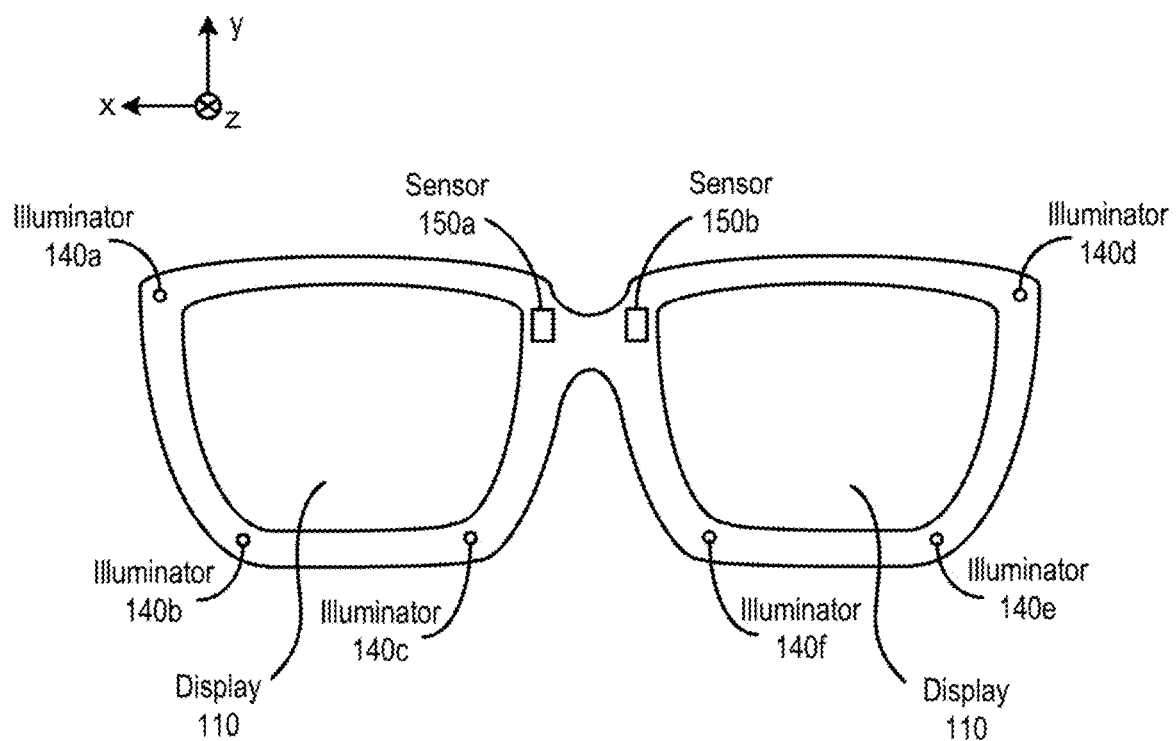

FIG. 1B is a diagram of another embodiment of near-eye display 100. FIG. 1B illustrates a side of near-eye display 100 that faces the eyeball(s) 135 of the user who wears near-eye display 100. As shown in FIG. 1B, near-eye display 100 may further include a plurality of illuminators 140a, 140b, 140c, 140d, 140e, and 140f. Near-eye display 100 further includes a plurality of image sensors 150a and 150b. Illuminators 140a, 140b, and 140c may emit lights of certain frequency range (e.g., NIR) towards direction D (which is opposite to direction A of FIG. 1A). The emitted light may be associated with a certain pattern, and can be reflected by the left eyeball of the user. Sensor 150a may include a pixel array to receive the reflected light and generate an image of the reflected pattern. Similarly, illuminators 140d, 140e, and 140f may emit NIR lights carrying the pattern. The NIR lights can be reflected by the right eyeball of the user, and may be received by sensor 150b. Sensor 150b may also include a pixel array to generate an image of the reflected pattern. Based on the images of the reflected pattern from sensors 150a and 150b, the system can determine a gaze point of the user, and update the image data provided to display 100 based on the determined gaze point to provide an interactive experience to the user.

As discussed above, to avoid damaging the eyeballs of the user, illuminators 140a, 140b, 140c, 140d, 140e, and 140f are typically configured to output lights of very low intensities. In a case where image sensors 150a and 150b comprise the same sensor devices as image sensors 120a-120d of FIG. 1A, the image sensors 120a-120d may need to be able to generate an output that correlates with the intensity of incident light when the intensity of the incident light is very low, which may further increase the dynamic range requirement of the image sensors.

Moreover, the image sensors 120a-120d may need to be able to generate an output at a high speed to track the movements of the eyeballs. For example, a user's eyeball can perform a very rapid movement (e.g., a saccade movement) in which there can be a quick jump from one eyeball position to another. To track the rapid movement of the user's eyeball, image sensors 120a-120d need to generate images of the eyeball at high speed. For example, the rate at which the image sensors generate an image frame (the frame rate) needs to at least match the speed of movement of the eyeball. The high frame rate requires short total exposure time for all of the pixel cells involved in generating the image frame, as well as high speed for converting the sensor outputs into digital values for image generation. Moreover, as discussed above, the image sensors also need to be able to operate at an environment with low light intensity.

Figure 1B:
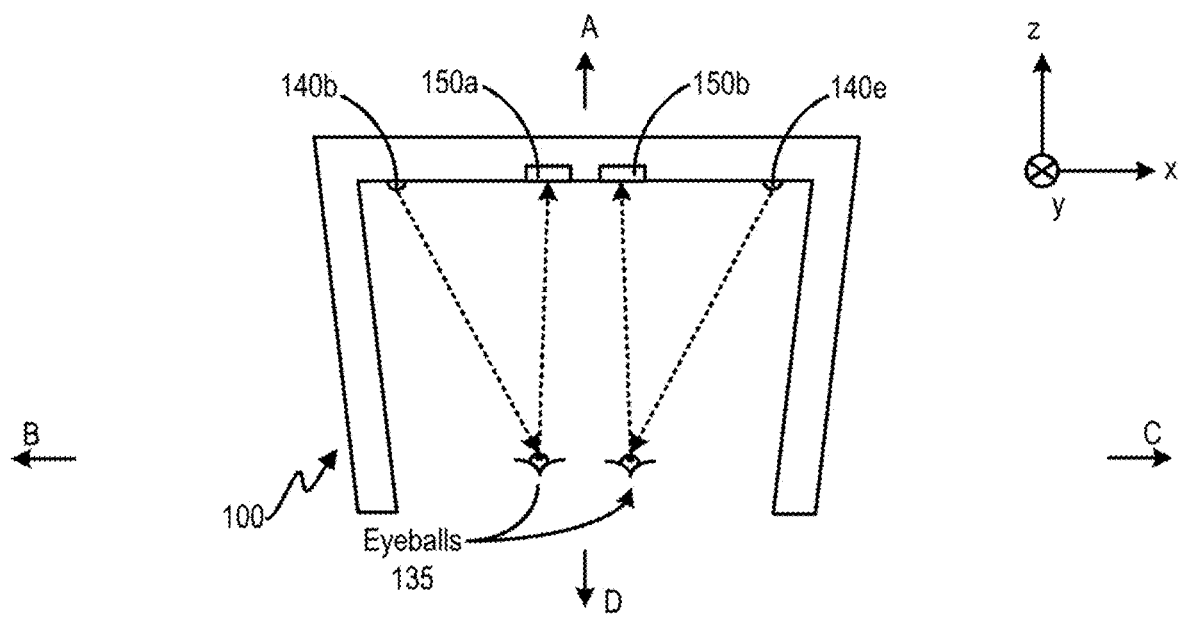
Figure 2:
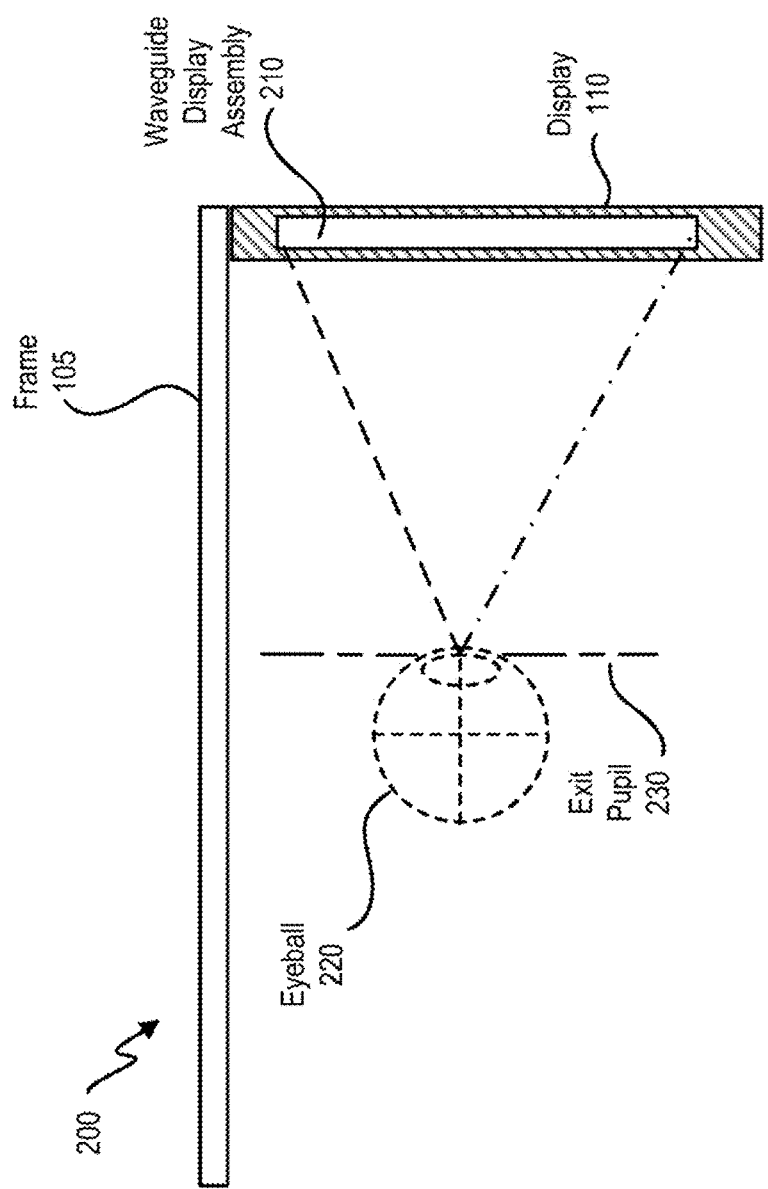
FIG. 2 is an embodiment of a cross section of the near-eye display.

FIG. 2 is an embodiment of a cross section 200 of near-eye display 100 illustrated in FIG. 1. Display 110 includes at least one waveguide display assembly 210. An exit pupil 230 is a location where a single eyeball 220 of the user is positioned in an eyebox region when the user wears the near-eye display 100. For purposes of illustration, FIG. 2 shows the cross section 200 associated eyeball 220 and a single waveguide display assembly 210, but a second waveguide display is used for a second eye of a user.

Waveguide display assembly 210 is configured to direct image light to an eyebox located at exit pupil 230 and to eyeball 220. Waveguide display assembly 210 may be composed of one or more materials (e.g., plastic, glass, etc.) with one or more refractive indices. In some embodiments, near-eye display 100 includes one or more optical elements between waveguide display assembly 210 and eyeball 220.

In some embodiments, waveguide display assembly 210 includes a stack of one or more waveguide displays including, but not restricted to, a stacked waveguide display, a varifocal waveguide display, etc. The stacked waveguide display is a polychromatic display (e.g., a red-green-blue (RGB) display) created by stacking waveguide displays whose respective monochromatic sources are of different colors. The stacked waveguide display is also a polychromatic display that can be projected on multiple planes (e.g., multi-planar colored display). In some configurations, the stacked waveguide display is a monochromatic display that can be projected on multiple planes (e.g., multi-planar monochromatic display). The varifocal waveguide display is a display that can adjust a focal position of image light emitted from the waveguide display. In alternate embodiments, waveguide display assembly 210 may include the stacked waveguide display and the varifocal waveguide display.

Figure 3:
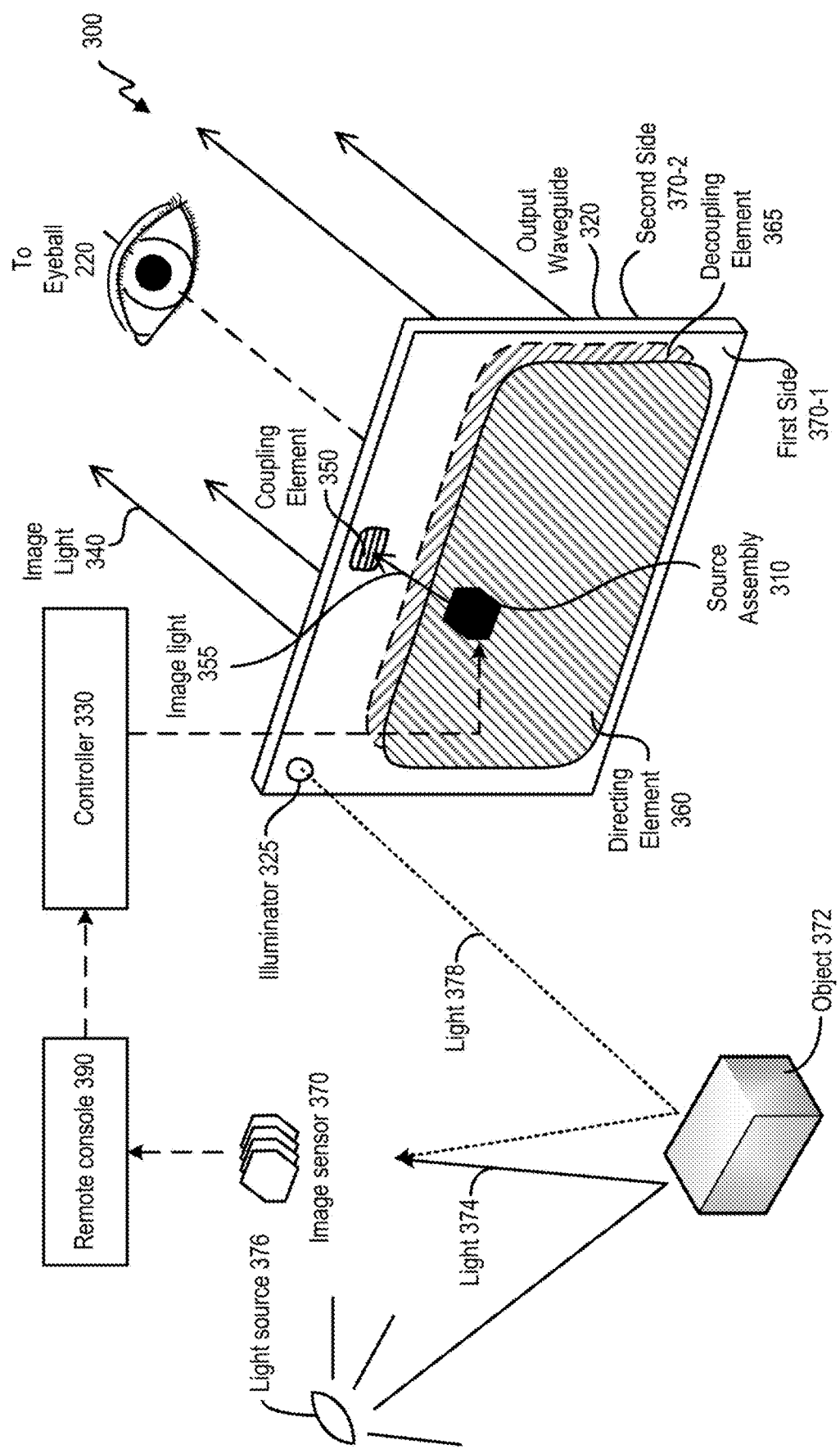
FIG. 3 illustrates an isometric view of an embodiment of a waveguide display with a single source assembly.

FIG. 3 illustrates an isometric view of an embodiment of a waveguide display 300. In some embodiments, waveguide display 300 is a component (e.g., waveguide display assembly 210) of near-eye display 100. In some embodiments, waveguide display 300 is part of some other near-eye display or other system that directs image light to a particular location.

Waveguide display 300 includes a source assembly 310, an output waveguide 320, and a controller 330. For purposes of illustration, FIG. 3 shows the waveguide display 300 associated with a single eyeball 220, but in some embodiments, another waveguide display separate, or partially separate, from the waveguide display 300 provides image light to another eye of the user.

Source assembly 310 generates image light 355. Source assembly 310 generates and outputs image light 355 to a coupling element 350 located on a first side 370-1 of output waveguide 320. Output waveguide 320 is an optical waveguide that outputs expanded image light 340 to an eyeball 220 of a user. Output waveguide 320 receives image light 355 at one or more coupling elements 350 located on the first side 370-1 and guides received input image light 355 to a directing element 360. In some embodiments, coupling element 350 couples the image light 355 from source assembly 310 into output waveguide 320. Coupling element 350 may be, e.g., a diffraction grating, a holographic grating, one or more cascaded reflectors, one or more prismatic surface elements, and/or an array of holographic reflectors.

Directing element 360 redirects the received input image light 355 to decoupling element 365 such that the received input image light 355 is decoupled out of output waveguide 320 via decoupling element 365. Directing element 360 is part of, or affixed to, first side 370-1 of output waveguide 320. Decoupling element 365 is part of, or affixed to, second side 370-2 of output waveguide 320, such that directing element 360 is opposed to the decoupling element 365.

Directing element 360 and/or decoupling element 365 may be, e.g., a diffraction grating, a holographic grating, one or more cascaded reflectors, one or more prismatic surface elements, and/or an array of holographic reflectors.

Second side 370-2 represents a plane along an x-dimension and a y-dimension. Output waveguide 320 may be composed of one or more materials that facilitate total internal reflection of image light 355. Output waveguide 320 may be composed of e.g., silicon, plastic, glass, and/or polymers. Output waveguide 320 has a relatively small form factor. For example, output waveguide 320 may be approximately 50 mm wide along x-dimension, 30 mm long along y-dimension and 0.5-1 mm thick along a z-dimension.

Controller 330 controls scanning operations of source assembly 310. The controller 330 determines scanning instructions for the source assembly 310. In some embodiments, the output waveguide 320 outputs expanded image light 340 to the user's eyeball 220 with a large field of view (FOV). For example, the expanded image light 340 is provided to the user's eyeball 220 with a diagonal FOV (in x and y) of 60 degrees and/or greater and/or 150 degrees and/or less. The output waveguide 320 is configured to provide an eyebox with a length of 20 mm or greater and/or equal to or less than 50 mm; and/or a width of 10 mm or greater and/or equal to or less than 50 mm.

Moreover, controller 330 also controls image light 355 generated by source assembly 310, based on image data provided by image sensor 370. Image sensor 370 may be located on first side 370-1 and may include, for example, image sensors 120a-120d of FIG. 1A. Image sensors 120a-120d can be operated to perform 2D sensing and 3D sensing of, for example, an object 372 in front of the user (e.g., facing first side 370-1). For 2D sensing, each pixel cell of image sensors 120a-120d can be operated to generate pixel data representing an intensity of light 374 generated by a light source 376 and reflected off object 372. For 3D sensing, each pixel cell of image sensors 120a-120d can be operated to generate pixel data representing a time-of-flight measurement for light 378 generated by illuminator 325. For example, each pixel cell of image sensors 120a-120d can determine a first time when illuminator 325 is enabled to project light 378 and a second time when the pixel cell detects light 378 reflected off object 372. The difference between the first time and the second time can indicate the time-of-flight of light 378 between image sensors 120a-120d and object 372, and the time-of-flight information can be used to determine a distance between image sensors 120a-120d and object 372. Image sensors 120a-120d can be operated to perform 2D and 3D sensing at different times, and provide the 2D and 3D image data to a remote console 390 that may be (or may be not) located within waveguide display 300. The remote console may combine the 2D and 3D images to, for example, generate a 3D model of the environment in which the user is located, to track a location and/or orientation of the user, etc. The remote console may determine the content of the images to be displayed to the user based on the information derived from the 2D and 3D images. The remote console can transmit instructions to controller 330 related to the determined content. Based on the instructions, controller 330 can control the generation and outputting of image light 355 by source assembly 310, to provide an interactive experience to the user.

Figure 4:
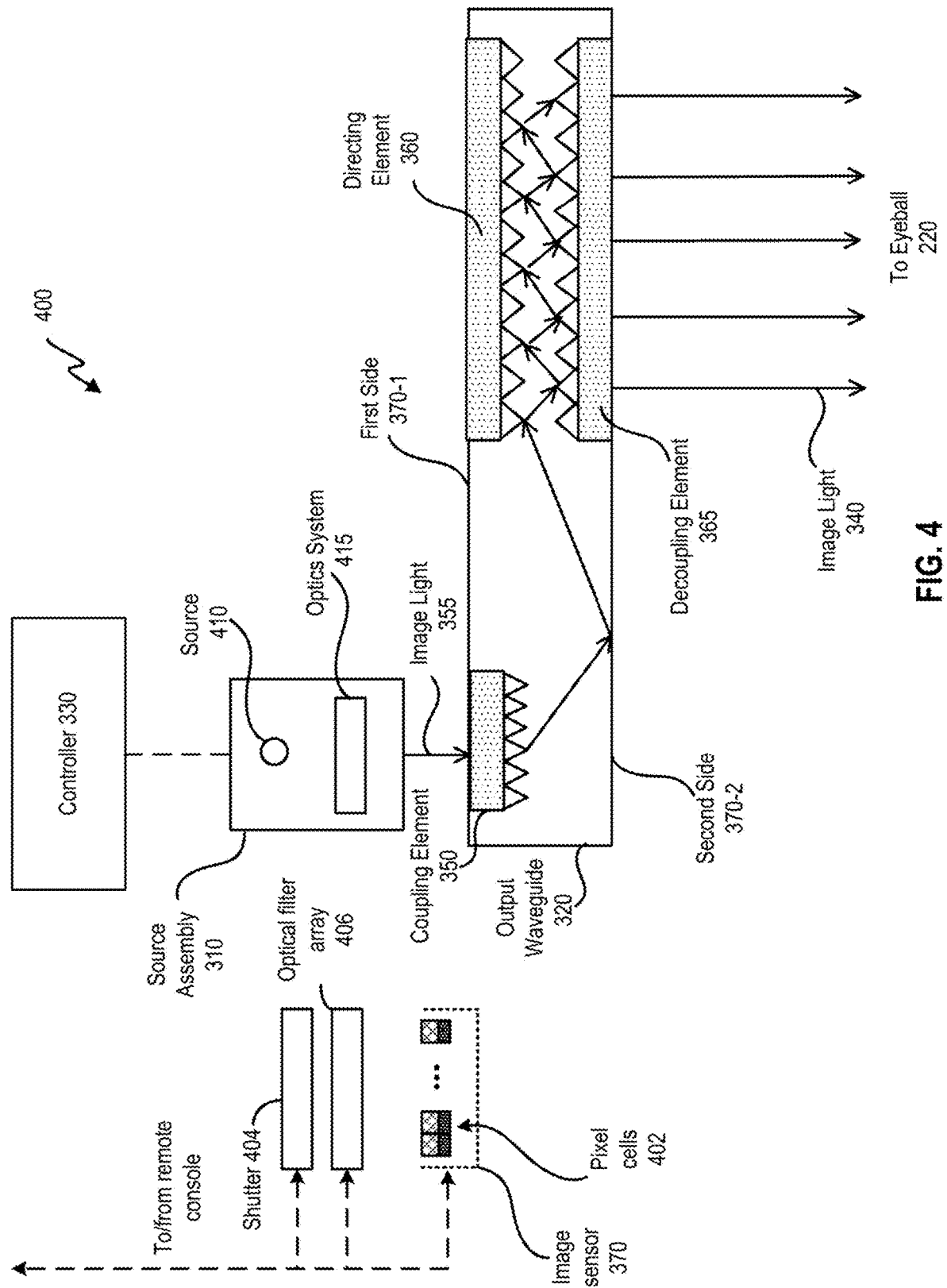
FIG. 4 illustrates a cross section of an embodiment of the waveguide display.

FIG. 4 illustrates an embodiment of a cross section 400 of the waveguide display 300. The cross section 400 includes source assembly 310, output waveguide 320, and image sensor 370. In the example of FIG. 4, image sensor 370 may include a set of pixel cells 402 located on first side 370-1 to generate an image of the physical environment in front of the user. In some embodiments, there can be a mechanical shutter 404 and an optical filter array 406 interposed between the set of pixel cells 402 and the physical environment. Mechanical shutter 404 can control the exposure of the set of pixel cells 402. In some embodiments, the mechanical shutter 404 can be replaced by an electronic shutter gate, as to be discussed below. Optical filter array 406 can control an optical wavelength range of light the set of pixel cells 402 is exposed to, as to be discussed below. Each of pixel cells 402 may correspond to one pixel of the image. Although not shown in FIG. 4, it is understood that each of pixel cells 402 may also be overlaid with a filter to control the optical wavelength range of the light to be sensed by the pixel cells.

After receiving instructions from the remote console, mechanical shutter 404 can open and expose the set of pixel cells 402 in an exposure period. During the exposure period, image sensor 370 can obtain samples of lights incident on the set of pixel cells 402, and generate image data based on an intensity distribution of the incident light samples detected by the set of pixel cells 402. Image sensor 370 can then provide the image data to the remote console, which determines the display content, and provide the display content information to controller 330. Controller 330 can then determine image light 355 based on the display content information.

Source assembly 310 generates image light 355 in accordance with instructions from the controller 330. Source assembly 310 includes a source 410 and an optics system 415. Source 410 is a light source that generates coherent or partially coherent light. Source 410 may be, e.g., a laser diode, a vertical cavity surface emitting laser, and/or a light emitting diode.

Optics system 415 includes one or more optical components that condition the light from source 410. Conditioning light from source 410 may include, e.g., expanding, collimating, and/or adjusting orientation in accordance with instructions from controller 330. The one or more optical components may include one or more lenses, liquid lenses, mirrors, apertures, and/or gratings. In some embodiments, optics system 415 includes a liquid lens with a plurality of electrodes that allows scanning of a beam of light with a threshold value of scanning angle to shift the beam of light to a region outside the liquid lens. Light emitted from the optics system 415 (and also source assembly 310) is referred to as image light 355.

Output waveguide 320 receives image light 355. Coupling element 350 couples image light 355 from source assembly 310 into output waveguide 320. In embodiments where coupling element 350 is a diffraction grating, a pitch of the diffraction grating is chosen such that total internal reflection occurs in output waveguide 320, and image light 355 propagates internally in output waveguide 320 (e.g., by total internal reflection), toward decoupling element 365.

Directing element 360 redirects image light 355 toward decoupling element 365 for decoupling from output waveguide 320. In embodiments where directing element 360 is a diffraction grating, the pitch of the diffraction grating is chosen to cause incident image light 355 to exit output waveguide 320 at angle(s) of inclination relative to a surface of decoupling element 365.

In some embodiments, directing element 360 and/or decoupling element 365 are structurally similar. Expanded image light 340 exiting output waveguide 320 is expanded along one or more dimensions (e.g., may be elongated along x-dimension). In some embodiments, waveguide display 300 includes a plurality of source assemblies 310 and a plurality of output waveguides 320. Each of source assemblies 310 emits a monochromatic image light of a specific band of wavelength corresponding to a primary color (e.g., red, green, or blue). Each of output waveguides 320 may be stacked together with a distance of separation to output an expanded image light 340 that is multi-colored.

Figure 5:
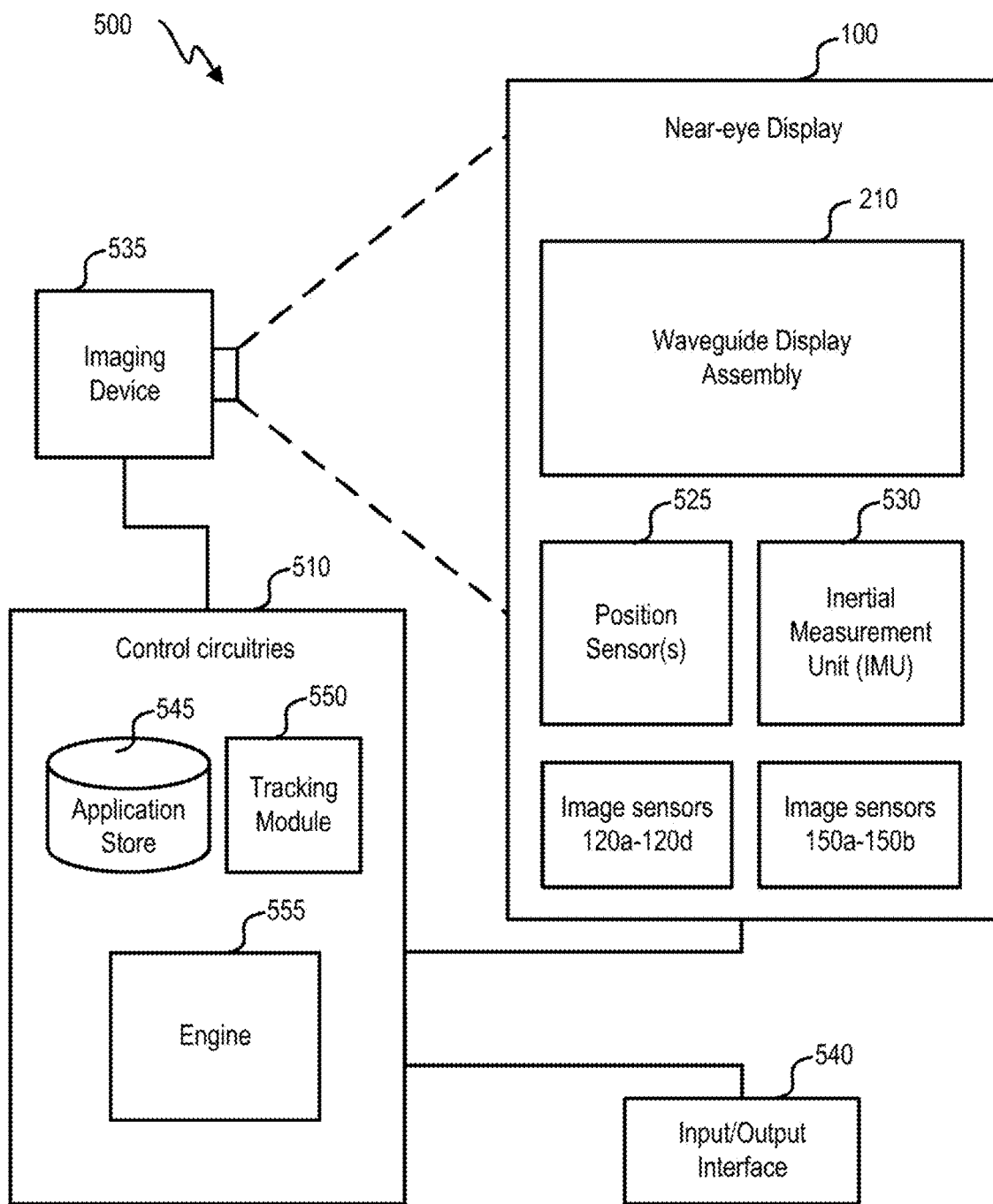
FIG. 5 is a block diagram of an embodiment of a system including the near-eye display.

FIG. 5 is a block diagram of an embodiment of a system 500 including the near-eye display 100. The system 500 comprises near-eye display 100, an imaging device 535, an input/output interface 540, and image sensors 120a-120d and 150a-150b that are each coupled to control circuitries 510. System 500 can be configured as a head-mounted device, a mobile device, a wearable device, etc.

Near-eye display 100 is a display that presents media to a user. Examples of media presented by the near-eye display 100 include one or more images, video, and/or audio. In some embodiments, audio is presented via an external device (e.g., speakers and/or headphones) that receives audio information from near-eye display 100 and/or control circuitries 510 and presents audio data based on the audio information to a user. In some embodiments, near-eye display 100 may also act as an AR eyewear glass. In some embodiments, near-eye display 100 augments views of a physical, real-world environment, with computer-generated elements (e.g., images, video, sound, etc.).

Near-eye display 100 includes waveguide display assembly 210, one or more position sensors 525, and/or an inertial measurement unit (IMU) 530. Waveguide display assembly 210 includes source assembly 310, output waveguide 320, and controller 330.

IMU 530 is an electronic device that generates fast calibration data indicating an estimated position of near-eye display 100 relative to an initial position of near-eye display 100 based on measurement signals received from one or more of position sensors 525.

Imaging device 535 may generate image data for various applications. For example, imaging device 535 may generate image data to provide slow calibration data in accordance with calibration parameters received from control circuitries 510. Imaging device 535 may include, for example, image sensors 120a-120d of FIG. 1A for generating image data of a physical environment in which the user is located, for performing location tracking of the user. Imaging device 535 may further include, for example, image sensors 150a-150b of FIG. 1B for generating image data for determining a gaze point of the user, to identify an object of interest of the user.

The input/output interface 540 is a device that allows a user to send action requests to the control circuitries 510. An action request is a request to perform a particular action. For example, an action request may be to start or end an application or to perform a particular action within the application.

Control circuitries 510 provide media to near-eye display 100 for presentation to the user in accordance with information received from one or more of: imaging device 535, near-eye display 100, and input/output interface 540. In some examples, control circuitries 510 can be housed within system 500 configured as a head-mounted device. In some examples, control circuitries 510 can be a standalone console device communicatively coupled with other components of system 500. In the example shown in FIG. 5, control circuitries 510 include an application store 545, a tracking module 550, and an engine 555.

The application store 545 stores one or more applications for execution by the control circuitries 510. An application is a group of instructions, that, when executed by a processor, generates content for presentation to the user. Examples of applications include: gaming applications, conferencing applications, video playback applications, or other suitable applications.

Tracking module 550 calibrates system 500 using one or more calibration parameters and may adjust one or more calibration parameters to reduce error in determination of the position of the near-eye display 100.

Tracking module 550 tracks movements of near-eye display 100 using slow calibration information from the imaging device 535. Tracking module 550 also determines positions of a reference point of near-eye display 100 using position information from the fast calibration information.

Engine 555 executes applications within system 500 and receives position information, acceleration information, velocity information, and/or predicted future positions of near-eye display 100 from tracking module 550. In some embodiments, information received by engine 555 may be used for producing a signal (e.g., display instructions) to waveguide display assembly 210 that determines a type of content presented to the user. For example, to provide an interactive experience, engine 555 may determine the content to be presented to the user based on a location of the user (e.g., provided by tracking module 550), or a gaze point of the user (e.g., based on image data provided by imaging device 535), a distance between an object and user (e.g., based on image data provided by imaging device 535).

Figure 6A:
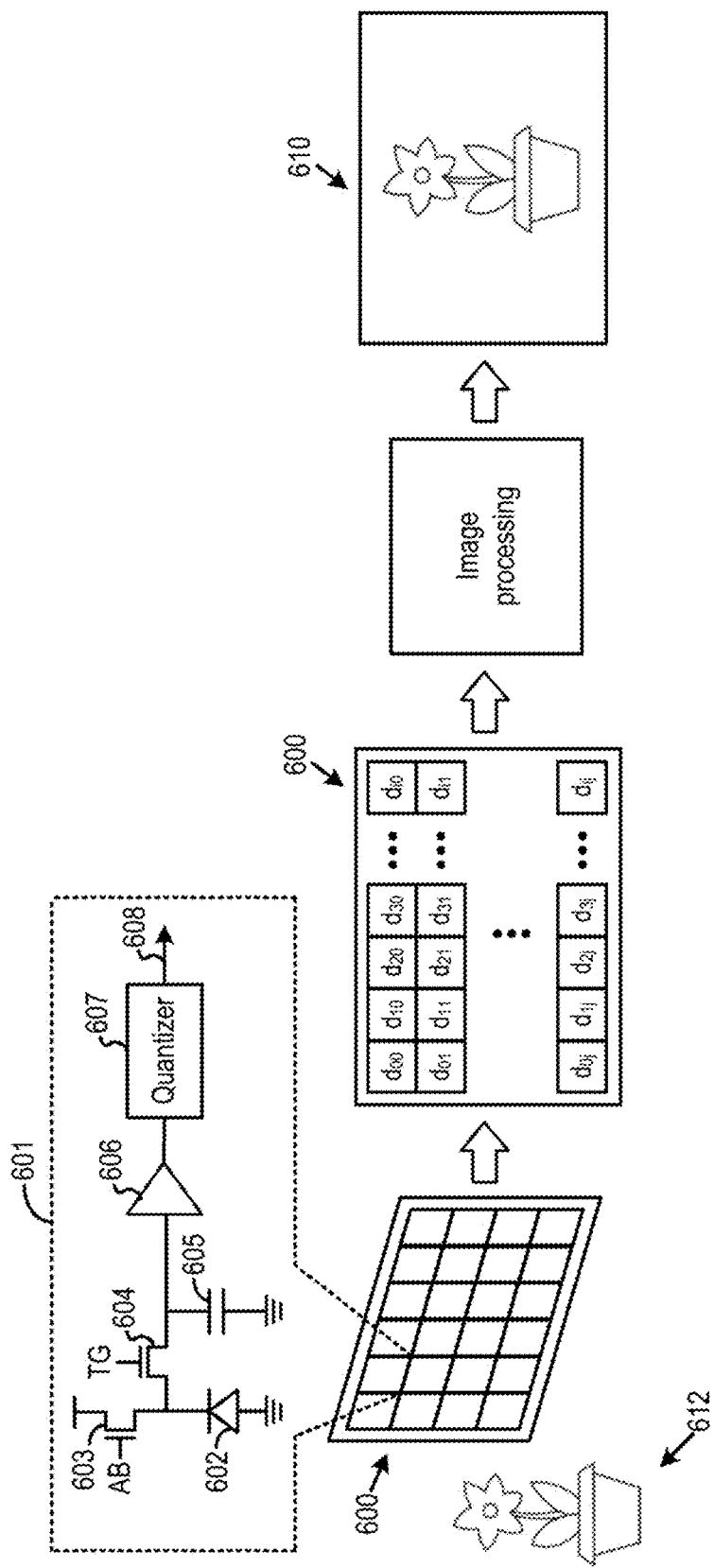
FIG. 6A, FIG. 6B, FIG. 6C, and FIG. 6D illustrate examples of an image sensor and its operations.

FIG. 6A, FIG. 6B, FIG. 6C, and FIG. 6D illustrate examples of an image sensor 600 and its operations. As shown in FIG. 6A, image sensor 600 can include an array of pixel cells, including pixel cell 601, and can generate digital intensity data corresponding to pixels of an image. Pixel cell 601 may be part of pixel cells 402 of FIG. 4. As shown in FIG. 6A, pixel cell 601 may include a photodiode 602, an electronic shutter transistor 603, a transfer transistor 604, a charge storage device 605, a buffer 606, and a quantizer 607. Photodiode 602 may include, for example, a P-N diode, a P-I-N diode, a pinned diode, etc., whereas charge storage device 605 can be a floating drain node of transfer transistor 604. Photodiode 602 can generate and accumulate residual charge upon receiving light within an exposure period. Upon saturation by the residual charge within the exposure period, photodiode 602 can output overflow charge to charge storage device 605 via transfer transistor 604. Charge storage device 605 can convert the overflow charge to a voltage, which can be buffered by buffer 606. The buffered voltage can be quantized by quantizer 607 to generate measurement data 608 to represent, for example, the intensity of light received by photodiode 602 within the exposure period.

Quantizer 607 may include a comparator to compare the buffered voltage with different thresholds for different quantization operations associated with different intensity ranges. For example, for a high intensity range where the quantity of overflow charge generated by photodiode 602 exceeds a saturation limit of charge storage device 605, quantizer 607 can perform a time-to-saturation (TTS) measurement operation by detecting whether the buffered voltage exceeds a static threshold representing the saturation limit, and if it does, measuring the time it takes for the buffered voltage to exceed the static threshold. The measured time can be inversely proportional to the light intensity. Also, for a medium intensity range in which the photodiode is saturated by the residual charge but the overflow charge remains below the saturation limit of charge storage device 605, quantizer 607 can perform a FD ADC operation to measure a quantity of the overflow charge stored in charge storage device 605. Further, for a low intensity range in which the photodiode is not saturated by the residual charge and no overflow charge is accumulated in charge storage device 605, quantizer 607 can perform a PD ADC operation to measure a quantity of the residual charge accumulated in photodiode 602. The output of one of TTS, FD ADC, or PD ADC operation can be output as measurement data 608 to represent the intensity of light to form an image 610

Figure 6B:
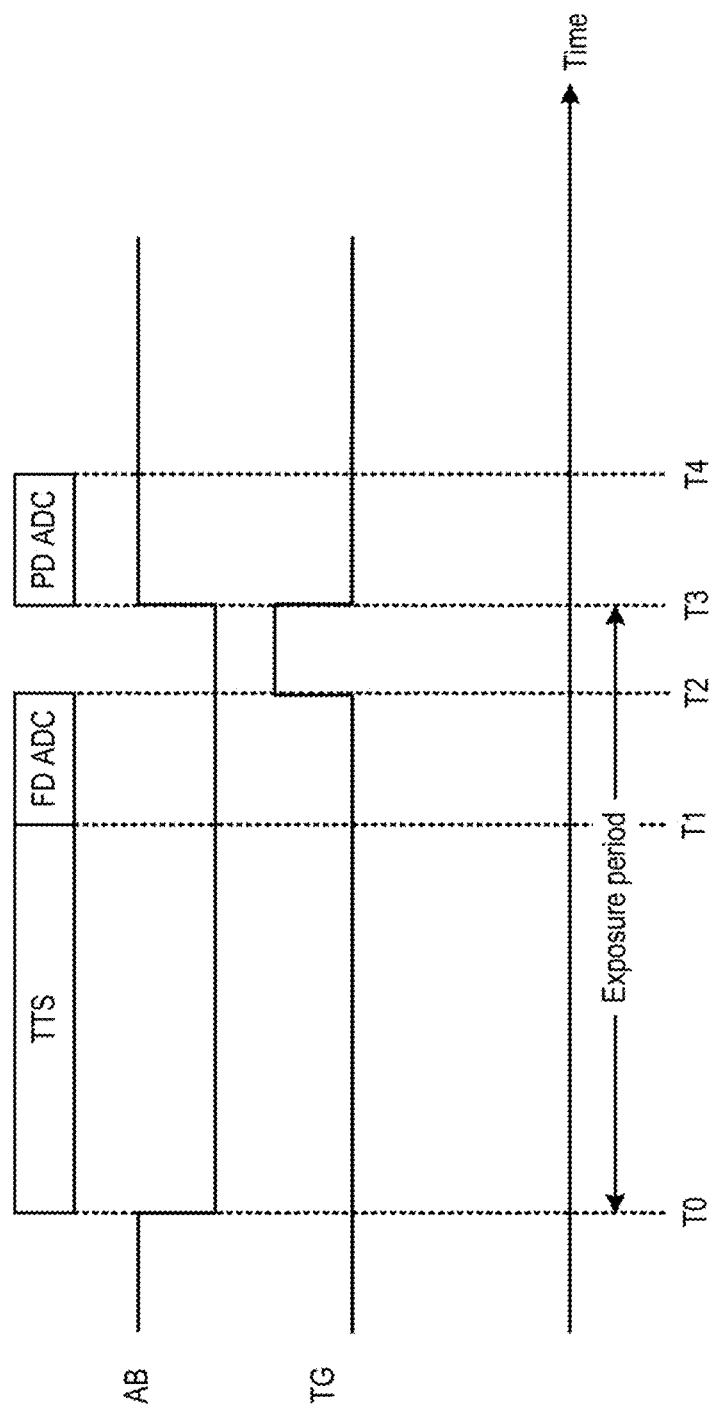
Figure 6C:
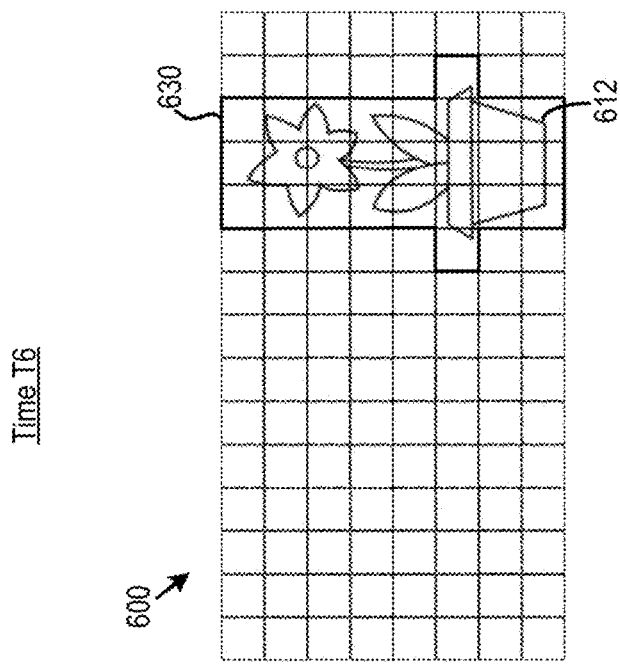
Figure 6C:
Figure 6C:
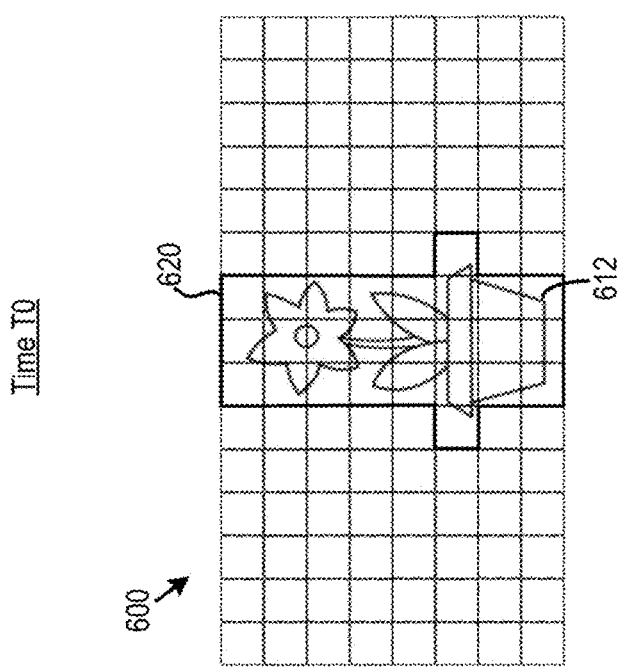
Figure 6D:
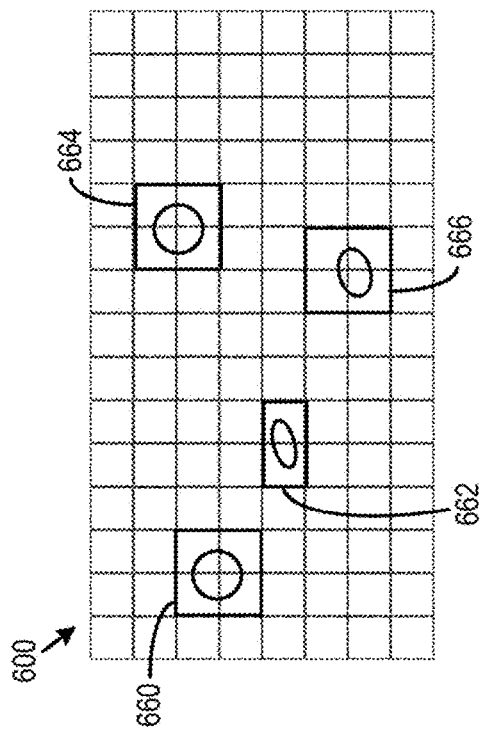
Figure 6D:
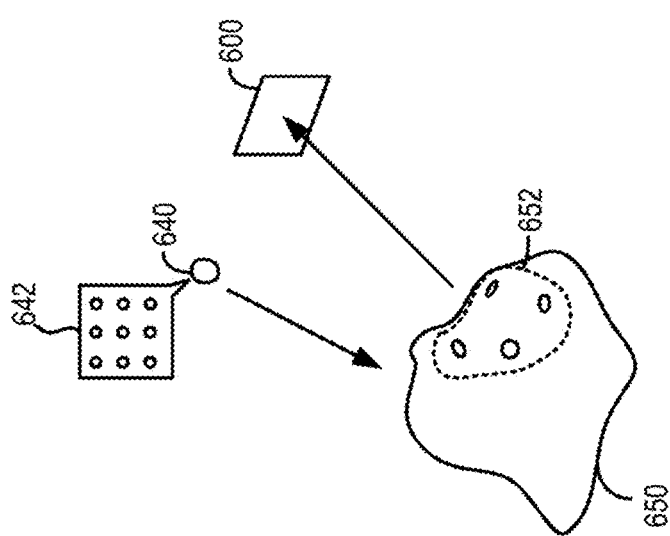

FIG. 6B illustrates an example sequence of operations of pixel cell 601. As shown in FIG. 6B, the exposure period can be defined based on the timing of AB signal controlling electronic shutter transistor 603, which can steer the charge generated by photodiode 602 away when enabled, and based on the timing of the TG signal controlling transfer transistor 604, which can be controlled to transfer the overflow charge and then the residual charge to charge storage device 605 for read out. For example, referring to FIG. 6B, the AB signal can be de-asserted at time T0 to allow photodiode 602 to generate charge. T0 can mark the start of the exposure period. Within the exposure period, the TG signal can set transfer transistor 604 at a partially-on state to allow photodiode 602 to accumulate at least some of the charge as residual charge until photodiode 602 saturates, after which overflow charge can be transferred to charge storage device 605. Between times T0 and T1, quantizer 607 can perform a TTS operation to determine whether the overflow charge at charge storage device 605 exceeds the saturation limit, and then between times T1 and T2, quantizer 607 can perform a FD ADC operation to measure a quantity of the overflow charge at charge storage device 605. Between times T2 and T3, the TG signal can be asserted to bias transfer transistor 604 in a fully-on state to transfer the residual charge to charge storage device 605. At time T3, the TG signal can be de-asserted to isolate charge storage device 605 from photodiode 602, whereas the AB signal can be asserted to steer charge generated by photodiode 602 away. The time T3 can mark the end of the exposure period. Between times T3 and T4, quantizer 607 can perform a PD operation to measure a quantity of the residual charge.

The AB and TG signals can be generated by a controller (not shown in FIG. 6A) which can be part of pixel cell 601 to control the duration of the exposure period and the sequence of quantization operations. The controller can also detect whether charge storage device 605 is saturated and whether photodiode 602 is saturated to select the outputs from one of the TTS, FD ADC, or PD ADC operations as measurement data 608. For example, if charge storage device 605 is saturated, the controller can provide the TTS output as measurement data 608. If charge storage device 605 is not saturated but photodiode 602 is saturated, the controller can provide the FD ADC output as measurement data 608. If photodiode 602 is not saturated, the controller can provide the PD ADC output as measurement data 608. The measurement data 608 from each pixel cells of image sensor 600 generated within the exposure period can form an image frame. The controller can repeat the sequence of operations in FIG. 6B in subsequent exposure periods to generate subsequent image frames.

The image frame data from image sensor 600 can be transmitted to a host processor (not shown in FIG. 6A-FIG. 6D) to support different applications, such as identifying and tracking object 612, performing depth sensing of object 612 with respect to image sensor 600, etc. For all these applications, only a subset of pixel cells provides relevant information (e.g., pixel data of object 612), whereas the reset of pixel cells does not provide relevant information. For example, referring to FIG. 6C, at time T0, a group of pixel cells 620 of image sensor 600 receives light reflected by object 612, whereas a time T6, object 612 may have shifted (e.g., due to a movement of object 612, a movement of image sensor 600, or both), and a group of pixel cells 630 of image sensor 600 receive a light reflected by object 612.

In some examples, image sensor 600 can transmit only the pixel data from the group of pixel cells 620 and 630 to the host processor to reduce the volume of pixel data being transmitted. In some examples, image sensor 600 can also have all the pixels to transmit pixel data, but groups of pixel cells 620 and 630 can have different configurations as others. For example, groups of pixel cells 620 and 630 can generate and output the pixel data at a higher quantization resolution to represent the image of object 612, while the rest of the pixel cells can generate and output the pixel data at a lower resolution. As another example, groups of pixel cells 620 and 630 can have longer exposure periods than the others. All these arrangements can allow generation and transmission of higher resolution images without corresponding increase in power and bandwidth. For example, a larger pixel cell array including more pixel cells can be used to image object 612 to improve image resolution, while the bandwidth and power required to provide the improved image resolution can be reduced when only a subset of the pixel cells, including the pixel cells that provide pixel data of object 612, generate high resolution pixel data and transmit the high resolution pixel data to the host processor, while the rest of the pixel cells are either not generating/ transmitting pixel data, or generating/transmitting pixel data at a very low resolution. Moreover, while image sensor 600 can be operated to generate images at a higher frame rate, the increases in bandwidth and power can be reduced when each image only includes a small set of pixel values that are at high resolution and represented by a large number of bits, while the rest of the pixel values are at very low resolution and are represented by a smaller number of bits.

The volume of pixel data transmission can also be reduced in the case of 3D sensing. For example, referring to FIG. 6D, an illuminator 640 can project a pattern 642 of structured light onto an object 650. The structured light can be reflected on a surface of an object 650, and a pattern 652 of reflected light can be captured by image sensor 600 to generate an image. Host processor can match pattern 652 with pattern 642 and determine the depth of object 650 with respect to image sensor 600 based on the image locations of pattern 652 in the image. For 3D sensing, only groups of pixel cells 660, 662, 664, and 666 contain relevant information (e.g., pixel data of pattern 652). To reduce the volume of pixel data being transmitted, image sensor 600 can be configured to send only the pixel data from groups of pixel cells 660, 662, 664, and 666, or to send the pixel data from groups of pixel cells 660, 662, 664, and 666 at a high resolution while the rest of the pixel data are at a low resolution, to the host processor.

Figure 7A:
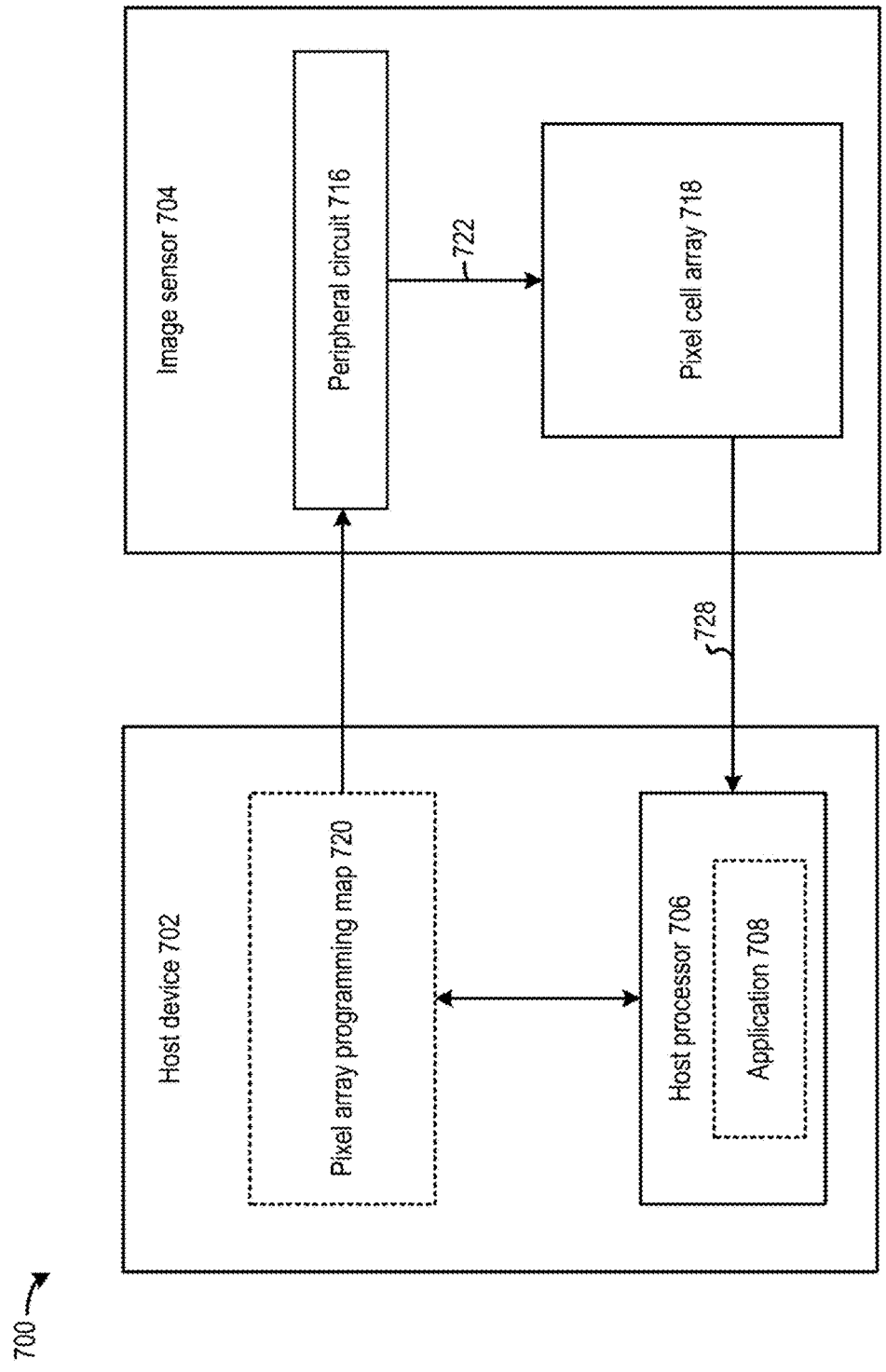
FIG. 7A, FIG. 7B, and FIG. 7C illustrate an example of an image processing system and its operations.
Figure 7B:
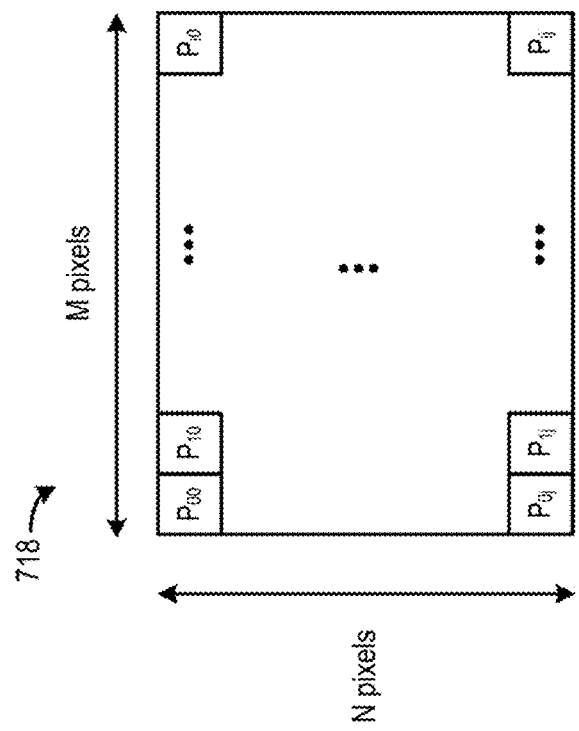
Figure 7B:
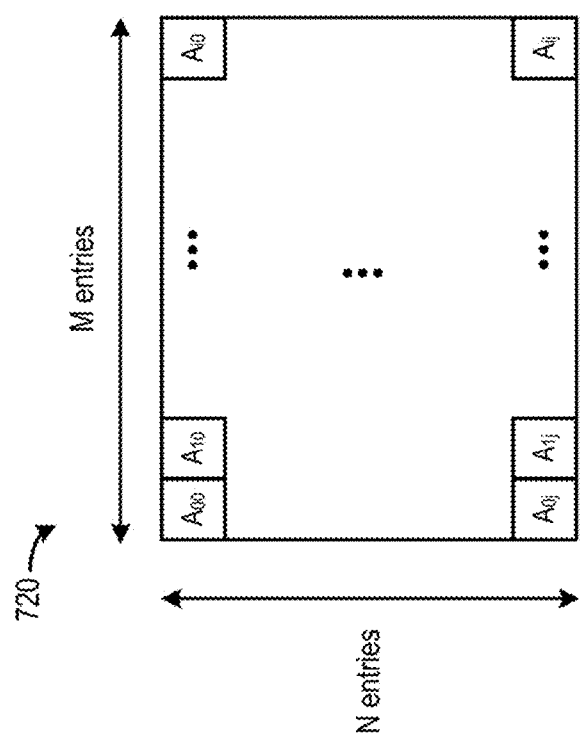

FIG. 7A and FIG. 7B illustrate examples of an image processing system 700 and its operations. Image processing system 700 includes a host device 702 and an image sensor 704. Host device 702 can include a host processor 706 which operates an application 708 which can perform operations including, for example, fusion of 2D and 3D sensing, object recognition and tracking, location tracking, etc. In some examples, image processing system 700 can be in a mobile device. In some examples, processing system 700 can be split into multiple separate devices. For example, host device 702 can be a personal computer (PC), a smart phone, a camera base station, or an integrated circuit such as a central processing unit (CPU), a field-programmable gate array (FPGA), a micro controller unit (MCU), etc. Host device 702 and image sensor 704 can be electrically connected via an interconnect (not shown in FIG. 7A), such as an interconnect compatible with the Mobile Industry Processor Interface (MIPI) standard. In some examples, host device 702 and image sensor 704 can also be on the same die, or can be on different layers of a stacked sensor system housed within a semiconductor package.

Referring to FIG. 7A, image sensor 704 includes a peripheral circuit 716, a pixel cell array 718, and a global signal generator 719. Each pixel cell of pixel cell array 718 can include similar components as pixel cell 601 of FIG. 6A such as photodiode 602, electronic shutter transistor 603, transfer gate 604, charge storage device 605, and quantizer 607, to perform a light measurement operation to generate pixel data. In some examples, each pixel cell in pixel cell array 718 may include a memory to store pixel-level programming data for configuring/programming the light measurement operation at the each pixel cell, and to store the measurement data from the light measurement operation. In some examples, a block of pixel cells (e.g., a 2×2 block of pixel cells) can share a memory to store pixel-level programming data for configuring/programming the light measurement operations at the block of pixel cells, and to store the measurement data from the block of pixel cells. Each pixel cell, or each block of pixel cells, can be individually addressable, which allows the light measurement operations at each pixel cell (or at each block of pixel cells) to be individually programmed by peripheral circuit 716 based on a pixel array programming map 720 provided by host device 702. Based on pixel array programming map 720, peripheral circuit 716 can generate pixel-level programming signals 722 to represent different pixel-level programming data targeted at each pixel cell (or each block of pixel cells), and transmit pixel-level programming signals 722 representing the pixel-level programming data to the each pixel cell for storage at the memory of the each pixel cell (or to each block of pixel cells for storage at the memory shared by block of pixel cells). Pixel-level programming data can be read out from the memory of each pixel cell to configure the light measurement operation at the each pixel cell, or from the shared memory of each block of pixel cells to configure the light measurement operations at the block of pixel cells. Pixel cell array 718 can generate pixel data 728 which can then be transmitted back to host device 702.

As to be described in detail below, the configuration of the light measurement operation at a pixel cell can include, for example, disabling/enabling the light measurement operation and measurement data generation of the pixel cell, setting the exposure time, selecting one or more quantization operations (e.g., TTS, FD ADC, PD ADC), setting the bandwidth and/or quantization resolution of the quantizer, controlling whether the memory stores the measurement data, controlling a precision (e.g., a number of bits) of the measurement data stored at the memory, etc. In some examples, pixel cell array 718 and peripheral circuit 716 can form a stack structure to maximize the light receiving surface of image sensor 704, which allows pixel cell array 718 to include more pixel cells to improve resolution.

Pixel array programming map 720 can include pixel-level programming data targeted at each pixel cell of the array of pixel cells. FIG. 7B illustrates an example of pixel array programming map 720. As shown in FIG. 7B, pixel array programming map 720 can include a two-dimensional array of pixel-level programming data, with each pixel-level programming data of the two-dimensional array targeted at a pixel cell of pixel cell array 718. For example, in a case where pixel cell array 718 has a width of M pixels (e.g., M columns of pixels) and a height of N pixels (e.g., N rows of pixels), pixel array programming map 720 also has a width of M entries (e.g., M columns of entries) and a height of N entries (e.g., N rows of entries). The pixel-level programming data $A_{00}$ at entry (0, 0) of pixel array programming map 720 is targeted at pixel cell $P_{00}$ at pixel location (0, 0) of pixel cell array 718, whereas the pixel-level programming data $A_{01}$ at entry (0, 1) of pixel array programming map 720 is targeted at pixel cell $P_{01}$ at pixel location (0, 1) of pixel cell array 718. In some examples, each of symbols $P_{00}$, $P_{01}$, etc., can represent a group of pixel cells (e.g., a 2×2 block of pixel cells). In such a case, each entry of pixel array programming map 720 can include pixel-level programming data for a block of pixel cells. The number of entries of pixel array programming map 720 along the height and the width can be scaled based on a number of pixel cells in each group.

Figure 7C:
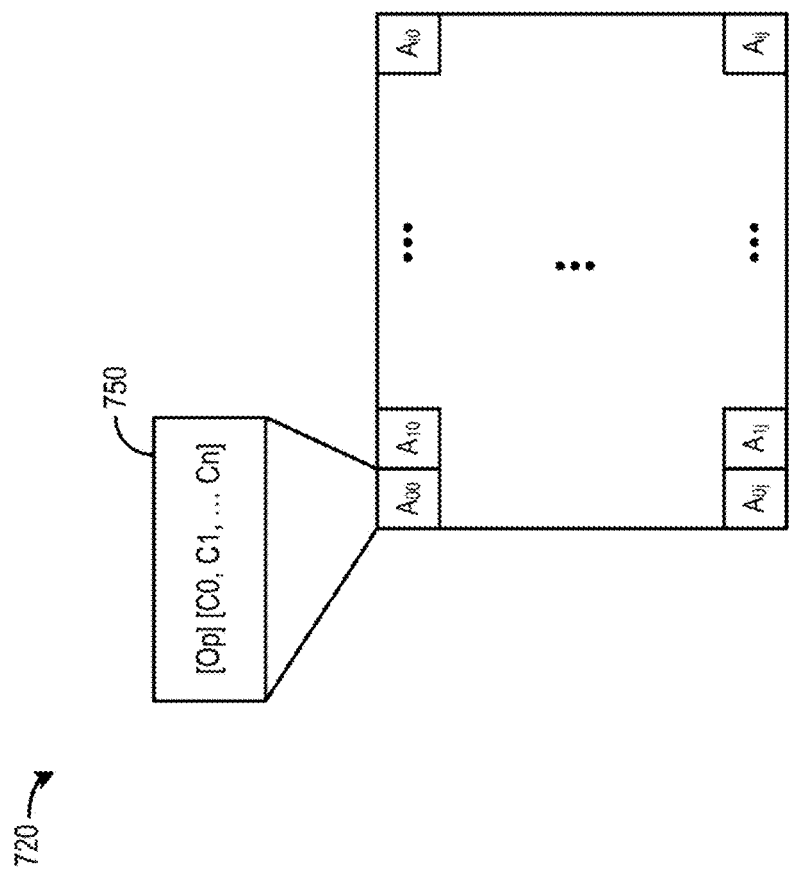

FIG. 7C illustrates an example of pixel-level programming data 750 that can be stored at an entry of pixel array programming map 720. In some examples, the pixel-level programming data at each entry can include a single bit to represent one of two configurations. In some examples, as shown in FIG. 7C, the pixel-level programming data can include multiple bits (represented by C0, C1, C2, . . . Cn in FIG. 7C). In a case where the pixel-level programming data include m bits, the pixel-level programming data can represent one of $2^m$ configurations, in which each bit (or subset of bits) of the multiple bits can control different components of pixel cell 601. In some examples, the pixel-level programming data can be encoded to reduce the number of bits used to represent the pixel-level programming data, and can include an opcode (represented by Op in FIG. 7C) to indicate how the pixel-level programming data is to be decoded. In one example, the opcode can indicate that the pixel-level programming data of an entry represents a delta from the corresponding entry of a prior pixel array programming map 720, such that when a pixel cell receives the pixel-level programming data, it should subtract the pixel-level programming data from what is being stored in the memory to generate the actual pixel-level programming data. In another example, the opcode can indicate that the pixel-level programming data is encoded based on run-length encoding, such that, when a pixel cell receives the pixel-level programming data, it can decode the pixel-level programming data accordingly to generate the actual pixel-level programming data.

In some examples, pixel array programming map 720 can be generated by the application (e.g., application 708) operating at host device 702 that consumes the pixel data from pixel cell array 718. For example, application 708 may identify, from an image, pixels that contain relevant information, and determine a region of interest (ROI) comprising the pixels. Pixel cells that generate pixel data corresponding to the ROI can then be identified. As an illustrative example, referring back to the example of FIG. 6C, application 708 may identify an ROI including the group of pixel cells 620 as providing relevant information (e.g., pixel data of object 612) in an image at time T0. Application 708 can then predict the change in the ROI between times T0 and T6 based on, for example, a direction and a speed of movement of object 612 with respect to image sensor 600. Application 708 can then predict the new image location of the ROI at time T6, which includes the group of pixel cells 630, based on the image location of the group of pixel cells 620 at time T0 and the predicted change. Based on the image location of the group of pixel cells 630 at time T6, application 708 can generate pixel array programming map 720 based on setting first pixel-level programming data at the entries corresponding to the group of pixel cells 630 and setting second pixel-level programming data for the rest of the entries.

The first pixel-level programming data and the second pixel-level programming data can configure the pixel cells in different ways to facilitate the operation of application 708 while reducing power and bandwidth. For example, the first pixel-level programming data can enable group of pixel cells 630, while the second pixel-level programming data can disable the rest of pixel cells 630. As another example, the first pixel-level programming data can enable write operation to the memory to store the measurement data for a current frame, while the second pixel-level programming data can disable the write operation to the memory so that the memory still stores the measurement data for a prior frame, to reduce the write operations to the memory. As yet another example, the first pixel-level programming data can increase the quantization resolution and/or frame rate of group of pixel cells 630 with respect to the rest of the pixel cells, so that application 708 can obtain more information from group of pixel cells 630 about the ROI and less information from the rest of the pixel cells. All these arrangements can improve the quality of the pixel data which are of interest to application 708 while reducing the overall volume of pixel data transmitted to application 708.

In some examples, application 708 can also adapt the operations of pixel cell array 718 to, for example, a scene, a requirement of application 708, etc. The adaption can be based on, for example, adjusting the exposure time, quantizer bandwidth, quantization resolution, selecting a particular quantization operation, etc., via pixel array programming map 720. For example, from the image data, application 708 may determine that a subset of the pixel cells is exposed to strong light. Application 708 can generate pixel array programming map 720 to reduce the exposure time for the subset of pixel cells as part of an adaptive exposure scheme to reduce the likelihood of blooming by those pixel cells. Moreover, application 708 can also configure the subset of the pixel cells to only perform TTS operation and not to perform the FD ADC and PD ADC operations via pixel array programming map 720. Such arrangements can also put the subset of pixel cells in a power down mode after the TTS operation is performed, to reduce power consumption by the subset of pixel cells. Moreover, in a case where application 708 requires the frames to be generated at a higher frame rate, application 708 can also increase the quantizer bandwidth of all the pixel cells (or a subset of pixel cells) to generate frames at the required frame rate.

Figure 8A:
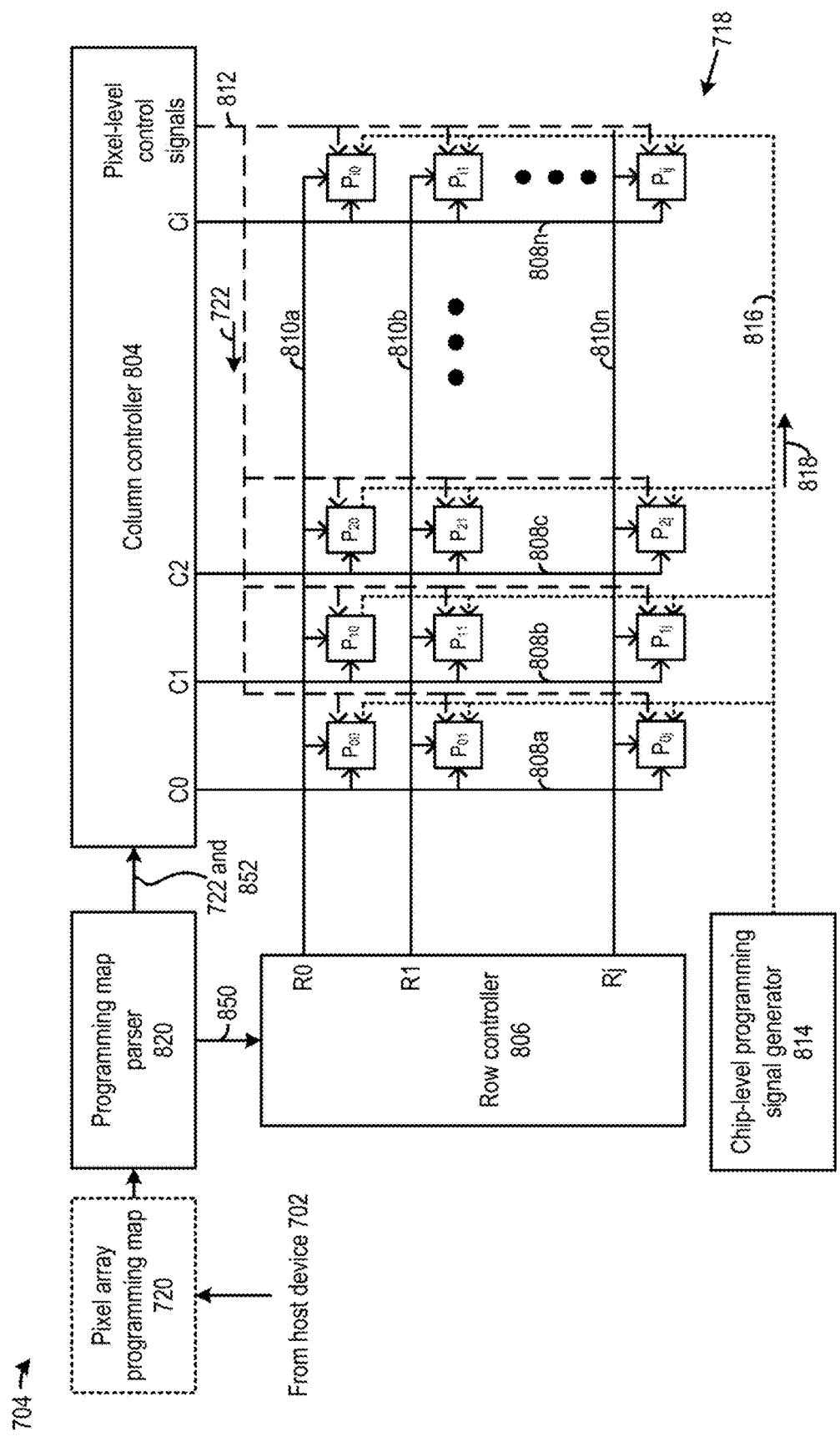
FIG. 8A and FIG. 8B illustrate example components of the image processing system of FIGS. 7A-7C.
Figure 8B:
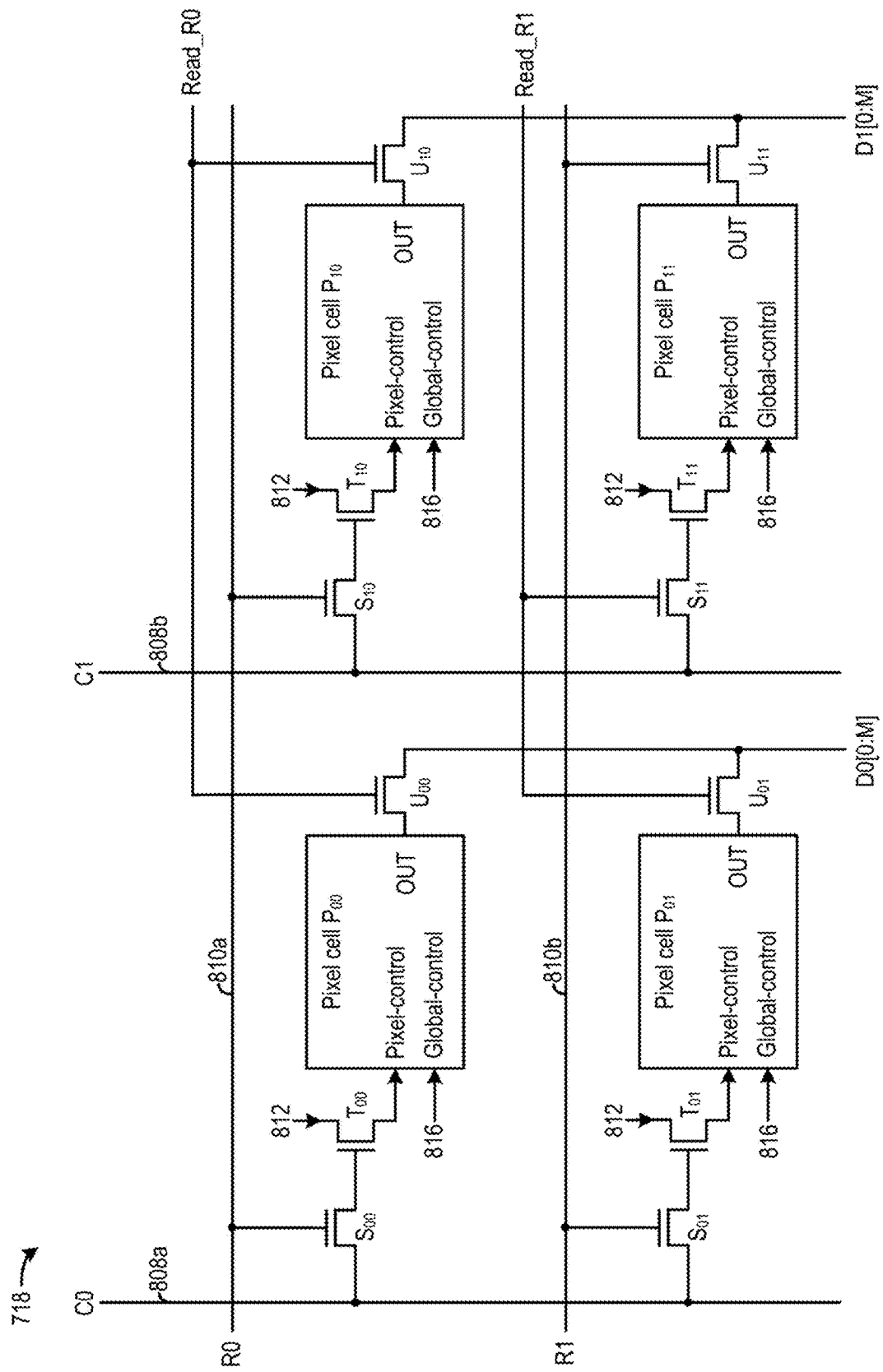

FIG. 8A and FIG. 8B illustrate example additional components of image sensor 704. As shown in FIG. 8A, peripheral circuit 716 can include a column controller 804 and a row controller 806. Column controller 804 is connected with column buses 808 (e.g., 808a, 808b, 808c, . . . 808n, etc.), whereas row controller 806 is connected with row buses 810 (e.g., 810a, 810b, . . . 808n, etc.). One of row column controller 804 or row controller 806 is also connected with a pixel-level programming bus 812 to transmit pixel-level programming signals 722. In addition, image sensor 704 further includes a chip-level programming signal generator 814, which is connected with a chip-level programming bus 816 to transmit chip-level programming signals 818. Chip-level programming signals 818 can include chip-level programming signals that apply to all pixel cells of pixel cell array 718. As to be described below, some or all chip-level programming signals 818 can be overridden by pixel-level programming signals 722 at certain pixel cells. In some examples, chip-level programming signals 818 can also be provided as column-level or row-level programming signals to pixel cells (or group of pixel cells) connected to a particular column bus 808 and/or a particular row bus 810.

In FIG. 8A, each box labelled $P_{00}$, $P_{01}$, $P_{0j}$, etc. can represent a pixel cell or a group of pixel cells (e.g., a group of 2×2 pixel cells) of array of pixel cells 718, as described above. Each pixel cell (or a group of pixel cells) is connected to one of column buses 808, one of row buses 810, pixel-level programming bus 812, chip-level programming bus 816, and an output data bus to output measurement data (not shown in FIG. 8A). FIG. 8B illustrates additional details of the connections of the pixel cells. As shown in FIG. 8B, each pixel cell is connected with a column bus and a row bus via a transistor S (e.g., $S_{00}$, $S_{10}$, $S_{10}$, $S_{11}$, etc.) and a transistor T (e.g., $T_{00}$, $T_{10}$, $T_{10}$, $T_{11}$, etc.). Transistor S is connected with a column bus, a row bus, and the gate of transistor T. Transistor T is connected between pixel-level programming bus 812 and a pixel cell. When both the column bus and the row bus connected to a transistor S carries a logical one, transistor T can be enabled and allow pixel-level programming signals 722 to propagate through and to the pixel cell. For example, when row bus 810a (labelled R0) and column bus 808a (labelled C0) both carry a logical one while other row buses and column buses carry a logical zero, transistor $S_{00}$ can enable transistor $T_{00}$ to pass pixel-level programming signals 722 to pixel cell $P_{00}$. Moreover, when row bus 810a (R0) and column bus 808b (labelled C1) both carry a logical one while other row buses and column buses carry a logical zero, transistor $S_{10}$ can enable transistor $T_{10}$ to pass pixel-level programming signals 722 to pixel cell $P_{10}$. With such arrangements, each pixel cell is individually addressable by the signals on column buses 808 and row buses 810, and one or more pixel cells can be selected to receive pixel-level programming data via pixel-level programming bus 812 at a time.

In addition, each pixel cell is also directly connected to chip-level programming bus 816, so that each pixel cell receives the same chip-level programming signals 818 from chip-level programming bus 816. Moreover, the output terminal of each pixel cell, which outputs measurement data, is connected to an output data bus (e.g., D0, D1, etc.) via a selection transistor U (e.g., $U_{00}$, $U_{01}$, $U_{10}$, $U_{11}$, etc.). Selection transistor U can be driven by a read signal (e.g., Read_R0, Read_R1, etc.) to select a row of pixel cells to output measurement data on the output data bus. For example, when read signal Read_R0 is asserted, a row of pixel cells including pixel cells $P_{00}$ and $P_{10}$ can be selected to output measurement data.

Referring back to FIG. 8A, peripheral circuit 716 further includes a programming map parser 820 which can extract pixel-level programming data from pixel array programming map 720 for each target pixel cell of pixel cell array 718, and generate pixel-level programming signals 722 as well as row address signals 850 and column address signals 852 to transmit the pixel-level programming data to each target pixel cell. Specifically, programming map parser 820 can parse pixel array programming map 720, which can be in a serial data stream, to identify the pixel-level programming data for each pixel cell. The identification of the pixel-level programming data can be based on, for example, a pre-determined scanning pattern by which the two-dimensional pixel array programming map is converted into the serial format, as well as the order by which the pixel-level programming data is received by programming map parser 820 from the serial data stream. Programming map parser 820 can then transmit row address signals 850 and column address signals 852 to, respectively, row controller 806 and column controller 804 to select one or more pixel cells, and transmit control signals 722 including the programming data via pixel-level programming bus 812. The selected one or more pixel cells can then receive control signals 722, as described in FIG. 8B.

Figure 9A:
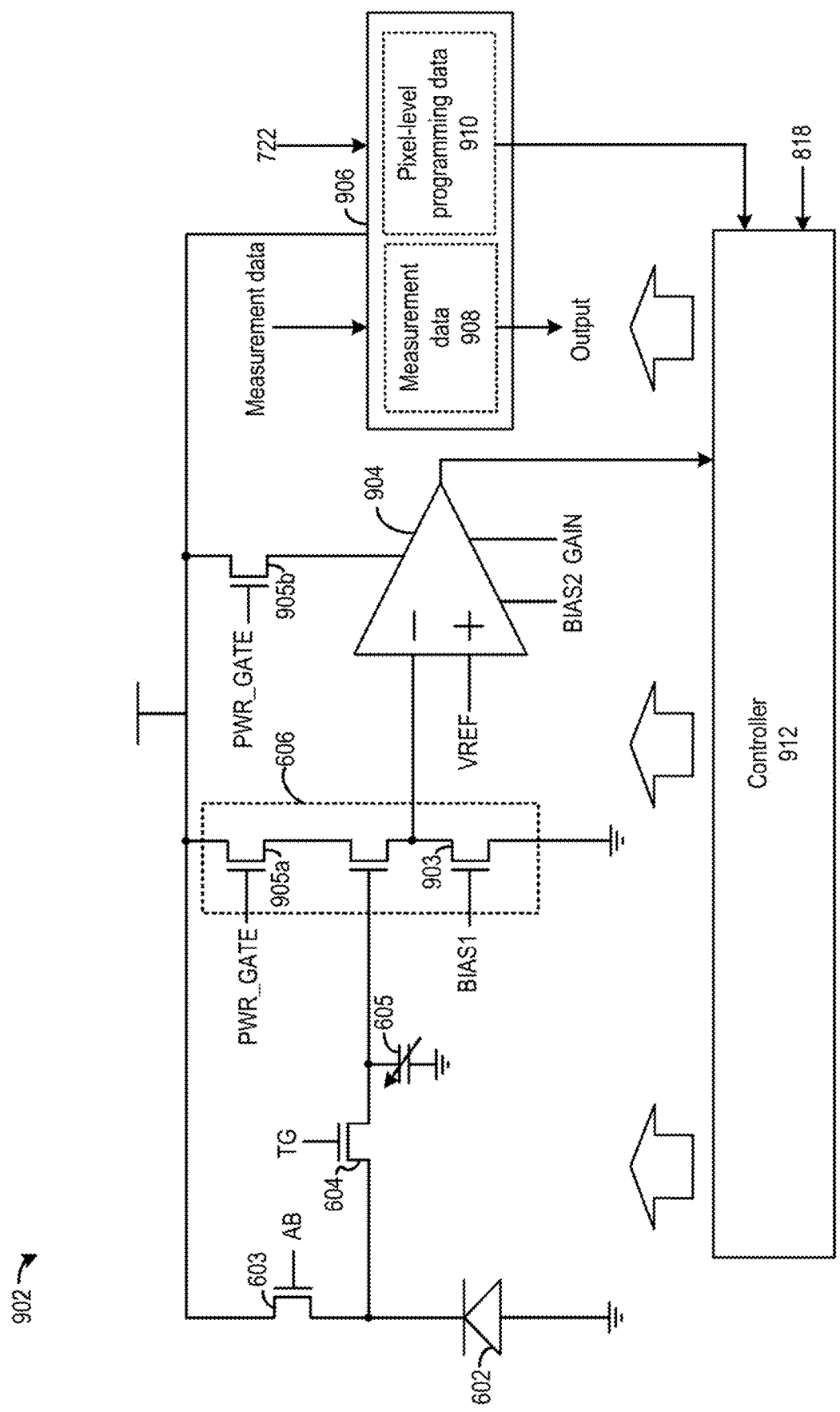
FIG. 9A, FIG. 9B, FIG. 9C, FIG. 9D, and FIG. 9E illustrate example components of the image processing system of FIGS. 7A-7C.

FIG. 9A-FIG. 9E illustrate additional components of pixel cell 601 to support configurable light measurement operation and measurement data generation. Referring to FIG. 9A, pixel 601 can include photodiode 602, electronic shutter transistor 603, transfer transistor 604, charge storage device 605, buffer 606, and quantizer 607 as shown in FIG. 6A. Charge storage device 605 can have a configurable capacitance to set a charge-to-voltage conversion gain. In some examples, the capacitance of charge storage device 605 can be increased to store overflow charge for FD ADC operation for a medium light intensity, to reduce the likelihood of charge storage device 605 being saturated by the overflow charge. The capacitance of charge storage device 605 can also be decreased to increase the charge-to-voltage conversion gain for PD ADC operation for a low light intensity. The increase in the charge-to-voltage conversion gain can reduce quantization error and increase the quantization resolution. In some examples, the capacitance of charge storage device 605 can also be decreased during the FD ADC operation to increase the quantization resolution. In addition, buffer 606 includes a current source 903 of which the current can be set by a bias signal BIAS1, as well as a power transistor 905a which can be controlled by a PWR_GATE signal to turn on/off buffer 606. Buffer 606 can be turned off as part of disabling pixel cell 601.

Moreover, quantizer 607 includes a comparator 904 of which a bias current can be controlled by a bias signal BIAS2 and a gain can be controlled by a gain control signal GAIN. In addition, pixel 601 includes a memory 906. Memory 906 can include static random access memory (SRAM) devices. Memory 906 can include a first portion that stores measurement data 908 and a second portion that stores pixel-level programming data 910. Pixel-level programming data 910 can be stored into memory 906 based on pixel-level programming signals 722. In some examples, memory 906 can receive counter values from a free running counter which can be internal or external to pixel cell 902. Depending on a quantization operation (e.g., TTS, FD ADC, and PD ADC operations), comparator 904 can compare the buffered voltage with different VREF voltages to generate an output, and the output can cause the first portion of memory 906 to store a value from the free running counter as measurement data 908 which can be output to output buses (e.g., D0, D1, etc. of FIG. 8B). Comparator 904 further includes a power transistor 905b which can also be controlled by the PWR_GATE signal to turn on/off comparator 904. Comparator 904 can also be turned off as part of disabling pixel cell 601.

Figure 9B:
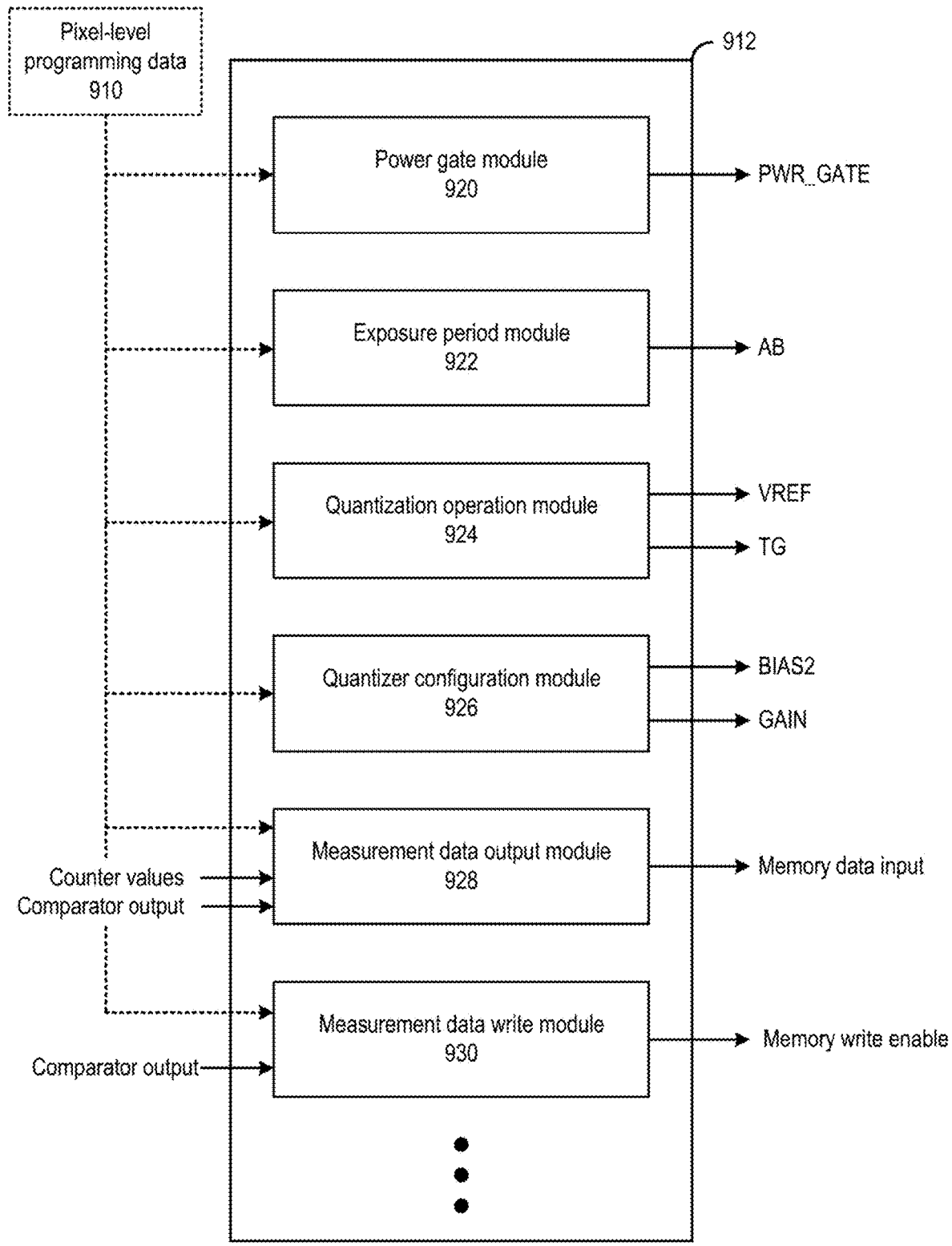

In addition, pixel cell 601 includes a controller 912, which can include logic circuits to generate control signals such as AB, TG, BIAS1, BIAS2, GAIN, VREF, PWR_GATE, etc., and to control the write operation of measurement data into memory 906. FIG. 9B illustrates example internal components of controller 912. As shown in FIG. 9B, pixel cell 601 includes a number of modules such as, for example, a power gate module 920, an exposure period module 922, a quantization operation module 924, a quantizer configuration module 926, a measurement data output module 928, a measurement data write module 930, etc. Each module includes logic circuits to control the generation of control signals and/or the storage of measurement data in memory 906.

For example, power gate module 920 can control the PWR_GATE signal to enable/or disable pixel cell 601. Exposure period module 322 can control the AB signal to set the exposure period. Quantization operation module 924 can control, for example, the VREF signal supplied to comparator 904 as well as the TG signal supplied to transfer transistor 604 to perform the TTS, FD ADC, and PD ADC operations as described in FIG. 6B. Quantizer configuration module 926 can control the bandwidth of the quantizer by, for example, setting BIAS2 of comparator 904. Quantizer configuration module 926 can also control the quantization resolution by, for example, decreasing the capacitance of charge storage device 605 to increase the charge-to-voltage conversion ratio, setting the GAIN signal to increase the gain of comparator 904, etc.

In addition, measurement data output module 928 can set a number of bits of the measurement data to be stored in memory 906 to control the precision of the intensity measurement output by pixel 601. For example, measurement data output module 928 can select a subset of the least significant bits (LSBs) of the counter value as memory data input to memory 906. In one example, measurement data output module 928 can select the comparator decisions which indicate the intensity range as memory data input to memory 906, to represent the intensity measurement output by pixel 601.

Moreover, measurement data write module 930 can control a write enable signal of memory 906 which controls the write operation of the measurement data at memory 906. The write enable signal can be generated based on the output of comparator 904. For example, measurement data write module 930 can determine, based on the comparator outputs, the intensity range and select one of TTS, FD ADC, or PD ADC quantization operations to store into memory 906. Based on the selection, measurement data write module 930 can de-assert the write operation during the non-selected quantization operation, and assert the write operation only during the selected quantization operation. The assertion of the write enable signal can cause memory 906 to store the output of measurement data output module 928 (memory data input" in FIG. 9B) at memory 906.

In some examples, some or all of the modules of controller 912 can be programmed based on pixel-level programming data 910. For example, pixel-level programming data 910 can configure power gate module 920 to assert/de-assert the PWR_GATE signal to enable/disable pixel cell 601. Moreover, pixel-level programming data 910 can set an exposure period, based on which exposure period module 922 can set the timing of the AB signal. Pixel-level programming data 910 can also configure quantization operation module 924 to select one or more quantization operations (e.g., TTS, FD ADC, PD ADC, etc.) to be performed while skipping other quantization operations. Further, pixel-level programming data 910 can set the GAIN signal and/or the BIAS2 signal to set, respectively, the gain and bandwidth of comparator 904. The setting of the gain of comparator 904 can be based on a target quantization resolution of pixel cell 601, with a higher gain leading to lower comparator error and higher quantization resolution, and vice versa. Moreover, the setting of the bandwidth of comparator 904 can be based on, for example, a target frame rate of pixel cell 601. Furthermore, pixel-level programming data 910 can configure measurement data output module 928 to select between storing the comparator outputs (which indicate the intensity range) or storing the counter value in memory 906, and a number of bits of measurement data to be stored in memory 906. Pixel-level programming data 910 can also configure measurement data write module 930 to store measurement data from measurement data output module 928 in memory 906 for a frame, or skip the storing of the measurement data for that frame.

The controller 912 of each pixel cell of pixel cell array 718 can be individually programmed based on pixel-level programming data 910 extracted from pixel array programming map 720 to facilitate the operation of application 708. For example, to support an object tracking application, pixel-level programming data 910 of pixel cells within an ROI can control power gate module 920 to assert the PWR_GATE signal at those pixels, while pixel-level programming data 910 of pixel cells outside the ROI can configure power gate module 920 to de-assert the PWR_GATE signal. In some examples, pixel-level programming data 910 of pixel cells within an ROI can increase the gain of the comparator via quantizer configuration module 926, increase the number of bits of measurement data via measurement data output module 928, and/or enable writing of measurement data to memory 906 via measurement data write module 930. Pixel-level programming data 910 of pixel cells outside the ROI can also decrease the gain of the comparator via quantizer configuration module 926, decrease the number of bits of measurement data via measurement data output module 928, and/or disable writing of measurement data to memory 906 via measurement data write module 930. There are various ways by which pixel-level programming data 910 configures each module in controller 912. For example, each module can store a plurality of candidate configurations (e.g., a set of bias values, a set of gain values, a set of exposure period durations, etc.), and pixel-level programming data 910 can control each module to select a configuration from the candidate configurations. As another example, pixel-level programming data 910 can encode the configuration (e.g., a bias value, a gain value, an exposure period duration, etc.) and configure each module with the encoded configuration.

The controller 912 of each pixel cell of pixel cell array 718 can be individually programmed based on pixel-level programming data 910 extracted from pixel array programming map 720 to adapt the light sensing operation and/or measurement data generation at each pixel cell. For example, pixel-level programming data 910 of a first subset of pixel cells can reduce the exposure period via exposure period module 822 and/or select the TTS operation and deselect the FD ADC and PD ADC operation, while pixel-level programming data 910 of a second subset of pixel cells can increase the exposure period via exposure period module 822 and/or select the PD ADC operation and deselect the TTS and FD ADC operation. Such configuration can be based on application 708 determining, from a prior image frame, that the light received by the first subset of the pixel cells is of high intensity, while the light received by the second subset of the pixel cells is of low intensity. As another example, pixel-level programming data 910 can reduce the bandwidth of comparator 904 via quantizer configuration module 926. The reduction of the bandwidth can be based on a reduction of frame rate of the pixel cells. The reduction of frame rate can be based on, for example, a requirement of application 708 (e.g., a SLAM application), a determination by application 708 that the scene is static, etc. As yet another example, pixel-level programming data 910 of the pixel cells can control the timing of write operations of measurement data at different subsets of pixel cells to generate an image frame where different regions are captured at different exposure periods. Such arrangements can be based on a requirement of application 708, and/or can reduce the amount of pixel data transmitted to host processor 706.

Figure 9C:
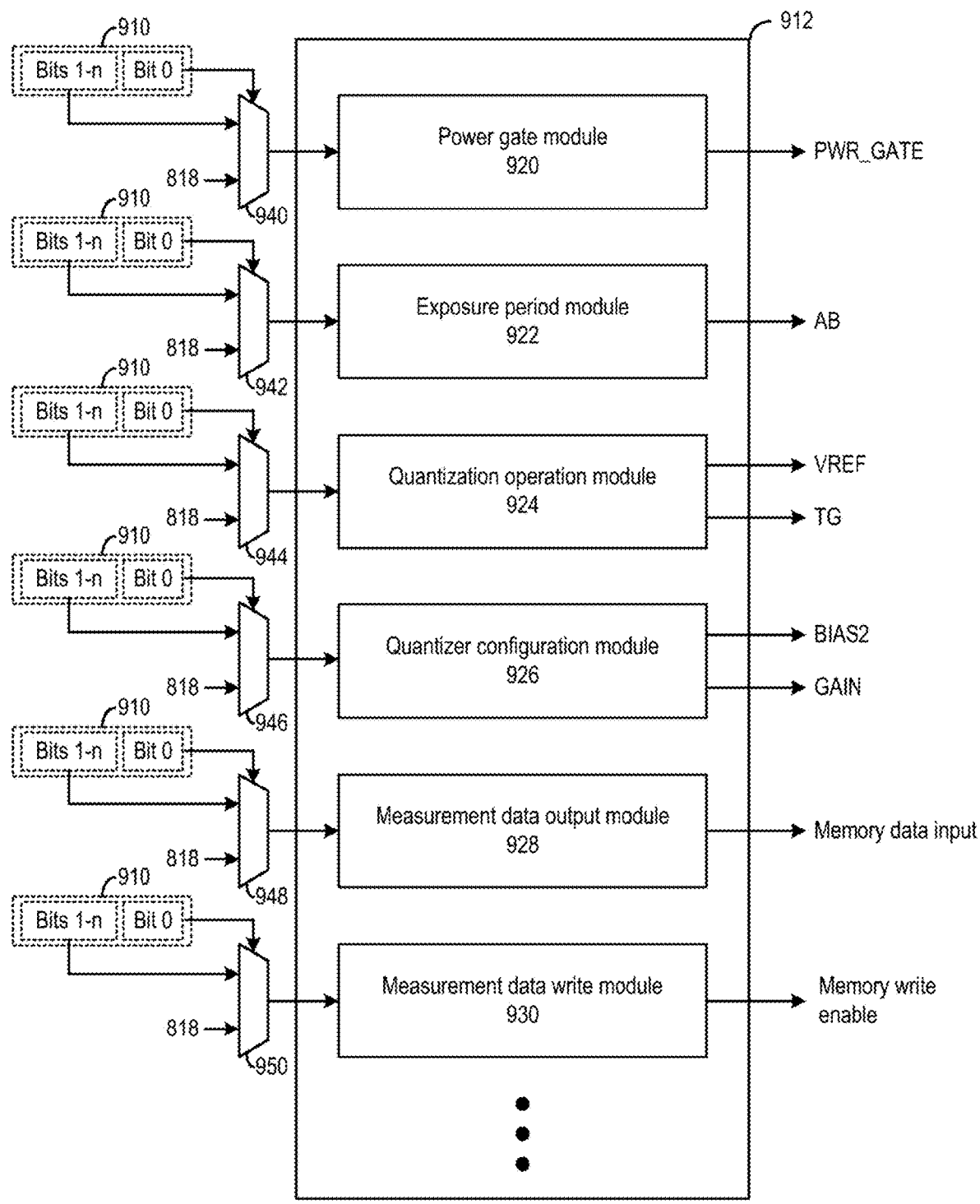
Figure 9D:
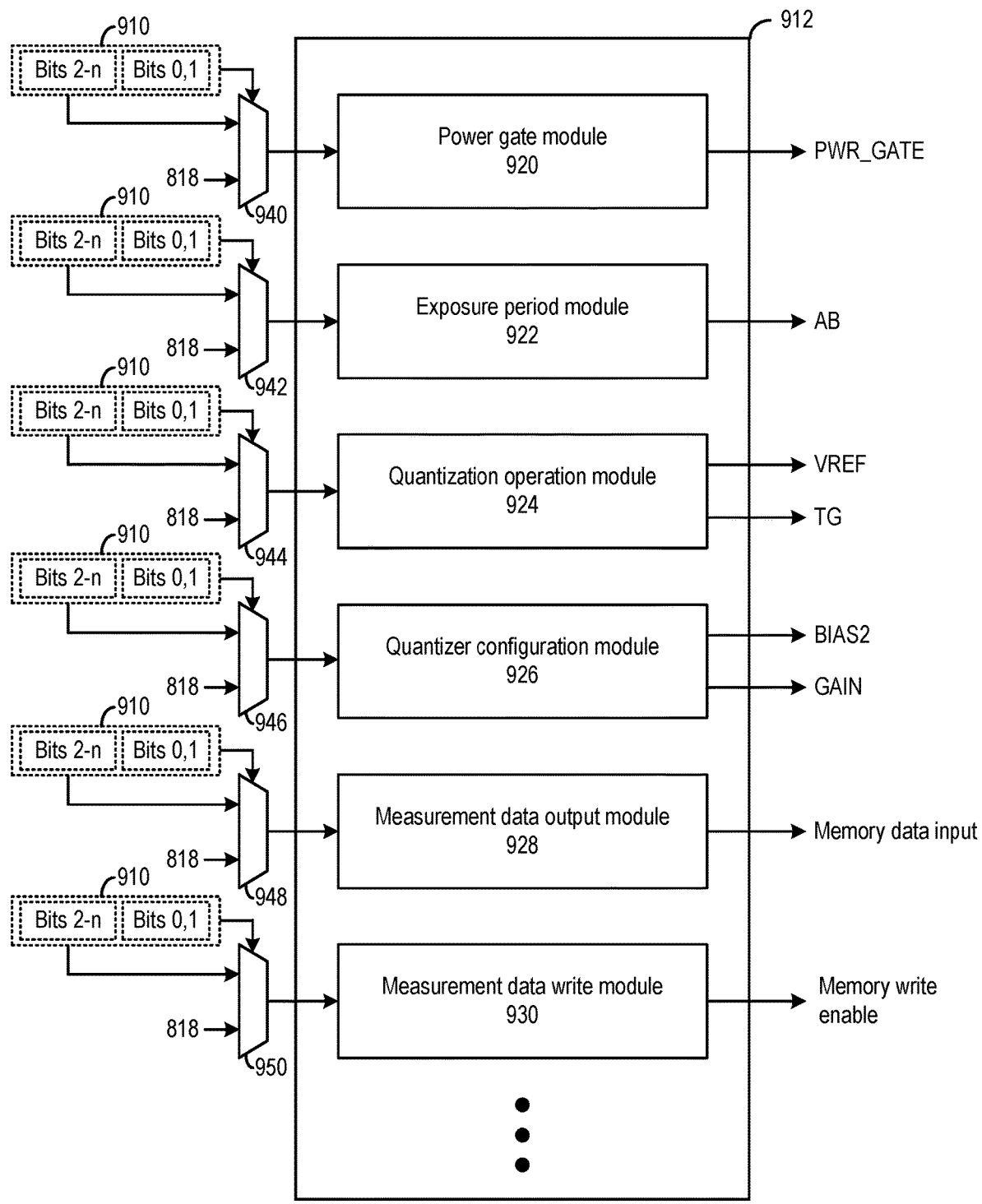
Figure 9E:
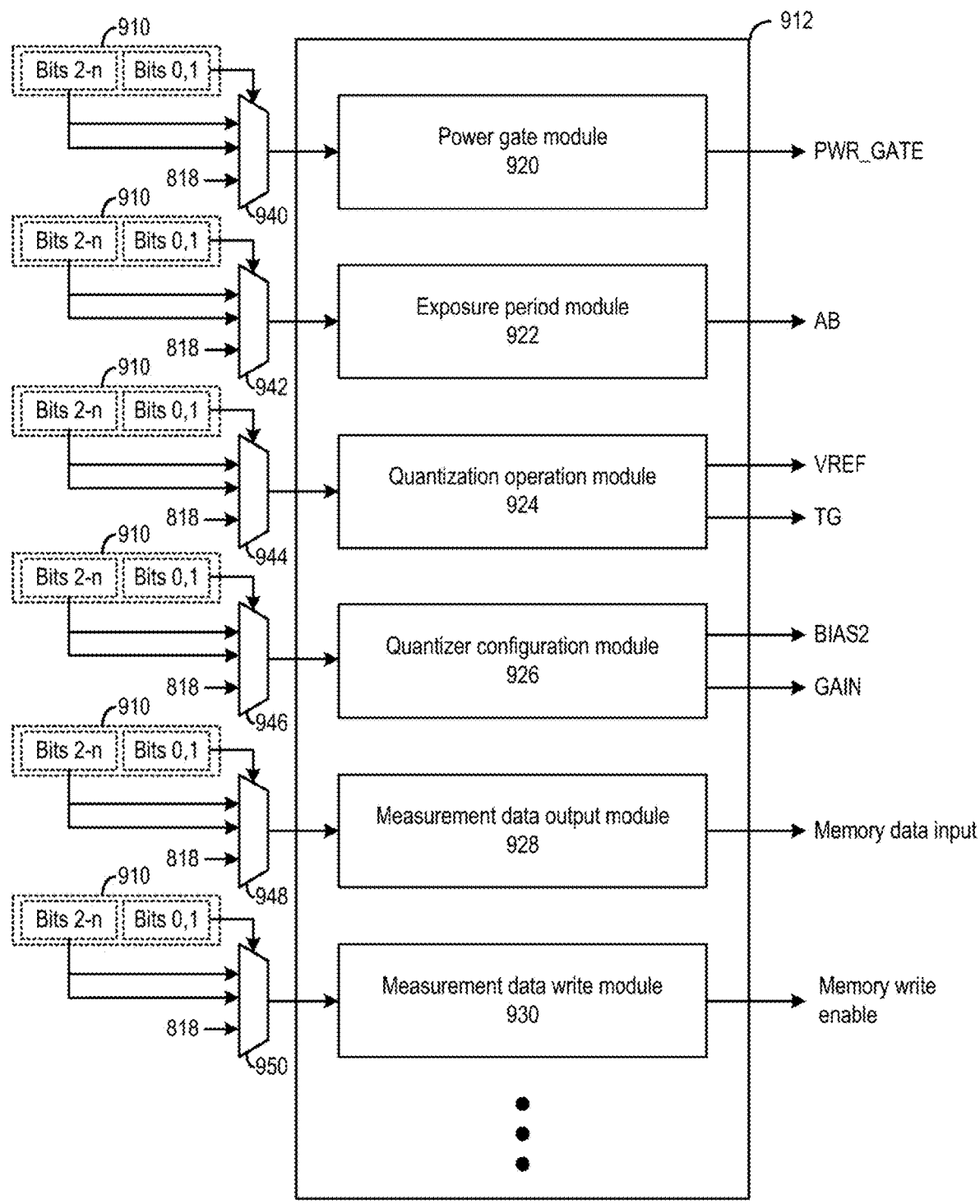

In some examples, some or all of the modules of controller 912 can be programmed based on a combination of pixel-level programming data 910 and chip-level programming signals 818. FIG. 9C-FIG. 9E illustrate different examples of programming controller 912 based on a combination of pixel-level programming data 910 and chip-level programming signals 818. As shown in FIG. 9C, each of power gate module 920, exposure period module 922, quantization operation module 924, quantizer configuration module 926, measurement data output module 928, and measurement data write module 930 receives programming data from, respectively, multiplexors 940, 942, 944, 946, 948, and 950. Each multiplexor can be controlled by a first subset of bits of pixel-level programming data 910 (e.g., bit 0 in FIG. 9C, bits 0 and 1 in FIG. 9D and FIG. 9E). The multiplexors can be either controlled by the same first subset of bits (as shown in FIG. 9C and FIG. 9E) or different bits within the first subset of bits (as shown in FIG. 9D).

Each multiplexor can be controlled to select between passing through chip-level programming signals 818, or a second subset of bits of pixel-level programming data 910, to each module. In a case where the multiplexor is controlled by multiple bits (e.g., FIG. 9E), the multiplexor can be controlled to select from multiple subsets of bits of chip-level programming signals 818 and/or multiple subsets of bits of pixel-level programming data 910 as output. The chip-level programming signals 818 can define, for example, a default mode for each module. For example, under the default mode, PWR_GATE is to be asserted, a default exposure period is provided for the photodiode to generate charge, a default sequence of quantization operations (e.g., TTS, FD ADC, and PD ADC as in FIG. 6B) is to be set, a default gain and bias of comparator 904 is to be set for a default quantization resolution and a default frame rate, default precision of the measurement data to be stored in memory 906 is to be set, and a write operation of the measurement data in memory 906 is to be performed for each frame. The first subset of bits of pixel-level programming data 910 can select whether some or all of the modules operate under the default mode or based on the programming by a second subset of bits of pixel-level programming data 910.

In some examples, instead of multiplexors, each module of controller 912 can include logic circuits to combine chip-level programming signals 818 with pixel-level programming data 910. For example, the logic circuits may include a decoder to decode/manipulate chip-level programming signals 818 using pixel-level programming data 910. As each pixel cell can receive different pixel-level programming data 910, the logic circuits can decode chip-level programming signals 818, which are common for all pixel cells, in a pixel-accurate/specific way. As an illustrative example, chip-level programming signals 818 may carry a default bias current setting for comparator 904, whereas pixel-level programming data 910 can include a pixel-specific scaling factor to be applied to the default bias current setting, to generate a pixel-level bias current setting for each pixel cell.

The combination of pixel-level programming data 910 and chip-level programming signals 818 can vastly expand the number of instructions supported by image sensor 700. For example, assuming that chip-level programming bus 816 comprises n bits such that chip-level programming signals 818 comprise n-bit parallel signals, and pixel-level programming data 910 comprises m bits, a total of $2^{(m+n)}$ different instructions, each representing a different mode of operation, can be supported. Spatial granularity of the instruction/operation can be represented by the n bits of pixel-level programming data 910 as each pixel cell within pixel cell array 718 can receive different n bits of pixel-level programming data 910, whereas temporal granularity of the instruction/operation can be presented by the m bits as all pixel cells receive the same chip-level programming signals 818 at a given time, but different chip-level programming signals 818 can be provided to the pixel cells at different times.

Figure 10A:
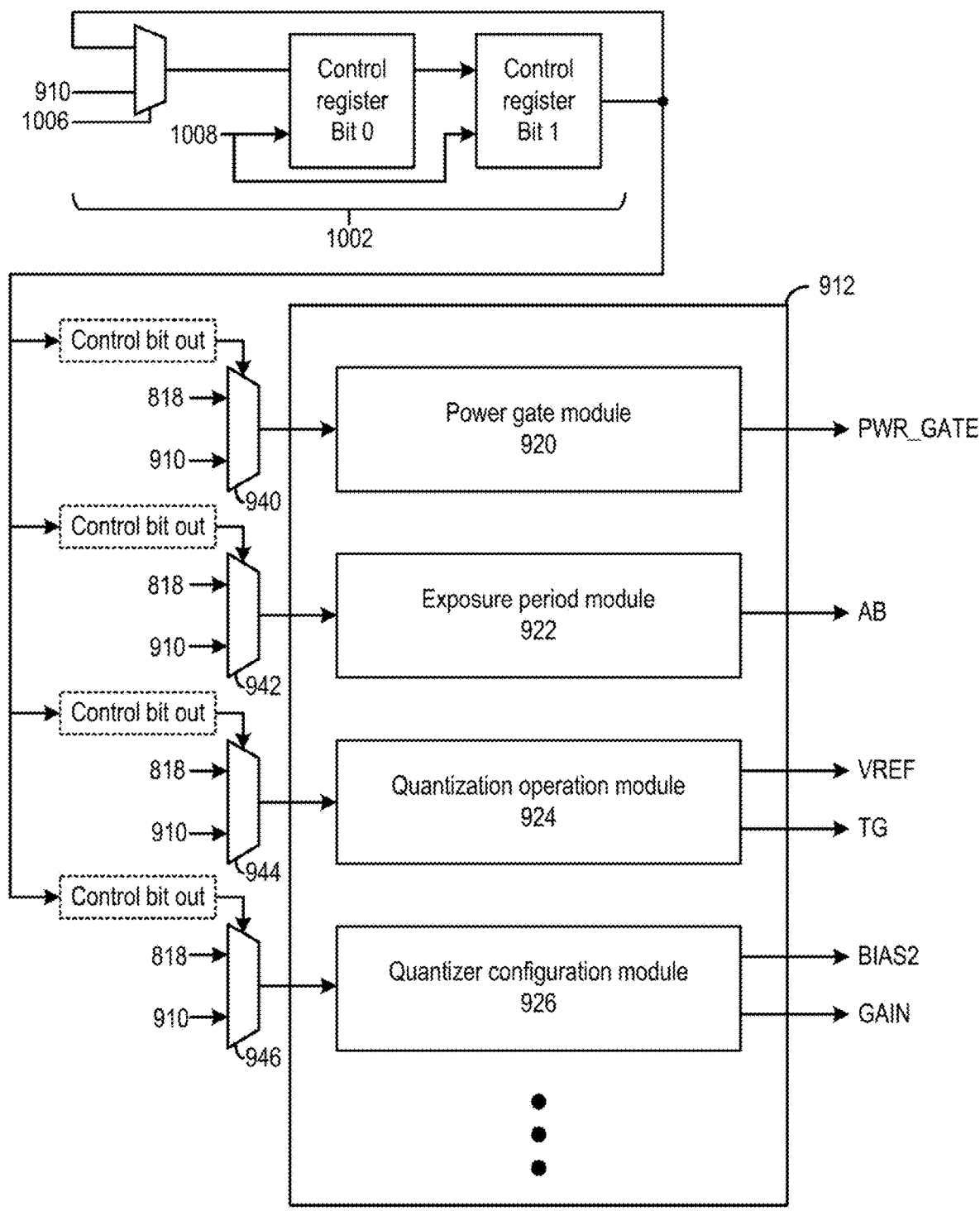
FIG. 10A and FIG. 10B illustrate example components of the image processing system of FIGS. 7A-7C.
Figure 10B:
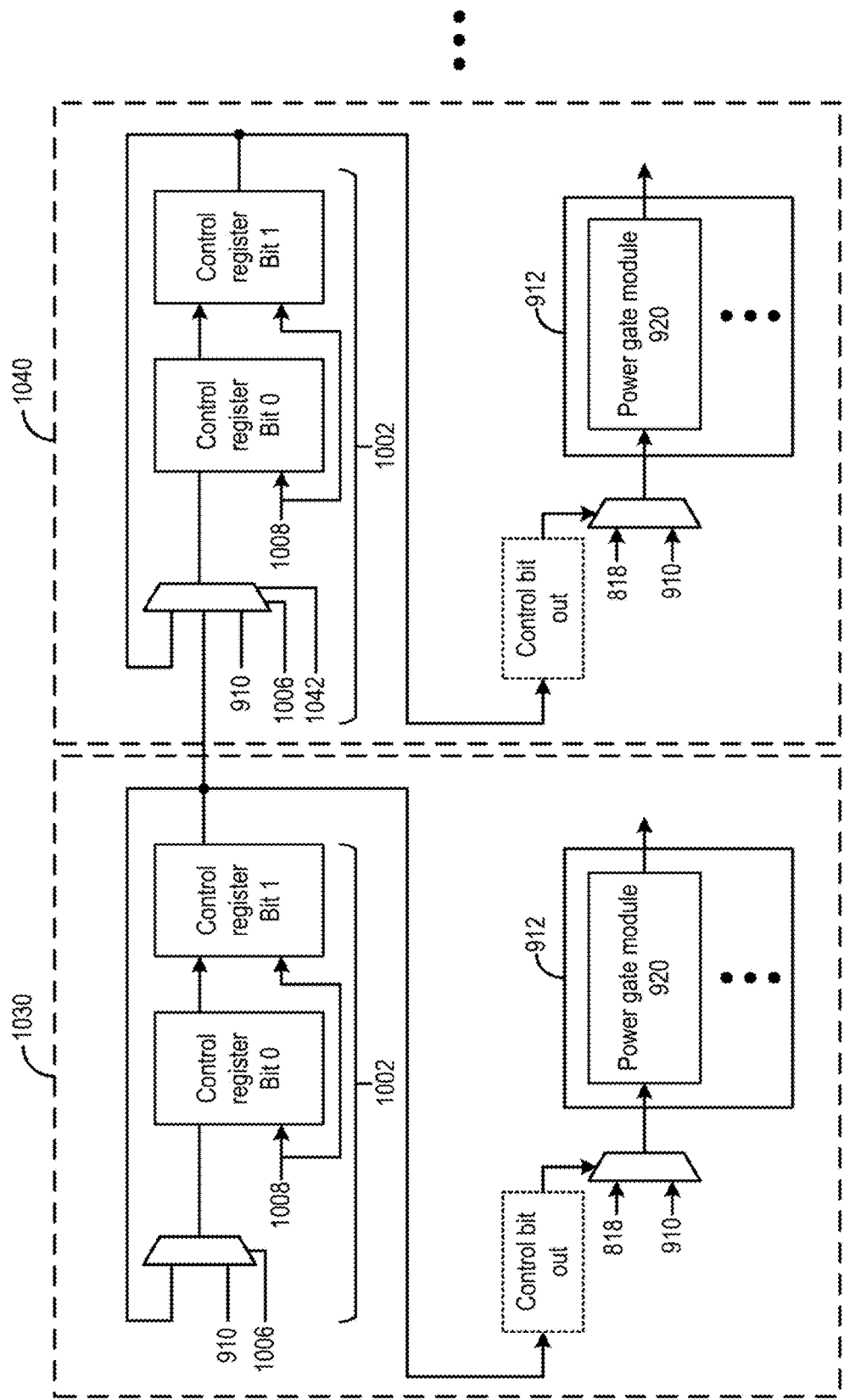

FIG. 10A and FIG. 10B illustrate other examples of internal components of pixel cells of pixel cell array 718. As shown in FIG. 10A, part of memory 906 that stores a subset of bits of pixel-level programming data 910 (e.g., a first subset of bits as described above in FIG. 9C-FIG. 9E) can be configured as a circular shift register 1002. The first subset of bits can be loaded into shift register 1002 by asserting a load signal 1006 to break the feedback loop. After the first subset of bits are loaded, a global shift signal 1008 (e.g., a clock signal) can be sent from peripheral circuit 716 to shift the first subset of bits, and output a different set of bits of the first subset at a different time. For example, in FIG. 10A, shift register 1002 can alternate between outputting a first bit and a second bit of pixel-level programming data 910 in response to global shift signal 1008. Peripheral circuit 716 can send out shift signal 1008 for each frame or after a number of frames. In some examples, shift signal 1008 can also be locally generated at the pixel cell (e.g., by controller 912).

Each bit output by shift register 1002 can define a different set of configurations for the light measurement operation and measurement data generation at the pixel cell. For example, the first bit can cause controller 912 to operate in the default mode based on chip-level programming signals 818, whereas the second bit can cause controller 912 to operate according to pixel-level programming data 910. As another example, the first bit and the second bit can cause controller 912 to operate based on a different subset of bits of pixel-level programming data 910.

Such arrangements allow configuring the pixel cells sequentially while reducing the number of programming maps received by the peripheral circuit and the number of programming operations performed by the peripheral circuit. For example, in one programming operation, peripheral circuit 716 can transmit programming data that define a sequence of instructions corresponding to a sequence of configurations to each pixel cell, and assert load signal 1006 to store the first subset of bits of the programming data at shift register 1002 of each pixel cell. Peripheral circuit 716 can then transmit global shift signal 1008 to shift register 1002 to shift out part of the first subset of bits sequentially to obtain the sequence of instructions/configurations.

The sequential configuration of the pixel cells can facilitate the operations of multiple host applications that not only access the outputs of the pixel cells but also have different configuration requirements for the pixel cells. For example, host processor 706 may operate a SLAM application and a hand-tracking application simultaneously. Both applications may use the image frames output by pixel cell array 718, but each has a different configuration requirement for the pixel cells. For example, the SLAM application may require a lower frame rate but full resolution image frames, whereas the hand-tracking application may require a higher frame rate but only operate on an ROI of the image frame. To support both applications, the programming map can include programming data having a first bit (or a first subset of bits) to configure the pixel cells for the SLAM application (e.g., all pixel cells enabled but each operates the quantizer at a lower speed) and a second bit (or a second subset of bits) to configure the pixel cells for the hand-tracking application (e.g., only a subset of pixel cells corresponding to the ROI is enabled, and each enabled pixel cell operates the quantizer at a higher speed). As described above, peripheral circuit 716 can transmit the pixel-level programming data to the pixel cells in a single programming operation for storage in shift register 1002 of each pixel cell. Peripheral circuit 716 can also transmit global shift signal 1008 to shift register 1002 of the each pixel cell to alternate between outputting the first subset of bits and the second subset of bits of the pixel-level programming data, to configure the pixel cells for the SLAM application and for the hand-tracking application at different times. Peripheral circuit 716 needs not reprogram the pixel cells until the programming map is updated by host processor 706 based on, for example, a change in the location and/or the size of the ROI. Peripheral circuit 716 can then transmit the updated pixel-level programming data to the pixel cells in a subsequent programming operation.

FIG. 10B illustrates another example of internal components of pixel cells of pixel cell array 718. As shown in FIG. 10B, the shift register 1002 of multiple pixel cells, such as pixel cells 1030 and 1040, can be connected to form a shift register that spans across the multiple pixel cells. This allows the first subset of bits of pixel-level programming data 910 to be propagated from pixel cell 1030 to pixel cells 1040 based on, for example, a propagation signal 1042 from peripheral circuit 716. Such arrangements can provide a spatial shift in the pixel cell programming with respect to time without requiring peripheral circuit 716 to perform another programming operation. In some examples, such arrangements allow shifting of an ROI, as well as the subset of pixels designated as part of the ROI, to account for a movement of an object being tracked by the ROI. For example, referring back to FIG. 6C, group 630 of pixel cells can receive a first subset of bits of pixel-level programming data 910 from group 620 of pixel cells to account for the movement of the ROI. Such arrangements enable, for example, power gate module 920 of group 620 of pixel cells to be controlled to assert PWR_GATE at time T0, followed by power gate module 920 of group 630 of pixel cells at time T6.

Figure 11:
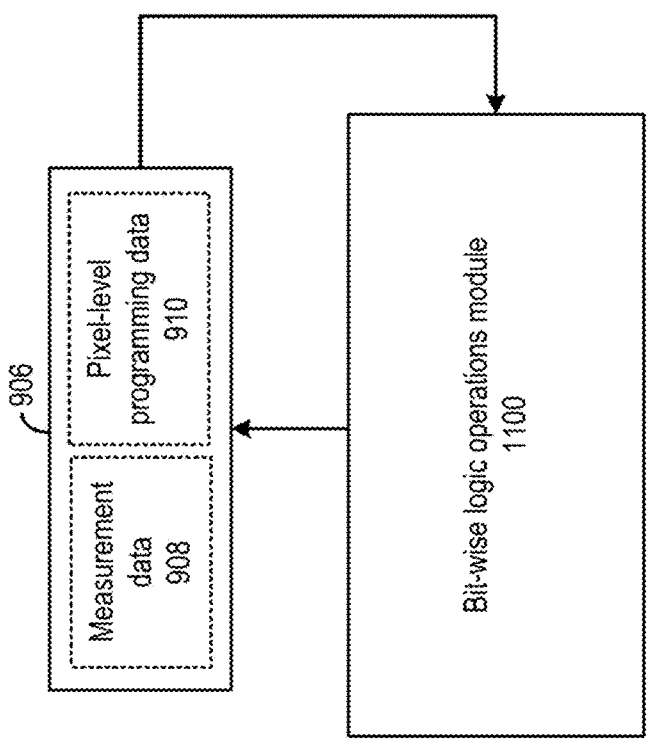
FIG. 11 illustrates another example of an image processing system and its operations.

FIG. 11 illustrates another example of internal components of pixel cells of pixel cell array 718. As shown in FIG. 11, the pixel cell may further include a digital logic circuit, such as a bit-wise logic operations module 1100, which can combine with memory 906 to form a local state machine to manipulate at least one of pixel-level programming data 910 or measurement data 908. Bit-wise logic operations module 1100 can be part of controller 912 and may include, for example, an arithmetic logic unit (ALU). Various operations can be supported by the local state machine, such as an adaptive exposure period. For example, pixel-level programming data 910 may reduce or increase the exposure period of a pixel cell with respect to a default exposure period, and the local state machine can scale up or down measurement data 908 obtained from the adjusted exposure period, such that all measurement data output by all pixel cells are based on the same scale. As another example, based on measurement data 908 obtained in an exposure period set by pixel-level programming data 910, the digital logic circuit may determine that the exposure period set by pixel-level programming data 910 is too long or too short.

For example, measurement data 908 may indicate that the intensity of light is very high, and the digital logic circuit may adjust pixel-level programming data 910 to shorten the exposure period to reduce the risk of blooming. As another example, measurement data 908 may indicate that the intensity of light is very low, and the digital logic circuit may adjust pixel-level programming data 910 to lengthen the exposure period to allow the photodiode to accumulate more charge to increase the signal-to-noise ratio. Such arrangements can reduce the number of programming operations by the host while allowing the pixel cells to be more responsive in adapting their light measurement operations and measurement data generation to the operation condition, all of which can improve the performance of the overall system.

Figure 12:
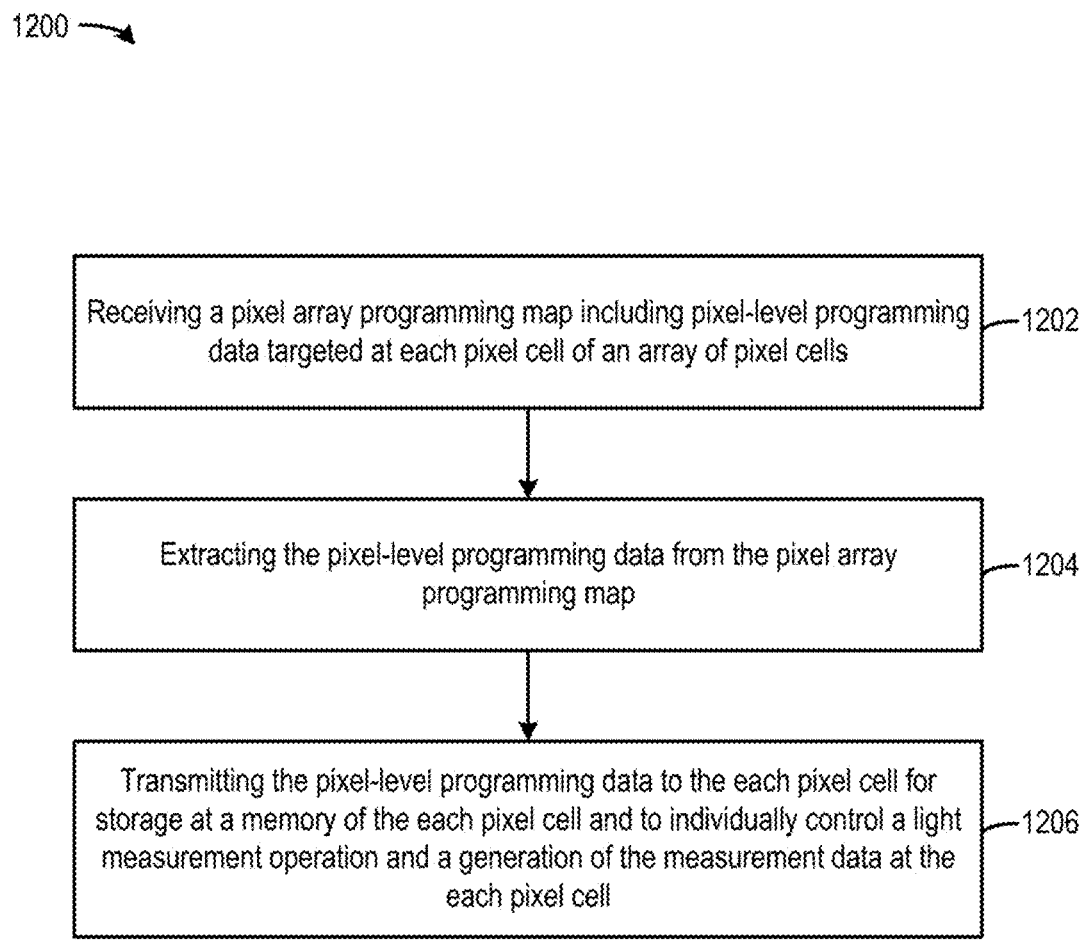
FIG. 12 illustrates a flowchart of an example process for generating image data.

FIG. 12 illustrates a method 1200 of operating an image sensor, such as image sensor 704. Method 1200 starts with step 1202, in which a peripheral circuit of the image sensor (e.g., peripheral circuit 716 of FIG. 7A) receives a pixel array programming map, such as pixel array programming map 720, which includes pixel-level programming data targeted at each pixel cell of an array of pixel cells, such as pixel cell array 718. As described above, each pixel cell in pixel cell array 718 may include a memory to store pixel-level programming data for configuring/programming the light measurement operation at the each pixel cell, and to store the measurement data from the light measurement operation. In some examples, a block of pixel cells (e.g., a 2×2 block of pixel cells) can share a memory to store pixel-level programming data for configuring/programming the light measurement operations at the block of pixel cells, and to store the measurement data from the block of pixel cells. Each pixel cell, or each block of pixel cells, can be individually addressable, which allows the light measurement operations at each pixel cell (or at each block of pixel cells) to be individually programmed by peripheral circuit 716 based on the pixel array programming map. The pixel array programming map can be provided by a host device.

In step 1204, the peripheral circuit can extract the pixel-level programming data from the pixel array programming map. Specifically, the peripheral circuit can parse the pixel array programming map, which can be in a serial data stream, to identify the pixel-level programming data for each pixel cell. The identification of the pixel-level programming data can be based on, for example, a pre-determined scanning pattern by which the two-dimensional pixel array programming map is converted into the serial format, as well as the order by which the pixel-level programming data is received by peripheral circuit from the serial data stream. The pixel-level programming data can be in binary form or can comprise multiple bits, as described above. Each pixel-level programming data can be targeted at a pixel cell or at a group of pixel cells.

In step 1206, the peripheral circuit can transmit the pixel-level programming data to the each pixel cell for storage at a memory accessible by the each pixel cell and to control a light measurement operation and a generation of the measurement data at the each pixel cell. The memory can be part of the each pixel cell or shared by a group of pixel cells. The peripheral circuit can transmit row address signals, column address signals, as well as control signals including the programming data to the pixel cell array to select one or more pixel cells to receive the programming data. The selected one or more pixel cells can then receive control signals 722, as described in FIG. 8B. Pixel-level programming data can then be read out from the memory of each pixel cell to configure the light measurement operation at the each pixel cell, or from the shared memory of each block of pixel cells to configure the light measurement operations at the block of pixel cells. In some examples, the memory may include a shift register to enable different pixel-level programming data to be read out at different times. In some examples, memories from multiple pixel cells (or multiple groups of pixel cells) can form a shift register to propagate pixel-level programming data from one pixel cell to another to account for, for example, a movement of a region of interest (ROI) across image frames.

The configuration of the light measurement operation at a pixel cell can include, for example, disabling/enabling the light measurement operation and measurement data generation of the pixel cell, setting the exposure time, selecting one or more quantization operations (e.g., TTS, FD ADC, PD ADC), setting the bandwidth and/or quantization resolution of the quantizer, controlling whether the memory stores the measurement data, controlling a precision (e.g., a number of bits) of the measurement data stored at the memory, etc. The configuration of the light measurement operation by the pixel-level programming data can also include gating the configuration of the pixel cell by chip-level programming data and/or decoding the chip-level programming data.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations described. The apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. An apparatus comprising:
an array of pixel cells, wherein each pixel cell of the array of pixel cells includes:
a first circuit to generate local programming data;
a memory to store the local programming data and measurement data; and
light measurement circuits configured to, based on the local programming data from the memory, perform a light measurement operation to generate the measurement data, and to store the measurement data at the memory; and
a peripheral circuit configured to:
receive chip-level programming data targeting at least a subset of the array of pixel cells;
receive a pixel array programming map including pixel-level programming data, the pixel-level programming data including respective pixel-specific programming data for each pixel cell;
extract pixel-level programming data from the pixel array programming map; and
for each pixel cell of the at least the subset of the array of pixel cells, transmit the chip-level programming data and the respective pixel-level programming data to the respective pixel cell to enable each respective pixel cell of the at least the subset of the array of pixel cells to:
generate, using the first circuit and based on the chip-level programming data and the pixel-level programming data, the local programming data; and
configure the light measurement circuits based on the local programming data to individually control the light measurement operation and a generation of the measurement data at the pixel cell.

2. The apparatus of claim 1, wherein each pixel cell of the array of pixel cells is individually addressable;
wherein the peripheral circuit is configured to:
extract first pixel-level programming data for a first pixel cell of the array of pixel cells from the pixel array programming map;
extract second pixel-level programming data for a second pixel cell of the array of pixel cells from the pixel array programming map;
generate a first address based on the first pixel-level programming data;
generate a second address based on the second pixel-level programming data;
select, based on the first address, the memory of the first pixel cell to receive the first pixel-level programming data; and
select, based on the second address, the memory of the second pixel cell to receive the second pixel-level programming data.

3. The apparatus of claim 2, wherein the pixel array programming map comprises an array of pixel-level programming data;
wherein the first address is generated based on a location of the first pixel-level programming data within the array of pixel-level programming data; and
wherein the second address is generated based on a location of the second pixel-level programming data within the array of pixel-level programming data.

4. The apparatus of claim 1, wherein the first circuit includes a multiplexor controllable by at least a first subset of the pixel-level programming data to select the chip-level programming data or at least a second subset of the pixel-level programming data as the local programming data; and
wherein the light measurement circuits of a first pixel cell are configured to perform the light measurement operation based on the local programming data output by the multiplexor.

5. The apparatus of claim 4,
wherein the local programming data are first local programming data;
wherein the chip-level programming data are first chip-level programming data;
wherein the peripheral circuit is configured to transmit second chip-level programming data to the subset of the array of pixel cells including the first pixel cell;
wherein the multiplexor is a first multiplexor;
wherein the first local programming data control a first operation of a first component of the measurement circuits as part of the light measurement operation;
wherein the first circuit further comprises a second multiplexor controllable by at least the first subset of the pixel-level programming data to select the second chip-level programming data or at least a third subset of the pixel-level programming data to output as second local programming data; and
wherein the second local programming data control a second operation of a second component of the measurement circuits as part of the light measurement operation.

6. The apparatus of claim 5, wherein the first multiplexor and the second multiplexor are controllable by different bits of the first subset of the pixel-level programming data.

7. The apparatus of claim 1, wherein the chip-level programming data set a first quantity of current to be consumed by each of the subset of the array of pixel cells during the light measurement operation; and
wherein the pixel-level programming data sets a second quantity of current to be consumed by a first pixel cell during the light measurement operation, and whether to override the first quantity set by the chip-level programming data.

8. The apparatus of claim 7, wherein the light measurement circuits comprise a comparator; and
wherein the chip-level programming data set a first bias of the comparator; and
wherein the pixel-level programming data set a second bias of the comparator.

9. The apparatus of claim 1, wherein the light measurement circuits include a photodiode;
wherein the chip-level programming data set a first exposure period in which the photodiode of each of the subset of the array of pixel cells generates charge in response to light for the light measurement operation; and
wherein the pixel-level programming data sets a second exposure period in which the photodiode of a first pixel cell generates charge in response to light for the light measurement operation, and whether to override the first exposure period set by the chip-level programming data.

10. The apparatus of claim 1, wherein the light measurement circuits include a photodiode;
wherein the chip-level programming data indicate a first quantization operation and a second quantization operation to be performed by the light measurement circuits of each of the subset of the array of pixel cells to quantize the charge generated by the photodiode to generate the measurement data, the first quantization operation and the second quantization operation being associated with different intensity ranges; and
wherein the pixel-level programming data indicate that the light measurement circuits of a first pixel cell are to perform the second quantization operation to generate the measurement data, and whether to override the chip-level programming data.

11. The apparatus of claim 1, wherein the chip-level programming data indicate that each of the subsets of the array of pixel cells is to store the measurement data at the memory for a first frame; and
wherein the pixel-level programming data indicate that the light measurement circuits of a first pixel cell are not to store the measurement data at the memory for the first frame, and whether to override the chip-level programming data.

12. The apparatus of claim 1, wherein the chip-level programming data set a first number of bits of the measurement data to be stored at the memory; and
wherein the pixel-level programming data set a second number of bits of the measurement data to be stored at the memory, and whether to override the chip-level programming data.

13. The apparatus of claim 1, wherein the light measurement operation is a first light measurement operation;
wherein the memory of a first pixel cell of the array of pixel cells includes a shift register configured to store at least a first subset and a second subset of the pixel-level programming data;
wherein the peripheral circuit is configured to transmit a shift signal to the shift register of the first pixel cell to cause the shift register to output the first subset of the pixel-level programming data at a first time and the second subset of the pixel-level programming data at a second time; and
wherein the light measurement circuits of the first pixel cell are configured to perform a first light measurement operation based on the first subset of the pixel-level programming data at the first time and perform a second light measurement operation based on the second subset of the pixel-level programming data at the second time.

14. The apparatus of claim 13, wherein the pixel-level programming data is first pixel-level programming data;
wherein the memory of a second pixel cell of the array of pixel cells includes a shift register configured to store subsets of second pixel-level programming data; and
wherein the peripheral circuit is configured to transmit the shift signal to the shift register of the first pixel cell, and a propagation signal to the shift register of the second pixel cell, to propagate the first subset and the second subset of the first pixel-level programming data from the shift register of the first pixel cell to the shift register of the second pixel cell for storage as the subsets of the second pixel-level programming data.

15. The apparatus of claim 14, wherein the memory of each pixel cell of the array of pixel cells includes the shift register to store the pixel-level programming data;
wherein the peripheral circuit is configured to transmit the shift signal to the shift register of each pixel cell to:
at the first time, cause a first subset of the array of pixel cells to perform the first light measurement operation to generate a first frame, the first subset of the array of pixel cells corresponding to a region-of-interest (ROI) in the first frame; and
at the second time, cause a second subset of the array of pixel cells to perform the second light measurement operation to generate a second frame, the second subset of the array of pixel cells corresponding to the ROI in the second frame.

16. The apparatus of claim 1, wherein the pixel array programming map is a first pixel array programming map including first pixel-level programming data targeted at each pixel cell;
wherein the light measurement operation is a first light measurement operation; and
wherein the peripheral circuit is configured to:
receive the first pixel array programming map including the first pixel-level programming data targeted at each pixel cell;
transmit the first pixel-level programming data to each pixel cell to control the first light measurement operation at the pixel cell to generate a first frame;
receive a second pixel array programming map including second pixel-level programming data targeted at each pixel cell; and
transmit the second pixel-level programming data to each pixel cell to control a second light measurement operation at the pixel cell to generate a second frame.

17. The apparatus of claim 16, wherein each entry of the second pixel array programming map includes an indication of whether the second pixel-level programming data stored at the entry represents a difference from a corresponding entry of the first pixel array programming map, and the second pixel-level programming data.

18. The apparatus of claim 1, wherein the first circuit comprises a logic circuit configured to combine the pixel-level programming data and the chip-level programming data to generate the local programming data.

19. The apparatus of claim 18, wherein the chip-level programming data comprises a default programming data value; and
wherein the pixel-level programming data comprise a scaling factor to be applied to the default programming data value by the first circuit to generate the local programming data including the scaled default programming data value.

20. The apparatus of claim 1, wherein the pixel-level programming data include control bits and data bits;
wherein each pixel cell of the array of pixel cells further includes a controller configured to, based on the pixel-level programming data from the memory:
select a first component of the light measurement circuits based on the control bits; and
configure the first component based on the data bits of the pixel-level programming data; and
wherein the light measurement circuits are configured to perform, using the first component configured based on the data bits, the light measurement operation.

21. The apparatus of claim 20, wherein the controller is configured to:
  select, based on a first subset of the control bits, the first component of the light measurement circuits;
  select, based on a second subset of the control bits, a second component of the light measurement circuits;
  configure the first component based on a first subset of the data bits; and
  configure the second component based on a second subset of the data bits; and
  wherein the light measurement circuits are configured to perform, using the first component configured based on the first subset of the data bits and the second component configured based on the second subset of the data bits, the light measurement operation.

22. The apparatus of claim 20, wherein the pixel-level programming data are first pixel-level programming data;
  wherein the light measurement operation is a first light measurement operation;
  wherein the control bits of the first pixel-level programming data have a first value;
  wherein the controller is further configured to:
    receive second pixel-level programming data from the peripheral circuit;
    select a second component of the light measurement circuits based on the control bits of the second pixel-level programming data having a second value; and
    configure the second component based on the data bits of the second pixel-level programming data; and
  wherein the light measurement circuits are configured to perform, using the second component configured based on data bits of the second pixel-level programming data, a second light measurement operation.

23. A method, comprising:
  receiving a pixel array programming map including pixel-level programming data targeted at each pixel cell of an array of pixel cells;
  receiving chip-level programming data targeted at at least a subset of the array of pixel cells;
  extracting the pixel-level programming data from the pixel array programming map; and
  for each pixel cell of the at least the subset of the array of pixel cells, transmitting the chip-level programming data and the respective pixel-level programming data to respective pixel cell of the at least the subset of the array of pixel cells to enable each pixel cell to:
    generate, using a first circuit of the pixel cell and based on the chip-level programming data and the pixel-level programming data, local programming data; and
    configure light measurement circuits of the pixel cell based on the local programming data to individually control a light measurement operation and a generation of measurement data at the pixel cell.

24. An apparatus comprising:
  an array of pixel cells, wherein each pixel cell of the array of pixel cells includes:
    a memory to store pixel-level programming data and measurement data, the pixel-level programming data including control bits and data bits; and
    a controller configured to, based on the pixel-level programming data from the memory:
      select a first component of the light measurement circuits based on the control bits; and
      configure the first component based on the data bits of the pixel-level programming data; and
    light measurement circuits configured to perform, using the first component configured based on the data bits, a light measurement operation to generate the measurement data, and to store the measurement data at the memory; and
  a peripheral circuit configured to:
    receive a pixel array programming map including pixel-level programming data targeted at each pixel cell;
    extract the pixel-level programming data from the pixel array programming map; and
    for each pixel cell, transmit the respective pixel-level programming data to the respective pixel cell of the array of pixel cells to store at the memory of the respective pixel cell and to individually control the light measurement operation and a generation of the measurement data at the respective pixel cell.

25. The apparatus of claim 24, wherein the controller is configured to:
  select, based on a first subset of the control bits, the first component of the light measurement circuits;
  select, based on a second subset of the control bits, a second component of the light measurement circuits;
  configure the first component based on a first subset of the data bits; and
  configure the second component based on a second subset of the data bits; and
  wherein the light measurement circuits are configured to perform, using the first component configured based on the first subset of the data bits and the second component configured based on the second subset of the data bits, the light measurement operation.

26. The apparatus of claim 24, wherein the pixel-level programming data are first pixel-level programming data;
  wherein the light measurement operation is a first light measurement operation;
  wherein the control bits of the first pixel-level programming data have a first value;
  wherein the controller is further configured to:
    receive second pixel-level programming data from the peripheral circuit;
    select a second component of the light measurement circuits based on the control bits of the second pixel-level programming data having a second value; and
    configure the second component based on the data bits of the second pixel-level programming data; and
  wherein the light measurement circuits are configured to perform, using the second component configured based on data bits of the second pixel-level programming data, a second light measurement operation.

* * * * *